(12) United States Patent
Zwimpfer et al.

(10) Patent No.: US 11,666,426 B2
(45) Date of Patent: Jun. 6, 2023

(54) BRUSH ATTACHMENT, ELECTRIC TOOTHBRUSH HANDPIECE AND ELECTRIC TOOTHBRUSH COMPRISING THE ELECTRIC TOOTHBRUSH HANDPIECE AND THE BRUSH ATTACHMENT

(71) Applicant: TRISA HOLDING AG, Triengen (CH)

(72) Inventors: Martin Zwimpfer, Lucerne (CH); Pierre Fredy Kirchhofer, Eich (CH); Herbert Fischer, Reitnau (CH)

(73) Assignee: TRISA HOLDING AG, Triengen (CH)

( * ) Notice: Subject to any disclaimer, the term of this patent is extended or adjusted under 35 U.S.C. 154(b) by 547 days.

(21) Appl. No.: 16/755,640

(22) PCT Filed: Oct. 11, 2018

(86) PCT No.: PCT/EP2018/077787
§ 371 (c)(1),
(2) Date: Apr. 13, 2020

(87) PCT Pub. No.: WO2019/072994
PCT Pub. Date: Apr. 18, 2019

(65) Prior Publication Data
US 2020/0330202 A1    Oct. 22, 2020

(30) Foreign Application Priority Data
Oct. 11, 2017  (EP) ..................... 17195869

(51) Int. Cl.
*A61C 17/22*  (2006.01)
*A61C 17/34*  (2006.01)

(52) U.S. Cl.
CPC ........ *A61C 17/222* (2013.01); *A61C 17/3436* (2013.01); *A61C 17/225* (2013.01)

(58) Field of Classification Search
CPC .... A61C 17/222; A61C 17/225; A46B 5/0095
See application file for complete search history.

(56) References Cited

U.S. PATENT DOCUMENTS 9,237,943 B2   1/2016  Graeve
2002/0056402 A1   5/2002  Seeger et al.
(Continued)

FOREIGN PATENT DOCUMENTS

CN    201676306 U   12/2010
CN    201966781 U    9/2011
(Continued)

OTHER PUBLICATIONS

Oct. 6, 2021 Office Action issued in European Patent Application No. 18785952.5.
(Continued)

*Primary Examiner* — Shay Karls
(74) *Attorney, Agent, or Firm* — Oliff PLC

(57) ABSTRACT

A brush attachment for a toothbrush handpiece, in particular for an electric toothbrush handpiece, has a head portion which includes a brush head, has an attachment portion which includes an interface receptacle, and has a neck portion arranged between the head portion and the attachment portion, wherein the interface receptacle is implemented by a universal interface receptacle for receiving at least two different interfaces of different toothbrush handpieces.

7 Claims, 24 Drawing Sheets

(56) References Cited

U.S. PATENT DOCUMENTS

Figure 1:
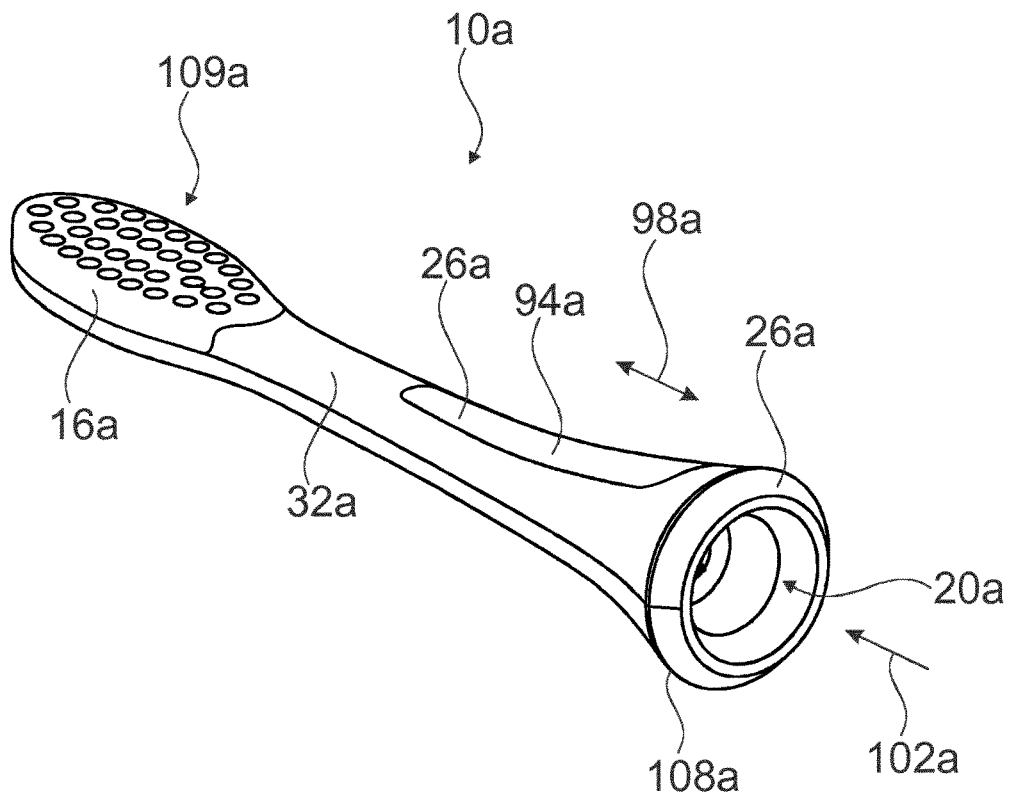

| | | |
|---|---|---|
| 2010/0043156 A1 | 2/2010 | Kressner |
| 2011/0107536 A1 | 5/2011 | Dabrowski et al. |

FOREIGN PATENT DOCUMENTS

| | | | |
|---|---|---|---|
| CN | 203315105 U | 12/2013 | |
| CN | 206198076 U | 5/2017 | |
| DE | 102006060133 A1 | 6/2008 | |
| DE | 102012006723 A1 | 10/2013 | |
| EP | 0893106 A2 | 1/1999 | |
| EP | 2234561 B1 | 8/2012 | |
| EP | 2664298 A1 | 11/2013 | |
| EP | 3381404 A1 * | 10/2018 | ............. A46B 9/025 |
| JP | 2012-165954 A | 9/2012 | |
| WO | 95/33419 A1 | 12/1995 | |
| WO | WO-0076420 A1 * | 12/2000 | ............. A61C 17/22 |
| WO | 2007/016066 A1 | 2/2007 | |
| WO | 2014/037856 A1 | 3/2014 | |
| WO | 2015/159250 A1 | 10/2015 | |
| WO | WO-2015159250 A1 * | 10/2015 | ............. A61C 17/22 |

OTHER PUBLICATIONS

Aug. 13, 2020 Office Action issued in European Patent Application No. 17195869.7.
Jun. 11, 2018 Search Report issued in European Patent Application No. 17195869.7.
Aug. 21, 2018 Search Report issued in European Patent Application No. 17195869.7.
Jan. 29, 2020 Office Action issued in European Patent Application No. 17195869.7.
Mar. 7, 2019 International Search Report issued in International Patent Application No. PCT/EP2018/077787.
Apr. 14, 2020 International Preliminary Report on Patentability issued in International Patent Application No. PCT/EP2018/077787.
Mar. 23, 2021 Office Action issued in European Patent Application No. 18785952.5.

* cited by examiner

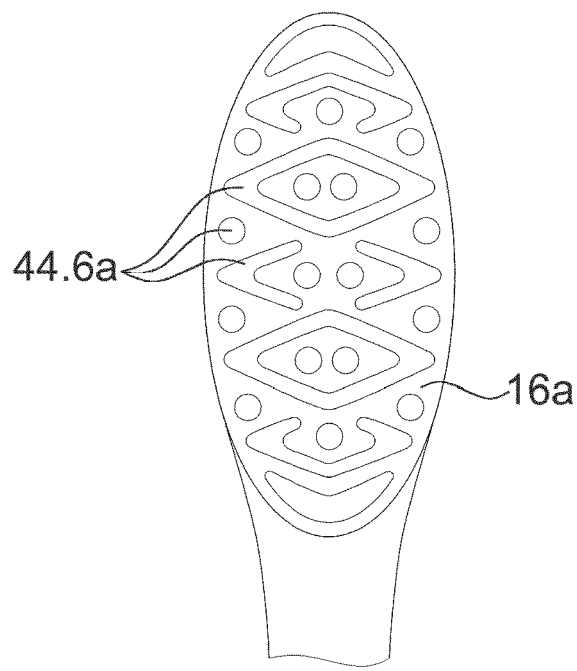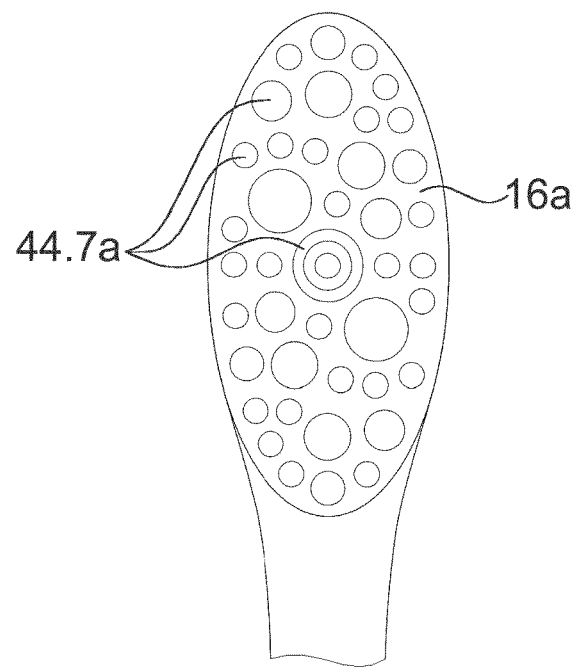
Fig. 28            Fig. 29
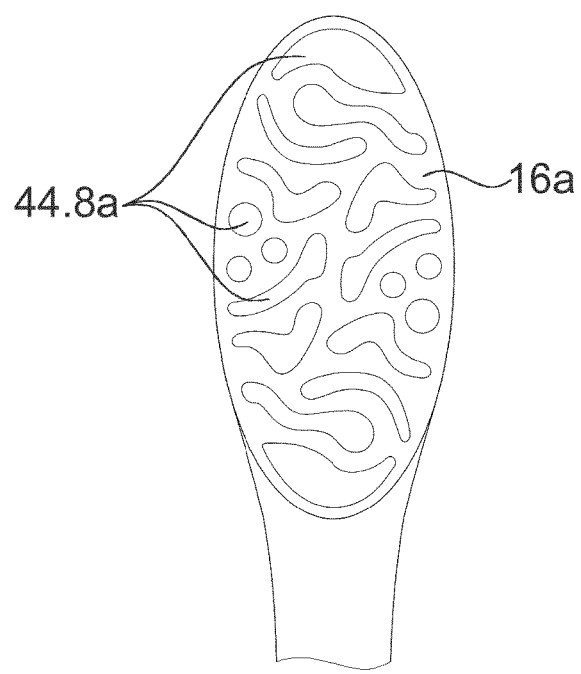
Fig. 30

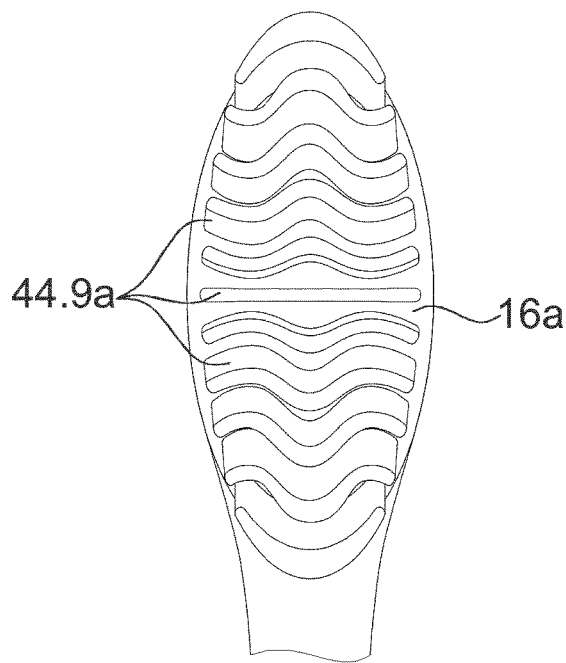
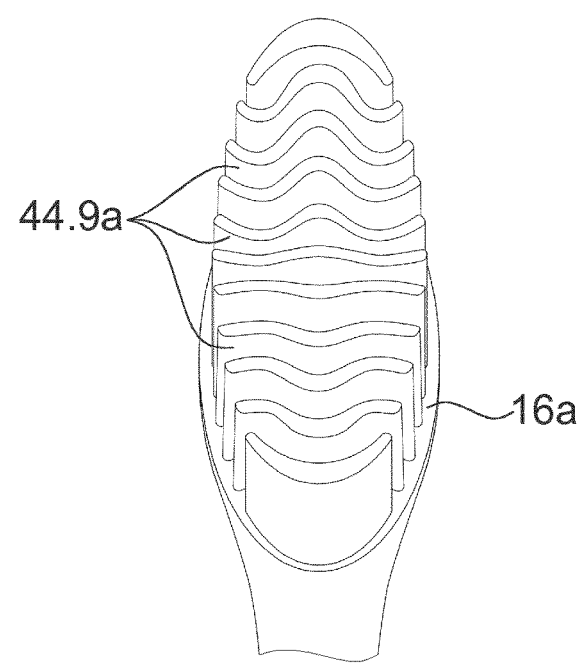
Fig. 31a            Fig. 31b
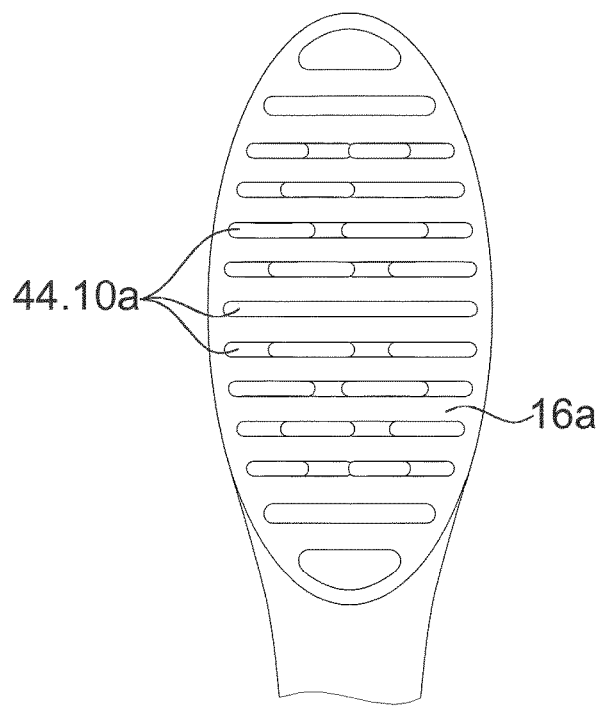
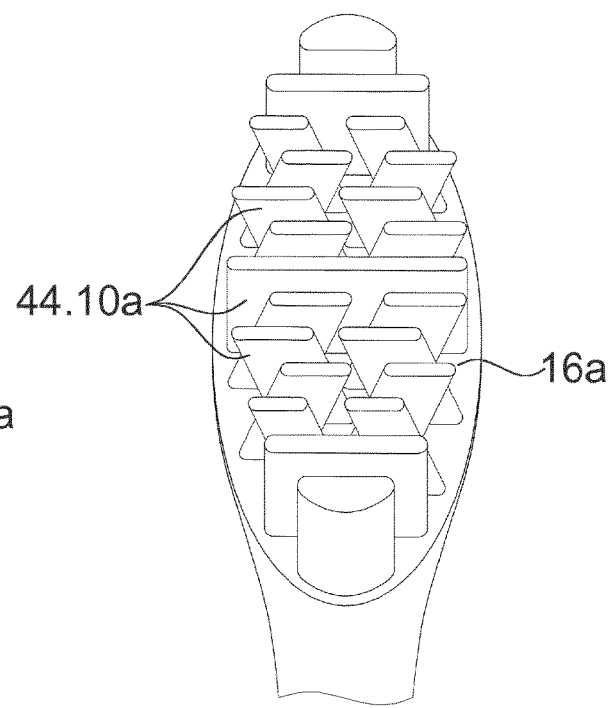
Fig. 32a            Fig. 32b

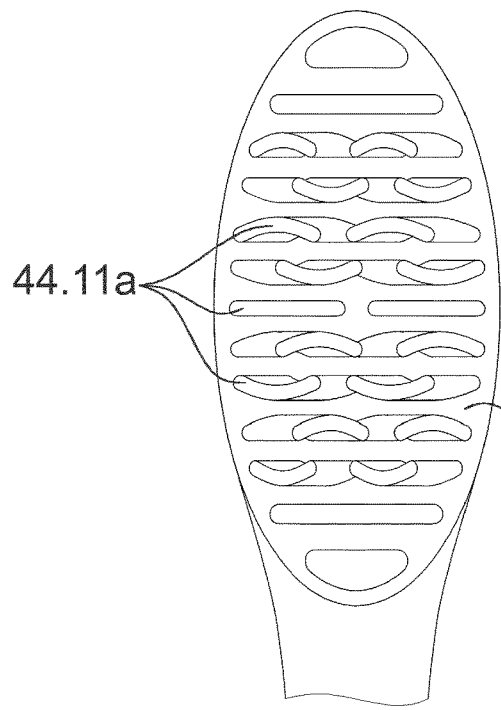
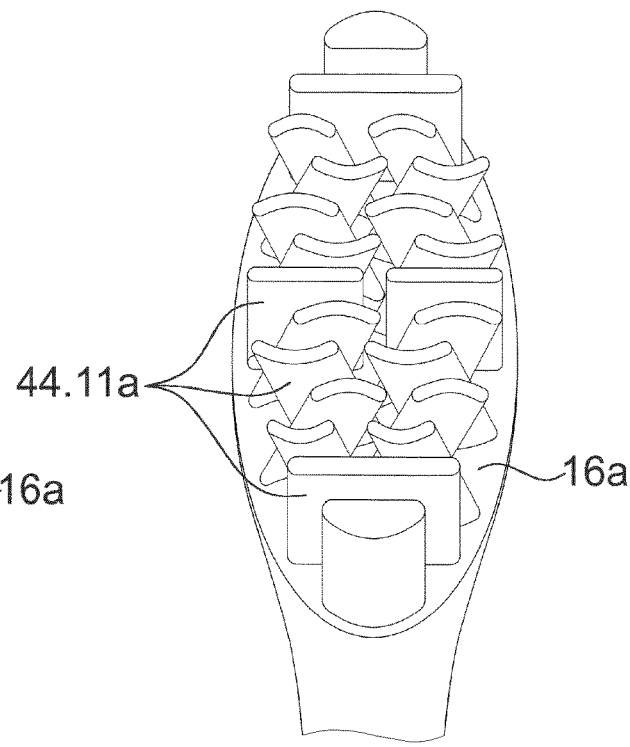
Fig. 33a Fig. 33b
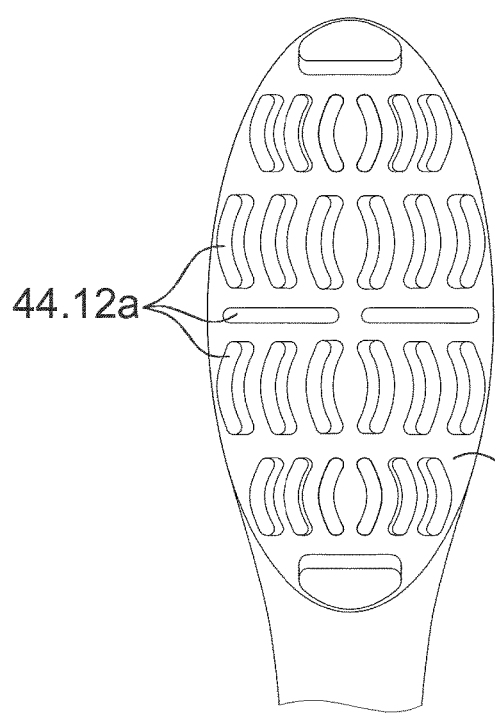
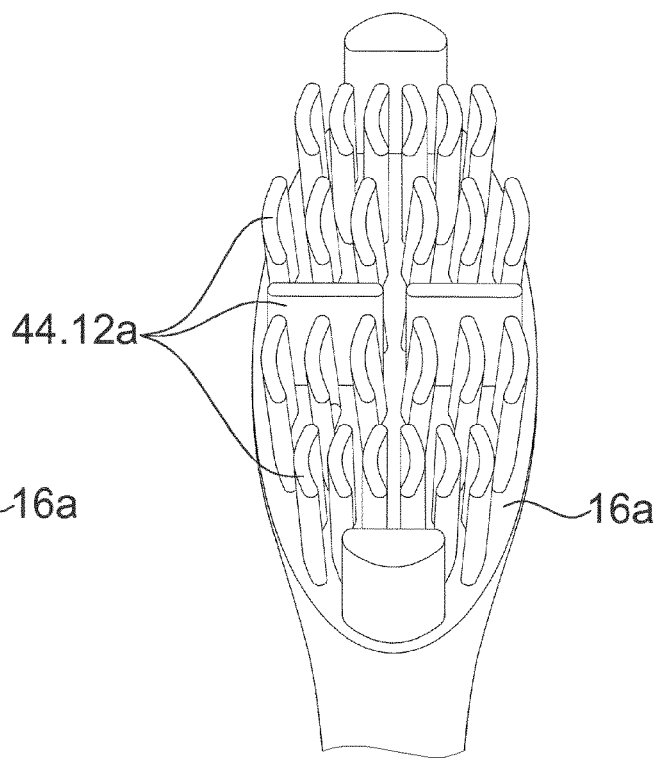
Fig. 34a Fig. 34b

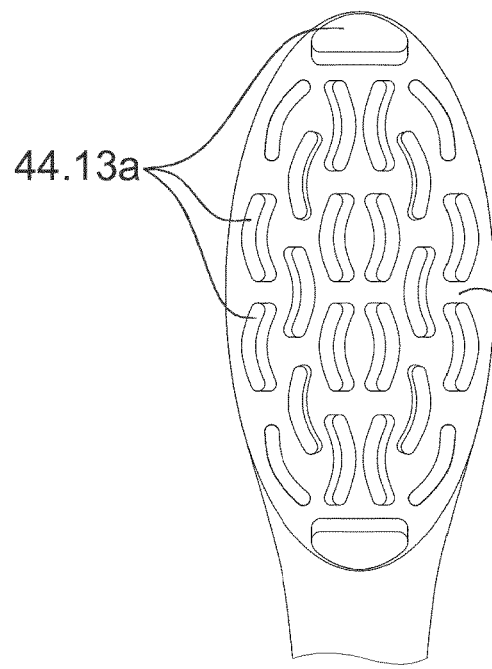
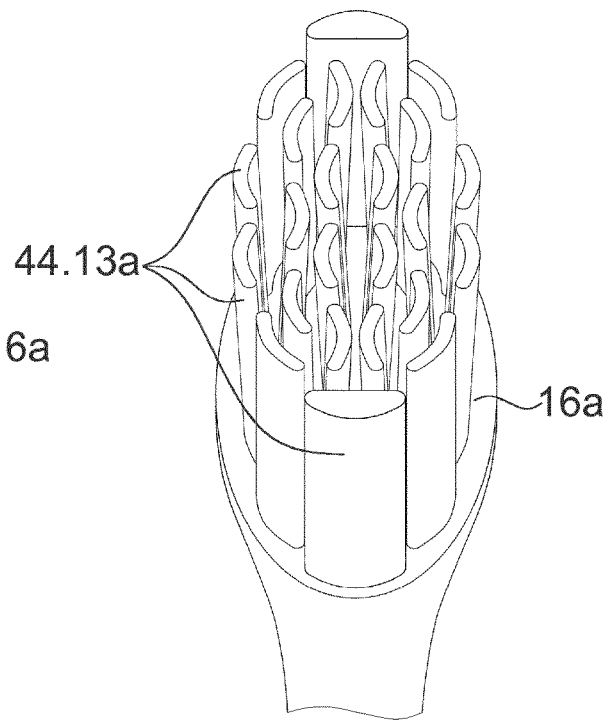
Fig. 35a  Fig. 35b
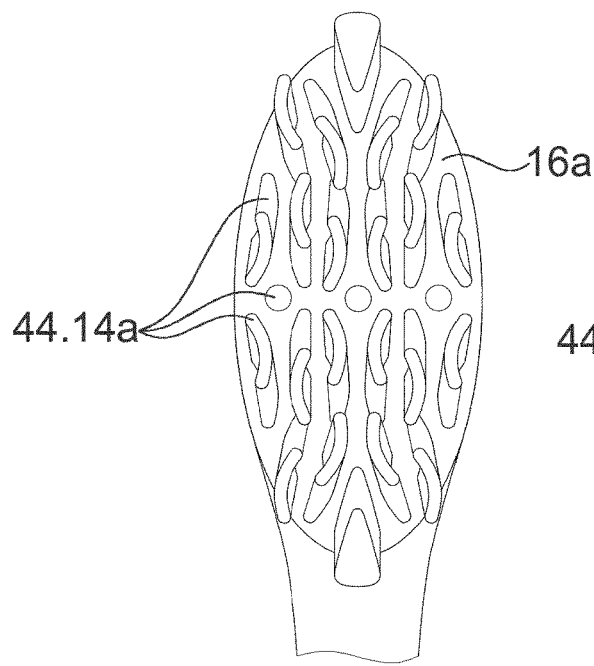
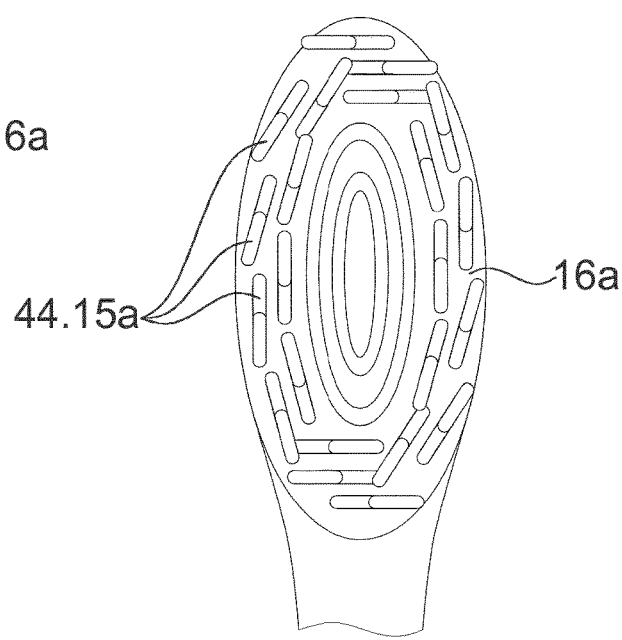
Fig. 36  Fig. 37

BRUSH ATTACHMENT, ELECTRIC TOOTHBRUSH HANDPIECE AND ELECTRIC TOOTHBRUSH COMPRISING THE ELECTRIC TOOTHBRUSH HANDPIECE AND THE BRUSH ATTACHMENT

PRIOR ART

The invention relates to a brush attachment for a toothbrush handpiece, to an electric toothbrush handpiece, and to an electric toothbrush having the electric toothbrush handpiece and the brush attachment.

Brush attachments for a toothbrush handpiece, electric toothbrush handpieces and electric toothbrushes have already been proposed, for example in CN 201966781 U, DE 10 2012 006 723 A1, EP 0 893 106 A2, EP 2 234 561 B1, U.S. Pat. No. 9,237,943 B2, US 2002/056402 A1 and WO 95/33419 A1.

US 2011/0107536 A1 has already disclosed a brush attachment for a toothbrush handpiece, having a head portion which comprises a brush head, having an attachment portion which comprises an interface receptacle, and having a neck portion arranged between the head portion and the attachment portion.

JP 2012-165954 A has already disclosed an electric toothbrush handpiece having at least one interface for coupling to a brush attachment, having at least one housing, having at least one drive unit for driving the interface, which is received in the housing, and having at least one energy store for supplying energy to the drive unit.

The problem addressed by the invention consists in particular in achieving advantageous characteristics with regard to a variable and/or easily assemblable and/or advantageously compact design and/or an efficient transmission of movement from the drive to the brush attachment and/or inexpensive producibility and/or high cleaning performance with low potential for injury. The problem is solved according to the invention by means of the features of patent claims 1, 12, 26 and 27, while advantageous embodiments and refinements of the invention emerge from the subclaims.

Advantages of the Invention

The invention proceeds from a brush attachment for a toothbrush handpiece, in particular for an electric toothbrush handpiece, having a head portion which comprises a brush head, having an attachment portion which comprises an interface receptacle, and having a neck portion arranged between the head portion and the attachment portion.

It is proposed that the interface receptacle is implemented by a universal interface receptacle for receiving at least two different interfaces of different toothbrush handpieces. The interface receptacle preferably fits onto interfaces of different shape and/or dimensions. Preferably, the interface receptacle can in particular be used together with different toothbrush handpieces. Furthermore, the brush attachment is advantageously composed of exactly three portions, specifically the head portion, the neck portion and the attachment portion. The portions advantageously directly adjoin one another. It would however also be conceivable for the portions to partially overlap.

In this context, an "interface receptacle" is to be understood in particular to mean a receptacle region of the brush attachment which is configured for captively receiving an interface, in particular a spindle of the interface, of the toothbrush handpiece. Preferably, the interface receptacle is configured in particular for receiving the interface in non-positively and/or positively locking fashion. In particular, the interface receptacle forms a receptacle region into which the interface of the toothbrush handpiece can be pushed, wherein the interface engages with detent and/or jamming action in the receptacle region in particular when a pushing-in force exceeds a defined value. The interface receptacle is preferably arranged on a side of the brush attachment which is averted from the brush head. Furthermore, in this context, a "universal interface receptacle" is to be understood in particular to mean an interface receptacle which is suitable for receiving at least two different interfaces. This is preferably to be understood in particular to mean an interface receptacle which is suitable for captively receiving at least two, in particular defined, differently shaped and/or differently dimensioned interfaces. It is preferable here if at least the spindles of the interfaces are of different shape and/or different dimensions. This is particularly preferably to be understood in particular to mean an interface which is suitable for captively receiving at least two, in particular defined, differently shaped and/or differently dimensioned interfaces, wherein a holding force for securing the interfaces is at least approximately identical. "Configured" is in particular to mean specifically programmed, designed and/or equipped. The statement that an object is configured for a particular function is to be understood in particular to mean that the object fulfills and/or performs said particular function in at least one state of use and/or operation.

Owing to the embodiment according to the invention of the brush attachment, the brush attachment can be utilized in particular for different toothbrush handpieces. It is possible in particular to realize universal use of the brush attachment. In this way, it is possible in particular to provide a brush attachment which can be used in an advantageously variable and versatile manner.

It is furthermore proposed that the brush attachment has a supporting base body which at least partially adjoins the interface receptacle and which has at least one clamping unit which is configured for being elastically deflected for the purposes of receiving an interface of a toothbrush handpiece. The supporting base body preferably delimits at least a major part of the interface receptacle. In this way, it is possible in particular to achieve that an interface of a toothbrush handpiece is received in an advantageously positively and/or non-positively locking manner. Preferably, it is thus possible in particular to realize a variable adaptation of a shape of the interface receptacle to the interface. In this way, it is possible in particular to enable different interfaces to be received. in this context, a "supporting base body" is to be understood in particular to mean a component which forms a supporting structure of the brush attachment. Preferably, the supporting base body is composed of a dimensionally stable material, in particular of a hard component, and extends along a main extent direction of the brush attachment at least over a major part of the brush attachment. The supporting base body is preferably formed by a single-piece component which is configured for stabilizing and connecting the portions of the brush attachment. Here, a "main extent direction" of an object is to be understood in particular to mean a direction which runs parallel to a longest edge of a smallest geometrical rectangular cuboid that just completely encloses the object. Furthermore, here, "as a single piece" is to be understood in particular to mean cohesively connected, for example by means of a welding process and/or adhesive bonding process etc., and particularly advantageously to mean integrally formed, such as by production from one casting and/or by production in a single-component or multi-component injection molding process. Less preferred, but likewise possible in the context of this invention, is positively and/or non-positively locking assembly of two or more components, in particular to form the clamping unit. Furthermore, "at least a major part" is to be understood in particular to mean at least 30%, preferably at least 50% and particularly preferably at least 70% of a delimited outer surface of the interface receptacle. In this context, a "clamping unit" is to be understood in particular to mean a unit with at least one clamping element which, during a fastening process, is elastically deflected in order to subsequently establish a positively and/or non-positively locking connection to the interface by means of an internal clamping force. Here, in this context, a "clamping element" is to be understood in particular to mean a resiliently elastic element for producing a clamping connection, which element is configured for being elastically deflected during an assembly process. Various embodiments of the clamping element which appear expedient to a person skilled in the art are conceivable, for example in the form of a clamping wall and/or clamping web.

The base body is preferably produced entirely from one material. The base body is preferably composed of a hard component. In the context of this disclosure, use may be made of virtually any hard components, which a person skilled in the art will combine and/or select in a manner suited to the purpose. As a hard component, use may be made for example of Styrene polymers such as styrene acrylonitrile (SAN), polystyrene (PS), acrylonitrile butadiene styrene (ABS), styrene methyl methacrylate (SMMA), styrene butadiene (SB) or the like. Furthermore, a hard component may comprise polyolefins such as polypropylene (PP), polyethylene (PE) or the like, in particular also in the form of high-density polyethylene (HDPE) or low-density polyethylene (LDPE). Furthermore, use may be made of polyesters such as for example polyethylene terephthalate (PET), in particular in the form of acid-modified polyethylene terephthalate (PETA), glycol-modified polyethylene terephthalate (PETG), polybutylene terephthalate (PBT), acid-modified poly cyclohexylene dimethylene terephthalate (PCT-A), glycol-modified polycyclohexylene dimethylene terephthalate (PCT-G) or the like. Also conceivable is use of cellulose derivatives such as for example cellulose acetate (CA), cellulose acetobutyrate (CAB), cellulose propionate (CP), cellulose acetate phthalate (CAP), cellulose butyrate (CB) or the like. Furthermore, a hard component may for example comprise polyamides (PA) such as PA 6.6, PA 6.10, PA 6.12 or the like, polymethyl methacrylate (PMMA), polycarbonate (PC), polyoxymethylene (POM), polyvinyl chloride (PVC), polyurethane (PUR), polyimide (PA) or the like. In particular polyethylene (PE) and/or polyurethane (PU) may be used as a hard component and/or as a soft component. In particular, a hard component has a modulus of elasticity of at least 1000 N/mm$^2$ and advantageously of at least 1300 N/mm$^2$ and/or of at most 2400 N/mm$^2$ and advantageously of at most 1800 N/mm$^2$. Preferably, the brush attachment has a single base body which may be formed from one of the stated materials or else from a mixture thereof. However, combinations of different hard components are also conceivable, wherein these may for example be processed in a two-component and/or multi-component injection molding process and/or adhesively bonded to one another and/or assembled together and/or welded to one another, in particular by ultrasound welding. Alternatively or in addition, multiple hard components may be used which do not form a material connection in a two-component and/or multi-component injection molding process. In particular, it is conceivable that, in this case, positive locking is generated between hard components, for example in the form of at least one undercut and/or at least one aperture and/or at least one at least partial non-detachable overmold or the like. It is conceivable here that, for example, a second hard component, which is in particular injection-molded onto a first hard component, shrinks and/or contracts after an injection molding process and advantageously forms a shrinkage connection. Suitable combinations may for example be polypropylene-polyester, polypropylene-styrene acrylonitrile or other combinations.

It is furthermore proposed that the clamping unit has at least one at least partially freestanding clamping wall which directly adjoins the interface receptacle. In this way, it is in particular possible to provide an advantageous clamping unit. In this way, preferably an advantageously large-area clamping surface can be provided in particular. In this way, in particular, an advantageously large-area force distribution can be achieved. In this context, an "at least partially freestanding clamping wall" is to be understood in particular to mean a clamping wall which is at least partially freestanding in relation to a remaining part of the base body. It is particularly preferable if, in at least one cross-sectional plane, the clamping wall, over at least a major part of an outer surface, has no attachment to a remaining part of the base body. It is particularly preferable if the clamping wall, over at least a major part of its extent parallel to the main extent direction of the brush attachment, in each case in a plane perpendicular to the main extent direction, has no attachment to a remaining part of the base body over a major part of an outer surface. This is particularly preferably to be understood in particular to mean a freestanding wall which is connected only at the ends and at a bottom side to the remaining part of the base body.

It is furthermore proposed that the clamping unit has at least two at least partially freestanding clamping walls which directly adjoin the interface receptacle on opposite sides. The clamping walls preferably at least partially form in each case one side wall of the interface receptacle. In this way, it is possible in particular for a clamping force to be applied in an advantageously uniform manner. Furthermore, it is possible in particular to provide an advantageous clamping unit. In this way, preferably an advantageously large-area clamping surface can be provided in particular. In this way, in particular, an advantageously large-area force distribution can be achieved.

It is furthermore proposed that the clamping unit has at least one at least partially freestanding clamping bridge which directly adjoins the interface receptacle. In this way, it is possible in particular to provide an advantageous clamping unit. In this way, preferably an advantageously large-area clamping surface can be provided in particular. In this way, in particular, an advantageously large-area force distribution can be achieved. In this context, an "at least partially freestanding clamping bridge" is to be understood in particular to mean a clamping bridge which is at least partially freestanding in relation to a remaining part of the base body. It is preferable if, in at least one cross-sectional plane, the clamping bridge, over at least a major part of an outer surface, has no attachment to a remaining part of the base body. It is particularly preferable if the clamping bridge, over at least a major part of its extent parallel to the main extent direction of the brush attachment, in each case in a plane perpendicular to the main extent direction, has no attachment to a remaining part of the base body over a major part of an outer surface. This is particularly preferably to be understood in particular to mean a freestanding bridge which is connected only at the ends, in particular on the side of the brush head and on the side of the opening of the interface receptacle, to the remaining part of the base body.

It is furthermore proposed that the clamping unit has at least one at least partially freestanding clamping bridge. It is furthermore proposed that the clamping bridge is arranged so as to be offset by at least approximately 90° with respect to at least one clamping wall. It is furthermore proposed that the clamping bridge is arranged between two clamping walls. The clamping bridge preferably at least partially forms a side wall of the interface receptacle. In this way, it is possible in particular for a clamping force to be applied in an advantageously uniform manner. Furthermore, it is possible in particular to provide an advantageous clamping unit. In this way, preferably an advantageously large-area clamping surface can be provided in particular. In this way, in particular, an advantageously large-area force distribution is achievable.

Preferably, the clamping unit furthermore has a clamping elevation which projects at least partially into the interface receptacle. The clamping elevation is formed in particular by an elevation on an inner wall, which delimits the interface receptacle, of the base body. For the purposes of demoldability, the clamping elevation preferably extends axially as far as an end of the interface receptacle. The clamping elevation has in particular an axial length of 4 mm to 8 mm, preferably of 5 mm to 7 mm. Furthermore, the clamping elevation has in particular a width of 0.7 mm to 1.8 mm, preferably of 1 mm to 1.5 mm, and a height of 0.04 mm to 0.5 mm, preferably of 0.06 mm to 0.3 mm. A pulling-off force of the brush attachment can preferably be set through adaptation of a height of the clamping elevation. The clamping elevation therefore serves in particular for enabling the retention force to be set and for clamping a spindle of an interface of a toothbrush handpiece in the interface receptacle.

It is furthermore proposed that the brush attachment has an overmold which is composed of a different material than the base body and which directly encloses at least a major part of the at least one clamping wall and/or the at least one clamping bridge in at least one plane. The materials preferably have different hardnesses and coefficients of friction. It is preferable if the overmold directly encloses at least a major part of the at least one clamping wall and the one clamping bridge in at least one plane perpendicular to a main extent direction of the brush attachment. The overmold encloses the clamping wall in particular to at least two sides and/or encloses the clamping bridge to three sides. Preferably, the clamping wall has at least three sides which are free from a remaining part of the base body, wherein one side in particular delimits the interface receptacle and two sides are directly enclosed by the overmold. The clamping bridge has at least four sides which are free from a remaining part of the base body, wherein one side in particular delimits the interface receptacle and three sides are directly enclosed by the overmold. It is particularly preferable if a side of the at least one clamping wall which is averted from the interface receptacle is back-molded. An elasticity of the clamping wall can be further improved in this way. The elasticity of the clamping bridge is improved by virtue of this being over-molded on the outer side. In particular, an elastic deflection of the clamping wall or of the clamping bridge can be at least partially dampened. In this way, a reliability of the clamping unit can be further improved. Furthermore, here, "at least a major part" is to be understood in particular to mean at least 20%, preferably at least 40% and particularly preferably at least 60% of an outer surface of the clamping wall. Instead of an overmold, the second material may less preferably also be installed and thus perform the same function.

The overmold or back-molding is preferably produced entirely from one material. The overmold is preferably composed of a soft component. In the context of this disclosure, use may be made of virtually any soft components, which a person skilled in the art will combine and/or select in a manner suited to the purpose. As soft components, use may for example be made of thermoplastic styrene elastomers (TPE-S) such as a styrene ethylene butylene styrene copolymer (SEBS), a styrene butadiene styrene copolymer (SBS) or the like. Also conceivable is the use of thermoplastic polyurethane elastomers (TPE-U), thermoplastic polyamide elastomers (TPE-A), thermoplastic polyolefin elastomers (TPE-O), thermoplastic polyester elastomers (TPE-E), polyethylene (PE), polyurethane (PU) or the like. Furthermore, a soft component may for example comprise at least one silicone. A soft component advantageously has a Shore A hardness of at most 90, advantageously of at most 50 and particularly advantageously of at most 30. Preferably, at least one soft component forms at least a material connection with at least one hard component, in particular in at least a two-component and/or multi-component injection molding process, advantageously by means of at least an overmolding and/or injection-molding encapsulation process.

It is preferably possible for further function elements to be formed on the brush attachment by means of the overmold. It would preferably be conceivable for a functional element formed by a tongue cleaner to be formed on a head rear side of the brush attachment by means of the overmold. The tongue cleaner may be provided with a surface structure. Further functional elements that appear expedient to a person skilled in the art are furthermore conceivable. In particular, it would be conceivable for the functional element to be formed as one or more resiliently elastic cleaning elements in the bristle array. Further function elements may be formed by means of the overmold. For example, the brush head may be at least partially overmolded in order to form an impact guard with respect to teeth and gums. Furthermore, holding zones may be formed on the brush attachment by means of the overmold, which holding zones enable the brush attachment to be easily pushed on and pulled off. The holding zones may be provided with a surface structure.

It is furthermore proposed that the interface receptacle has at least one first, at least substantially rectangular-cuboidal partial receptacle region which is at least partially delimited to one side by the at least one clamping wall and/or at least one clamping bridge. Preferably, the first partial receptacle region is delimited to two opposite sides by in each case one clamping wall. Furthermore, the first partial receptacle region is delimited on one side, preferably between in each case one clamping wall, by a clamping bridge. The first partial receptacle region preferably forms a final portion of the interface receptacle, which is configured for receiving a tip of the interface of the toothbrush handpiece. In this way, it is possible in particular to provide an advantageous interface receptacle. It is possible in particular to realize a reliable and secure receptacle of an interface. Furthermore, it can be achieved in particular that clamping on a spindle of the interface of the toothbrush handpiece is realized. In this way, an advantageously reliable transmission of a drive movement to the brush attachment can be achieved. In this context, an "at least substantially rectangular-cuboidal partial receptacle region" is to be understood in particular to mean a partial receptacle region whose volume, in particular whose value of the volume, deviates by at most 40%, preferably at most 20% and particularly preferably at most 10% from a volume, in particular a value of the volume, of a smallest imaginary rectangular cuboid that just completely encloses the partial receptacle region.

It is furthermore proposed that the interface receptacle has at least one second, at least substantially cylindrical partial receptacle region which projects axially at least partially into the first partial receptacle region. In this way, it is possible in particular to realize advantageous shaping of the interface receptacle. The statement that "the second partial receptacle region projects axially at least partially into the first partial receptacle region" is to be understood in particular to mean that the first partial receptacle region and the second partial receptacle region at least partially overlap at least with regard to an axial extent. Preferably, the partial receptacle regions are arranged at least approximately coaxially with respect to one another and form an overlap. Preferably, the interface receptacle comprises at least a union of the first partial receptacle region and the second partial receptacle region. In this context, an "at least substantially cylindrical partial receptacle region" is to be understood in particular to mean a partial receptacle region whose volume, in particular whose value of the volume, deviates by at most 40%, preferably at most 20% and particularly preferably at most 10% from a volume, in particular a value of the volume, of a smallest imaginary cylinder that just completely encloses the partial receptacle region.

It is furthermore proposed that the second pressure receptacle region is arranged so as to axially fully overlap the first partial receptacle region. Preferably, the second partial receptacle region is arranged axially entirely within the first partial receptacle region. Preferably, the second partial receptacle region is arranged in particular at an end of the first partial receptacle region which is averted from the end of the interface receptacle. It is particularly preferable if the second partial receptacle region, in particular on a side facing toward the opening of the interface receptacle, terminates together with the first partial receptacle region. It is preferable if a maximum cross section of the second partial receptacle region perpendicular to a main extent direction of the brush attachment is larger than a corresponding maximum cross section of the first partial receptacle region. In this way, it is possible in particular to realize advantageous shaping of the interface receptacle. The rectangular-cuboidal structure of the first partial receptacle region advantageously at least partially continues in the second partial receptacle region and thus forms a continuous structure.

It is furthermore proposed that the interface receptacle has at least one third, at least substantially frustoconical partial receptacle region which axially directly adjoins the second partial receptacle region. Preferably, the third partial receptacle region has no overlap with the first and/or second partial receptacle region. Preferably, the third partial receptacle region directly adjoins the first partial receptacle region and the second partial receptacle region. The third partial receptacle region adjoins the first partial receptacle region and the second partial receptacle region in particular on a side facing toward the opening of the interface receptacle. Preferably, the interface receptacle forms at least a union of the first partial receptacle region, the second partial receptacle region and the third partial receptacle region. It is preferable if a maximum cross section of the third partial receptacle region perpendicular to a main extent direction of the brush attachment is larger than a corresponding maximum cross section of the second partial receptacle region. In this way, it is possible in particular to realize advantageous shaping of the interface receptacle. In this context, an "at least substantially frustoconical partial receptacle region" is to be understood in particular to mean a partial receptacle region whose volume, in particular whose value of the volume, deviates by at most 40%, preferably at most 20% and particularly preferably at most 10% from a volume, in particular a value of the volume, of a smallest imaginary frustum that just completely encloses the partial receptacle region.

It is furthermore proposed that the first, substantially rectangular-cuboidal partial receptacle region has at least one narrowing at which the partial receptacle region narrows from at least one side. The partial receptacle region preferably narrows radially from at least two sides at the narrowing. The first partial receptacle region preferably has, at at least two sides, an in particular bevelled shoulder which forms the narrowing. The narrowing is preferably arranged axially adjacent, in an insertion direction of the interface, to the at least one clamping wall of the clamping unit. In this way, it is possible in particular to realize advantageous shaping of the interface receptacle. It is possible in particular to realize an advantageously easy insertion of the interface into the interface receptacle. The narrowing may be formed, on one side, on the clamping bridge.

Preferably, the interface receptacle furthermore has a fourth, frustoconical partial receptacle region, the lateral surface of which is coaxially curved. It is preferable if the fourth partial receptacle region, in particular on a side averted from the first partial receptacle region, axially directly adjoins the third partial receptacle region. The fourth partial receptacle region is preferably arranged at least approximately coaxially with respect to the third partial receptacle region. It is particularly preferable if the fourth partial receptacle region, on a side facing toward the opening of the interface receptacle, adjoins the third partial receptacle region. The fourth partial receptacle region forms in particular the opening of the interface receptacle. Preferably, the interface receptacle comprises a union of the first partial receptacle region, the second partial receptacle region, the third partial receptacle region and the fourth partial receptacle region.

The brush attachment preferably has a drip edge in the attachment portion. The drip edge is formed in particular by a hard transition from a bevel of the brush attachment to a rounded profile of the outer skin of the brush attachment. The drip edge particularly preferably forms a radially outermost edge of the brush attachment. The drip edge preferably has a diameter of 12 mm to 20 mm, preferably of 14 mm to 18 mm. The drip edge is particularly preferably formed by a circular edge. In principle, however, a different shaping of the edge that appears to be expedient to a person skilled in the art would also be conceivable. In the case of wide hand parts, the drip edge and the bevel in particular form a termination, whereas, in the case of slim hand parts, the drip edge and the bevel preferably form a transition. Furthermore, by means of the drip edge, it is possible in particular to realize the function whereby, when the brush attachment is standing on a standing surface, liquid advantageously drips off the drip edge. Furthermore, by means of the drip edge, less liquid runs in the direction of the standing surface, and thus, in the installed state, it is also the case that less liquid flows in the direction of the interface. The drip edge may be composed of hard and/or soft components.

The invention furthermore proceeds from a brush attachment for a toothbrush handpiece, in particular for an electric toothbrush handpiece, having a head portion which comprises a brush head, having an attachment portion which comprises an interface receptacle, and having a neck portion arranged between the head portion and the attachment portion. It is proposed that the brush head has a bristle array with at least two significantly differing bristle bundles. The brush head preferably has a multiplicity of significantly differing bristle bundles. In this context, "substantially differing bristle bundles" is to be understood in particular to mean that the at least two bristle bundles differ significantly from one another at least in terms of their shape and/or their orientation. The bristle bundles preferably have a significantly differing shape and/or a significantly differing orientation. In this context, a "significantly differing shape" of the bristle bundles is to be understood in particular to mean that a base area of a first bristle bundle, in particular with any orientation, differs by at least 10%, preferably at least 30% and particularly preferably at least 50%, from a base area of the second bristle bundle. It is preferably the case that at most 80%, preferably at most 60% and particularly preferably at most 40% of an area of the base area of the first bristle bundle and/or of the second bristle bundle forms an overlap when superposed. In this context, a "significantly differing orientation" is to be understood in particular to mean that an orientation of the bristles of a first bristle bundle deviates by at least 10°, preferably at least 20° and particularly preferably at least 30° from an orientation of the bristles of a second bristle bundle. In this way, it is possible in particular to realize advantageous cleaning performance. The bristle bundles are preferably produced in a hot tufting or HT process. Other production methods that appear expedient to a person skilled in the art for producing the bristle bundles are however also conceivable. Specifically for the hot tufting or HT process, the bristle holes in the brush head basically have closed contours as seen in plan view, wherein all possible geometrical shapes may be used. The bristle bundles or their base areas may be of circular, circular-ring-shaped, circular-segment-shaped, star-shaped, triangular, polygonal, rectangular or square etc. form. It is furthermore possible for different bristles to be used in different bristle bundles within one bristle array, or else even within one bristle bundle. The bristle bundles are preferably furthermore of mirror-symmetrical form with respect to a longitudinal axis and/or with respect to the transverse axis of the brush head and/or of point-symmetrical form, preferably with respect to a geometrical central point of the brush head. A topography, that is to say in particular the surface of usage-side bristle ends or cleaning elements, is, within a bristle array, preferably of flat, dome-shaped, trough-shaped, cup-shaped, crenellated, conical and/or row-shaped implementation and/or implemented in the form of logos or letters which are elevated and/or recessed. In the case of a hot tufting or HT process, it is firstly the case that the base body of the brush attachment is injection-molded or molded with blind holes or cutouts in the head region. Subsequently, bristles are provided in bundles and are melted in bundles on the side averted from the usage side. Subsequently, the base body is, in the head portion, warmed approximately to a glass transition temperature. Finally, the molten bristle ends are inserted into the blind holes or cutouts and the bristle bundles are anchored in the bristle head under pressure and with corresponding slight deformation of the base body. Here, the size of the blind holes is reduced, or the geometry is deformed, and the bristle bundles are thus anchored.

Various alternative embodiments and arrangements of bristle bundles of the bristle array are conceivable for the brush head. Here, the brush head may have a bristle array with a multiplicity of, but at least two, significantly differing bristle bundles. Here, the bristle bundles differ in each case with regard to a shape and/or an orientation. In particular, the bristle bundles may have at least different inclined positions. The bristle bundles may each be formed by ridges. The bristle bundles may each be formed by ridges which, in a longitudinal profile, are curved and/or have different lengths. Here, a bend may have various orientations, wherein the bend may face toward or be averted from a central point of the bristle array. The bend may furthermore also extend in a circumferential direction around the bristle array. It is furthermore conceivable for the main extent to have ridges parallel to the longitudinal axis of the toothbrush, wherein the bend of the individual ridges is realized symmetrically with respect to the longitudinal axis of the toothbrush.

Alternatively or in addition, the bristle bundles may at least partially have a ring shape. Furthermore, the bristle bundles may be formed by conventional circular bundles. It is furthermore conceivable for ridge-like bristle bundles to be curved around other bristle bundles. Alternatively or in addition, the bristle bundles may at least partially have an arrow shape, with a tip being directed in a defined direction. In this way, an advantageous cleaning action can be achieved, in particular in the case of use on a sonic toothbrush or a toothbrush with a reciprocating pivoting movement. Alternatively or in addition, the bristle bundles may vary in terms of their size, in particular in terms of their periphery. It is furthermore also conceivable for the bristle bundles to have an open-die form implementation. It is preferably possible here for individual bristle bundles and/or a defined number of multiple bristle bundles to form a specific shape. In particular, multiple bristle bundles together may in each case form the shape of a turbine wheel, wherein the bristle bundles are in each case formed by turbine blades. Alternatively or in addition, the bristle bundles may be formed at least partially by ridges which are of undulating form in a longitudinal profile and/or an end profile. The number of undulation peaks and troughs is in particular variable. It is possible for different undulations to be provided in the same bristle array. It is furthermore conceivable for the ridges to have different inclined positions, wherein the angles of the inclined positions in the bristle bundles relative to a normal of the brush head increase for example toward the front and rear end of the bristle array, and the bristle bundles of the central ridges stand more vertically. Alternatively or in addition, the bristle bundles may be formed at least partially by transversely arranged ridges with an inclined position, which ridges, considered together, form an X shape when the bristle array is viewed in a longitudinal direction. Here, the bristle bundles may in each case have partially different inclined positions. Alternatively or in addition, the bristle bundles may at least partially have an elliptical shape. Here, it is possible in particular for multiple additional bristle bundles to be arranged around the elliptical bristle bundle, which additional bristle bundles have different, in some cases also converging, inclined positions. It is alternatively possible for multiple additional bristle bundles to be arranged around the elliptical bristle bundle, which additional bristle bundles have an open-die form implementation and each form, for example, the shape of a turbine blade. Here, the bristle bundles may in particular be combined and/or arranged in any manner whatsoever.

At least some or all of the bristles are advantageously conventionally extruded bristles. Here, bristles may in particular comprise at least one hard component and/or at least one soft component. Preferably, the bristles are manufactured at least partially or entirely from polyamide (PA) and/or polyester (PBT), wherein any other materials are conceivable. It is furthermore conceivable for at least some of the bristles to have a pointed configuration and/or a variable cross section. The bristles are preferably formed from a single, in particular also mixed, material. Also conceivable, however, are bristles composed of multiple components, in particular material components, which may be producible and/or produced in particular by means of at least one coextrusion process. The bristles may for example be producible and/or produced by means of extrusion, cutting to length and/or reworking. Here, the bristles may be extruded either from one material or from multiple materials, in particular by co-extrusion. In multi-component extrusion processes, it is possible to realize for example 2-component bristles, Stain Devil bristles of Perlon® and/or a combination of PBT with soft components, wherein the soft components form strips in a longitudinal direction of the bristles.

In particular, use may be made of cylindrical bristles, wherein any other cross sections are conceivable, such as for example polygonal, triangular, rectangular, square, elliptical, star-shaped, trapezoidal, parallelogram-shaped, diamond-shaped or any other cross sections. In particular, different bristles may be used in one bristle bundle, or else different bristle bundles, in particular in each case with one particular type of bristles. Here, bristles and/or bristle bundles may be arranged in regular or else irregular fashion. In particular, bristles and/or bristle bundles arranged in groups and/or arranged adjacently may differ, in particular in alternating fashion, with regard to at least one feature, such as for example a length, a diameter, a material, a color, a material hardness, a geometry, a pointed configuration and the like. Preferably, for oral hygiene applications, the bristles have a diameter, in particular perpendicular to the longitudinal axis thereof, of at least 0.075 mm and/or of at most 0.25 mm. The bristles advantageously have a cross-sectional area, in particular perpendicular to their longitudinal axis, of at least 0.002 mm$^2$ and/or of at most 0.2 mm$^2$. In the case of bristles used in the cosmetics sector, for example bristles of an additional application element, use may also be made of thinner bristles and/or bristles with a smaller cross section. In the case of pointed bristles, polyester (PBT) is particularly suitable as a material, wherein a pointed configuration may be generated mechanically and/or chemically. Other materials are however likewise conceivable. The bristles are preferably straight in a longitudinal direction, though corrugated and/or twisted and/or helical and/or rotated bristles are also conceivable, and in particular combinations of different bristles. Furthermore, bristles with a smooth surface are conceivable, as are bristles with a textured surface. Furthermore, the bristle component may also have further material added to it, such as for example abrasive materials, materials which dissolve upon contact with water, and/or materials that release active substances.

Furthermore, the bristles, in particular as bristle bundles, are processed, in particular fastened to the bristle carrier, preferably by means of at least one anchor punching process, an anchor-free tufting (AFT) process, an in-mold tufting (IMT) process or the like. Preferably, the bristle carrier has a multiplicity of bristle receptacles, in particular holes for bristle bundles, which are in particular drilled and/or molded during an injection molding process. In the case of anchor punching, it is for example conceivable for a base body, composed in particular of a hard component, preferably the use element and/or the brush head, to firstly be manufactured by means of an injection molding process, wherein blind holes for bristle bundles are advantageously molded during the injection molding process. Subsequent drilling of blind holes is however self-evidently also conceivable. Preferably, bristles or bristle bundles are subsequently folded and fastened by means of at least one anchor in in each case one blind hole, in particular by being punched in.

Alternatively, as mentioned, anchorless methods are also conceivable, wherein bristles or bristle bundles are advantageously not folded. Bristles or bristle bundles in this case have a length which is approximately halved in relation to an anchor punching process. For example, it is conceivable for bristle bundles to initially be separated, for bristle bundles to be melted, and/or for bristle ends to be overmolded in particular subsequently to the fastening thereof. In this way, it is advantageously possible for bristle bundles to be combined. Here, for example, production by means of in-mold tufting (IMT) is possible, wherein it is advantageously the case that a base body, for example of the brush head and/or of the handle unit and/or of the fastening unit, is molded during the overmolding of the bristle ends. It is likewise conceivable that, in particular in the course of an integrated anchorless production process, bristles are initially overmolded with plates or the like, and said plates are subsequently in turn overmolded, for example in order to form the brush head and/or the handle unit.

It is furthermore conceivable to firstly manufacture bristle plates with passage holes by means of injection molding, through which passage holes bristles are subsequently guided. The bristles are preferably subsequently connected, in particular fused, on a rear side, preferably to one another and/or to the corresponding bristle plate. In this way, bristle plates fitted with bristles can then be welded and/or adhesively bonded to a base body, in particular a brush head, preferably by means of an ultrasound welding process. One known production method that can be mentioned in this context is Boucherie AFT (anchor free tufting), which makes it possible in particular for bristle bundles to be combined.

As a further method for anchorless bristle fitting, consideration may be given to the manufacture, in particular injection molding, of a brush head molded integrally on a handle or of a separate bristle plate with passage holes for bristles. Bristles may subsequently be guided through the passage holes and fused on a rear side, in particular to one another and/or to the brush head. This is preferably followed by overmolding of the fused regions and/or of the brush head, in particular with at least one material component, preferably a soft component. In the case of a bristle plate, this is suitably connected to the brush handle, for example by means of overmolding or welding. Here, use may be made for example of a Boucherie AMR process, which in particular does not make it possible for bristle bundles to be combined, or an AMR+ process, which in particular makes it possible for bristles to be combined.

It is furthermore conceivable to firstly manufacture a brush head with blind holes, for example by means of injection molding and/or by means of drilling of the blind holes. In this case, bristles are combined to form bundles and are melted, and/or connected in some other way, at one end. The brush head is subsequently warmed, in particular to a glass temperature of its material. Bristle bundles can then advantageously be inserted into the blind holes and anchored on the brush head by being pressed on. In particular, the warmed blind holes deform in the process, such that the bristle bundles are anchored therein. For example, a known PTt process from Boucherie (a hot tufting process) is expedient here.

As an alternative or in addition to bristles being punched and/or adhesively bonded on and/or welded on, it is also conceivable for bristles to be molded on and/or for bristles to be twisted in, in particular for interdental brushes. The molded-on bristles may in particular be manufactured together with the usage unit, the handle unit and/or the fastening unit during a multi-component injection molding process, or may be retroactively molded onto a base body of the usage unit.

It is preferably the case that materials of injection-molded bristles do not form a material connection with other soft components and/or hard components of the oral hygiene item during an injection molding process, in particular a two-component and/or multi-component injection molding process. Preferably, injection-molded bristles are rather connected to soft components and/or hard components by means of a positively locking connection, for example by means of at least one undercut and/or by means of an aperture and/or by means of at least one at least partial overmold, wherein, in particular, a shrinkage connection and/or a contraction connection is conceivable. A connection by means of at least one material connection is however also conceivable.

For all of the possible injection molding processes mentioned, a single-component, two-component and/or multi-component injection molding process is basically conceivable. Materials used, in particular different soft components and/or hard components, may in this case be connected in cohesive and/or positively locking fashion, as mentioned. It is also conceivable for articulated connections to be formed by means of suitable injection molding steps. Use may basically be made, for example, of hot runner processes, cold runner processes and/or co-injection processes.

Alternatively or in addition to a cleaning element in the form of a brush head, the brush attachment may also have at least one tongue cleaner and/or at least one cleaning and/or massaging element. These may in each case be formed from a soft component, from a hard component or from a combination of soft and hard components, and/or advantageously producible and/or produced by means of injection molding. Furthermore, various embodiments are conceivable for the bristles of the brush head. The bristles may preferably be formed by injection-molded bristles which, by contrast to conventional extruded bristles, are produced by injection molding. Various materials which appear expedient to a person skilled in the art for injection-molded bristles are conceivable. Preferably, injection-molded bristles are formed at least partially and advantageously entirely from a thermoplastic polyurethane elastomer (TPE-U). Here, the use of a modified polyurethane elastomer (TPE-U) is conceivable, which may in particular be modified with regard to improved flow characteristics and/or fast solidification, in particular fast crystallization, advantageously even at relatively high temperatures. Other materials are however self-evidently also conceivable, for example thermoplastic polyester elastomers (TPE-E), thermoplastic polyamide elastomers (TPE-A) or the like. Materials for injection-molded bristles advantageously have a Shore D hardness of at least 0 and particularly advantageously of at least 30 and/or of at most 100 and advantageously of at most 80. In particular, a Shore hardness of a material of injection-molded bristles is advantageously higher than a Shore hardness of other soft components that are used, for example for handle elements, massaging elements, further cleaning elements or the like. During the injection molding process, in particular the two-component or multi-component injection molding processes, materials for injection-molded bristles generally do not form a material connection with the other soft and/or hard materials used. Consequently, for possible connections to other hard or soft materials, a positively locking connection is provided, for example by means of an undercut and/or in the form of apertures and/or in the form of partial and/or complete overmolds. The material for injection-molded bristles, which is injected second, shrinks as it cools onto the first injected hard or soft material, and then in particular forms a shrinkage connection.

Injection-molded bristles are preferably composed of harder material, in particular with a high Shore hardness, than other injection-molded resiliently elastic cleaning elements, which are generally injection-molded from soft material.

Also basically conceivable is the use of water-soluble polymers, for example for hard components, soft components, injection-molded bristles or other elements of the oral hygiene item. Also, in addition to that mentioned above, water-soluble polymers may also be incorporated as separate elements in the brush head (installation, overmolding, etc.). The water-soluble polymers preferably serve as carriers for oral hygiene agents such as flavors, antibacterial substances, silicates (as described for example in EP 1 639 913 A1).

Consideration may likewise be given to bioplastics, which may be obtained in particular from renewable raw materials. Here, as raw materials, use may be made in particular of corn, hemp, sugar, castor oil, palm oil, potatoes, wheat, sugar cane, rubber, wood, the castor plant/miracle tree and the like. Corresponding possible raw materials could for example be cellulose, starch, lactic acid (PLA), glucose, chitin, chitosan or the like, from which, in particular, corresponding bioplastics can be synthesized.

The use of water-soluble polymers in conjunction with brush attachments on a toothbrush handpiece of the type described below can yield advantages specifically in the field of oral hygiene. The movement of the brush head has the effect that, upon contact with water, or also in the case of a correspondingly supporting touching action, the material is degraded. The movement of the brush attachment causes a movement of the water relative to the water-soluble polymer, and thus more intense wear and/or a more intense release. The released substances can self-evidently also be distributed more effectively, or else further, as a result of the movement.

The invention also proceeds from an electric toothbrush handpiece having at least one interface for coupling to a brush attachment, having at least one housing, having at least one drive unit for driving the interface, which is received in the housing, and having at least one energy store for supplying energy to the drive unit. It is proposed that the electric toothbrush handpiece has at least one fix frame unit which is arranged in the housing and which is in particular implemented as a single piece and which at least partially receives the drive unit and the energy store. Preferably, the frame unit extends axially over the entire drive unit and the entire energy store. The drive unit is preferably formed in particular by a motor. Furthermore, the energy store is formed in particular by an accumulator. In principle, however, a different embodiment of the energy store that appears to be expedient to a person skilled in the art, for example as a battery, would also be conceivable. Preferably the frame unit is in particular configured both for receiving a single energy storage cell, such as in particular an AA energy storage cell, and for receiving three energy storage cells simultaneously, in particular three AAA energy storage cells. Preferably, for three energy storage cells, a frame is provided which receives the three energy storage cells and which fits into a receptacle region of the frame unit for the single energy storage cell.

In this context, a "housing" is in particular to be understood as a protective outer shell of the toothbrush handpiece. The housing preferably encloses a substantial part of the toothbrush handpiece. The housing preferably furthermore has a grip region. The housing preferably forms a handle of the toothbrush handpiece. The housing is preferably formed from a plastics housing. In principle, however, some other material that appears to be expedient to a person skilled in the art would also be conceivable. Furthermore, the housing may be formed both as a single piece and in particular in two-shell form. The housing preferably has parts which are composed at least of a hard component and which have a structure-supporting function. The housing is particularly preferably composed in particular of hard components and soft components, wherein, in particular, handle surfaces and switch surfaces are formed by means of the soft components. The soft components preferably form an overmold of the hard components. Furthermore, in this context, a "fix frame unit" is to be understood in particular to mean a unit which forms a support structure and which is implemented as a single piece and/or which is composed at least only of parts which are fixedly connected to one another. The fix frame unit in particular differs from multiple individual frames which are separate from one another. Preferably, the frame unit forms multiple receptacle regions, in particular at least for the drive unit and the energy store, which receptacle regions are positioned in a defined manner relative to one another in particular both in an assembled state and in an unassembled state of the frame unit. The fix frame unit is in particular configured to form a prefabricated module, which can be fitted/introduced as one piece into the housing.

By means of the embodiment according to the invention of the electric toothbrush handpiece, it is possible in particular to achieve advantageous assembly of the toothbrush handpiece. Preferably, by means of the frame unit, it is possible in particular to preassemble the component into the frame unit. In this way, it is possible in particular for the frame unit to be inserted in fully preassembled form into the housing, whereby assembly errors can be avoided. An installation of cabling of the electric toothbrush handpiece, in particular at least of the drive unit and of the energy store, can preferably be performed, preferably entirely, outside the housing.

It is furthermore proposed that the electric toothbrush handpiece has at least one charging coil for charging the energy store, which at least one charging coil is received in the fix frame unit. Alternatively, a separate frame unit of the charging coil may be formed, which can be installed on the frame unit. Here, the installation may take the form of a plugging-on process, screwing-on process, adhesive bonding process etc. The frame unit of the charging coil carries within it the charging coil and also a compensation element, which is pressed by the charging coil against the energy store. Thus, length tolerances are compensated, and shocks, for example if the toothbrush is dropped, are absorbed. The frame unit preferably has a receptacle region for positionally fixedly receiving the charging coil, in particular at least relative to the energy store and/or the drive unit. In this way, it is possible in particular to realize an advantageously exact orientation of the components of the toothbrush handpiece relative to one another. Furthermore, an advantageously simple assembly process can be realized in this way. In particular, it can be achieved that the frame unit can be inserted in fully preassembled form into the housing. In this context, a "charging coil" is to be understood in particular to mean an induction coil for wireless energy transmission. Preferably, in a charging state, a voltage is induced in the charging coil by means of a changing magnetic field, by means of which voltage the energy store can be charged.

It is furthermore proposed that the electric toothbrush handpiece has a circuit board for control of the drive unit, which circuit board is at least partially received in positively locking fashion by the frame unit and extends at least over a major part of an axial extent of the frame unit. Preferably, the circuit board extends over at least 50%, preferably over at least 70% and particularly preferably over at least 90% of an axial extent of the frame unit. The frame unit preferably has an axial extent of at least 130 mm, preferably of at least 140 mm and preferably of at most 200 mm and particularly preferably of at most 170 mm. Furthermore, the frame unit has in particular a width of at least 10 mm, preferably of at least 13 mm and preferably of at most 30 mm, particularly preferably of at most 25 mm. Furthermore, the frame unit also has in particular a height of at least 15 mm, preferably of at least 18 mm and preferably of at most 35 mm, particularly preferably of at most 28 mm. The circuit board is preferably held in positively locking fashion on the frame unit in particular by means of holding clips of the frame unit. The circuit board is particularly preferably formed by a printed circuit board. Some other embodiment of the circuit board which appears expedient to a person skilled in the art would however also be conceivable. The circuit board preferably forms an open-loop and/or closed-loop control unit and/or an operator control unit of the toothbrush handpiece. The circuit board is in particular configured for connecting and controlling the electrical functional elements of the toothbrush handpiece. In particular, a large-area circuit board can be provided in this way. In particular, an advantageous attachment to the circuit board can be made possible in this way. It is preferably thus possible to achieve in particular a complete integration of the electrically functional parts into the frame unit. An "open-loop and/or closed-loop control unit" is to be understood in particular to mean a unit with at least one set of control electronics. A "set of control electronics" is to be understood in particular to mean a unit with at least one electronic circuit, which is preferably composed of voltage and comparison control components. The set of control electronics may however basically also be of more complex construction, for example through the use of a processor unit and a memory unit and with an operating program stored in the memory unit.

To receive the circuit board in positively locking fashion, the frame unit preferably has at least two hook-shaped positive-locking elements, which are configured for partially engaging over the circuit board in an installed state. For an installation process, the circuit board particularly preferably has, on an outer edge, recesses which corresponds to the positive-locking elements and via which the circuit board can, for installation thereof, be moved past the positive-locking elements into an end position. During an installation process, the circuit board is preferably mounted onto the frame unit in a manner offset with respect to a final position, wherein the circuit board can be guided past the positive-locking elements by means of the recesses. The circuit board is subsequently in particular pushed under the positive-locking elements and thereby fixed. The positive-locking elements preferably additionally serve as hold-down means, which hold the circuit board in non-positively locking fashion.

It is furthermore proposed that the drive unit has at least one rotor which comprises at least one cage element, which at least one cage element is implemented as a single piece and has at least one receptacle region for receiving at least one magnet. The cage element preferably comprises at least two receptacle regions, which are each configured for receiving one magnet. The magnets are preferably each formed by a permanent magnet. Some other embodiment of the magnets that appears expedient to a person skilled in the art would however basically also be conceivable. Preferably the rotor is in particular configured for performing an oscillating movement. The rotor is particularly preferably coupled in particular to the interface, preferably to a spindle of the interface, which is configured for transmitting a drive movement to a brush attachment. In this way, it is possible in particular to provide an advantageous rotor. Preferably, in this way, it is possible in particular for a rotor to be provided which is configured for directly receiving the at least one magnet. In this way, it is possible in particular for a number of components to be advantageously kept low. In this context, a "cage element" is in particular to mean an element which is configured for receiving the at least one magnet by engaging around the latter. The cage element preferably forms in particular a receptacle region which, in at least one plane, is completely enclosed by the material of the cage element.

It is furthermore proposed that the cage element has a base body, which comprises at least one receptacle region for the at least one magnet, and spindle projections, which are arranged on both sides of the base body and which form a rotary spindle of the rotor. The base body preferably comprises at least two receptacle regions arranged adjacent to one another. The spindle projections preferably serve in particular for mounting of the cage element in the frame unit. The base body of the cage element is preferably mounted rotatably on the frame unit by means of the spindle projections. It is particularly preferable if at least one of the spindle projections furthermore serves for a transmission of a drive movement of the base body to the interface. One of the spindle projections is preferably coupled directly to a spindle of the interface. In this way, it is possible in particular to realize advantageous mounting of the cage element. Furthermore, it is in particular possible for a number of components to be kept low. It is furthermore possible to realize advantageously simple and fast assembly of the toothbrush handpiece. In this context, a "spindle of the interface" is to be understood in particular to mean a shaft which projects out of a housing of the toothbrush handpiece and which is configured for directly transmitting a drive movement of the drive unit of the toothbrush handpiece to the brush attachment. The spindle of the interface is preferably formed in particular by a metal shaft. Some other embodiment of the spindle that appears expedient to a person skilled in the art would however basically also be conceivable. The cage element is preferably formed from a hard component.

It is furthermore proposed that the rotor has at least one metallic cover which is configured for closing off the receptacle region of the cage element. The receptacle region of the cage element is preferably open to at least one side, preferably to at least two opposite sides. The rotor preferably has in particular two covers which are connected to the base body of the cage element from opposite sides and cover the open sides of the receptacle regions. The covers are particularly preferably screwed or adhesively bonded to the cage element. Furthermore, the covers may be fixed by means of geometric elements. For example, with an insertion geometry at one end and with one or more hook-shaped positive-locking elements at the other sides. The fixing by means of the hook-shaped positive-locking elements may also occur only at the end situated opposite the insertion geometry, if the covers come to lie in a depression which prevents lateral displacement by means of its side walls. In this way, it is possible in particular to achieve that the at least one magnet is received in an advantageously secure manner. It is preferably possible in this way in particular to realize that the magnet is received in an advantageously positionally accurate manner, and to realize an improved distribution of the magnetic field. It is furthermore possible to realize advantageously simple and easy assembly of the toothbrush handpiece.

It is furthermore proposed that the drive unit has at least one resetting spring which, by way of a first end, is coupled rotationally conjointly to a first spindle projection of the rotor and, by way of a second end, is fixed in a variable rotationally fixed manner by means of a fixing element to the frame unit. The resetting spring preferably engages with a first end into a groove of the first spindle projection of the cage element, which groove runs radially through an axis of rotation of the rotor. The resetting spring is preferably formed in particular by a helical spring. Some other embodiment of the resetting spring that appears expedient to a person skilled in the art, for example in the form of a spiral spring or leaf spring, would however also be conceivable. It is thus possible in particular advantageously to realize an automatic resetting of the rotor. In particular, it can be achieved that the spindle of the interface always comes to a standstill in the same position. In this way, it is possible to realize easy, consistent installation of the brush attachment, whereby a high level of convenience can be achieved. Furthermore, a resetting position can advantageously be optimally set. Production differences can thus advantageously be compensated. Furthermore, a readjustment of the initial position is possible. In this way, it is possible in particular to realize improved positioning of the rotor in a rest position. Furthermore, it is advantageously possible to provide a smooth-running drive unit. In this context, a "resetting spring" is to be understood in particular to mean a spring element which is configured for moving the rotor back into a defined initial position after a rotation. The spring element is preferably furthermore configured for damping the oscillating movement of the rotor. In particular, the resetting spring is configured for moving the spindle of the interface into an initial position after the drive unit has been switched off. Furthermore, in this context, a "fixing element" is to be understood in particular to mean an element which is configured for fixing, in particular clamping, an end of the resetting spring relative to a fixed component, such as in particular the frame unit. Preferably, the fixing element is in particular configured for fixing the second end of the resetting spring by pressing the end against the frame unit. The second end of the resetting spring can preferably be fixed in different positions. Here, the statement that "the resetting spring is fixed in a variable rotationally fixed manner to the frame unit" is to be understood in particular to mean that the resetting spring is fixed in a variable rotationally fixed manner to the frame unit at least with regard to a rotational position. This is preferably to be understood in particular to mean that the resetting spring is designed to be fixable, in particular by means of the fixing element, in a rotationally fixed manner to the frame unit in different rotational positions relative to the frame unit. In particular, by means of the fixing element, an overall rotational position of the resetting spring relative to the frame unit can be set. In particular, it is possible for an initial position of the rotor relative to the frame unit to be indirectly set. Furthermore, a "spring element" is to be understood in particular to mean a macroscopic element which has at least an extent and/or a relative rotational position of the ends which, in a normal operating state, is elastically variable by at least 10%, in particular by at least 20%, preferably by at least 30% and particularly advantageously by at least 50%, and which in particular generates an opposing force which is dependent on a variation of the extent and/or of the relative rotational position and which is preferably proportional to the variation and which counteracts the variation. An "extent" of an element is to be understood in particular to mean a maximum spacing of two points of a vertical projection of the element onto a plane. A "macroscopic element" is to be understood in particular to mean an element with an extent of at least 1 mm, in particular of at least 5 mm and preferably of at least 10 mm.

Alternatively, it is furthermore proposed that the drive unit has a resetting unit which is of two-part construction and which is configured for resetting a rotor into an initial position. Preferably, the resetting unit is configured for subjecting the rotor to an opposing resetting force during a deflection out of the initial position. The resetting unit is preferably configured for moving the rotor back into a defined initial position after a rotation. It is preferably proposed that the resetting unit is coupled rotationally conjointly to a first spindle projection of the rotor and is supported elastically on the frame unit. It is furthermore proposed that the resetting unit has a shaft wing which is installed directly, in particular axially, on a first axial projection of the rotor. The resetting unit, in particular the shaft wing of the resetting unit, is fitted with its opening in particular on a first spindle projection of the rotor, and thereby coupled to the latter. The shaft wing preferably has two oppositely situated wings which run perpendicular to an axis of rotation and which are in particular each formed by a rectangular projection. The wings are in particular each equipped with a passage hole. The wings, which lie perpendicular to the spindle projection, are preferably fixed to the frame unit by means of a spring and damping element. It is preferably proposed that the resetting unit has an elastic spring and damping element which is arranged between the shaft wing and the frame unit. The resetting unit is composed in particular of the shaft wing and the spring and damping element. Preferably, the shaft wing engages by way of its opening into a geometry, which is of dovetail shape in cross section, of the first spindle projection of the cage element. The resetting action is preferably generated by means of the spring and damping element, which engages through passage or blind holes into the wings of the shaft wing and lies at the other side on the frame element. The elasticity of the spring and damping element provides the desired resetting and/or spring action. The elastic spring and damping element is configured for generating a resetting force in particular in the event of a deflection of the shaft wing, in particular at least in a circumferential direction, out of a rest position. In this context, a "shaft wing" is to be understood in particular to mean a shaft attachment which is in particular configured for coupling rotationally conjointly to a shaft, in particular to the rotor of the drive unit. The shaft wing preferably has an at least substantially rotationally symmetrical base body, on which there are arranged oppositely situated wings, which are configured for supporting the base body. The shaft wing is preferably configured at least partially for performing a rotational movement. In this context, a "spring and damping element" is to be understood in particular to mean an elastic element which is configured for moving the rotor back into a defined initial position after a rotation. The elastic element is preferably furthermore configured for damping the oscillating movement of the rotor. In particular, the spring and damping element is configured for moving the spindle of the interface into an initial position after the drive unit has been switched off. It is thus possible in particular to advantageously to realize an automatic resetting of the rotor. In particular, it can be achieved that the spindle of the interface always comes to a standstill in the same position. In this way, it is possible to realize easy, consistent installation of the brush attachment, whereby a high level of convenience can be achieved. The spring and damping element is preferably furthermore configured for damping the oscillating movement of the rotor. In particular, the resetting unit is configured for moving the spindle of the interface into an initial position after the drive unit has been switched off. With this arrangement, the orientation of the rotational position is not possible.

It is furthermore proposed that the elastic spring and damping element is fixedly connected to the shaft wing. The elastic spring and damping element is preferably connected fixedly to the shaft wing by means of a plug-in connection. The elastic spring and damping element and the shaft wing form the resetting unit, wherein the resetting unit in particular lies only against the frame unit. The shaft wing lies against the frame unit in particular via the spring and damping element. It is furthermore proposed that the elastic spring and damping element, in an installed state, has a preload in relation to the frame unit, wherein the frame unit forms a support surface for the spring and damping element. The elastic spring and damping element is preferably composed at least partially of a soft component, in particular of silicone, whereas the shaft wing is composed of a hard component. It is preferably proposed that the elastic spring and damping element is composed at least partially of a soft component, in particular of silicone, with a Shore A hardness of 25 Shore A to 75 Shore A, preferably of 35 Shore A to 65 Shore A. It is furthermore proposed that the elastic spring and damping element is configured for limiting a rotation of the shaft wing to a rotational angle of 2° to 10°, preferably of 3° to 7°. It is thus possible in particular to advantageously realize an automatic resetting of the rotor. Furthermore, a number of components for a resetting action, and a level of assembly effort, can be kept low.

The shaft wing has in particular a cross shape in plan view. In the center, the shaft wing has in particular an at least approximately cylindrical base body which, in an axial direction, is provided with a blind hole with a rotational driving contour. The blind hole with the rotational driving contour serves in particular for rotationally conjointly receiving the spindle projection of the rotor. Opposite the blind hole in an axial direction, a projection is preferably formed on the base body, which projection, in the installed state, prevents the axial displacement within the assembly. Preferably, a detent device is furthermore configured for securing the shaft wing on the spindle projection of the rotor. The projection of the shaft wing preferably has a diameter of 1.5 mm to 5 mm, preferably of 2.5 mm to 3.5 mm. The length of the projection amounts in particular to 1.5 mm to 5 mm, preferably from 2.5 mm to 3.5 mm. The blind hole of the shaft wing preferably has a depth of 7 mm to 14 mm, preferably of 9 mm to 12 mm. The width of the shaft wing, measured across the wings, amounts in particular to between 14 mm and 22 mm, preferably between 17 mm and 19 mm. The outer diameter of the cylindrical body of the shaft wing advantageously amounts to between 7 mm and 11 mm, preferably between 8 mm and 10 mm.

The spring and damping element is, in cross section, formed in particular as a semicircular element with lateral flanges. On its underside, the element has, on the flanges, preferably two projections which, in the assembled state, lie on the frame unit. Projections are preferably likewise provided on the top side, which projections are formed on the flanges adjacent to the geometry for receiving the shaft wing. Said projections are preferably configured for being installed into the passage holes of the shaft wing and holding the two parts together. The projections preferably have undercuts that realize this. The inner geometry of the spring and damping element is in particular adapted to the outer geometry of the shaft wing. The geometry is selected such that the required partial rotation of the shaft wing is possible. The spring and damping element has in particular a length of 4 mm to 8 mm, preferably 5 to 6.5 mm. The width perpendicular thereto amounts in particular to between 14 mm and 22 mm, preferably between 17 mm and 19 mm. The height—from the rounding to the projection—amounts in particular to between 6 mm and 11 mm, preferably between 7.5 mm and 9.5 mm. The projections on the bottom side advantageously have a height of 1 mm to 3 mm, preferably of 1.2 mm to 1.8 mm. The projections $162b$, $162b'$ on the top side preferably have a height of 1.5 mm to 4 mm, preferably of 2 mm to 3.5 mm. The inner diameter on the spring and damping element $148b$ advantageously amounts to between 7 mm and 11 mm, preferably between 8 mm and 10 mm. It is furthermore proposed that the drive unit is implemented of an oscillating armature motor. The oscillating armature motor is preferably activated in sinusoidal fashion. In this way, it is possible in particular to realize an improved movement of the rotor of the drive unit. It is possible in particular to realize an advantageously smooth movement of the rotor. Furthermore, noises of the drive unit can be reliably prevented. In this context, an "oscillating armature motor" is to be understood in particular to mean a drive which is configured for an electromagnetic generation of a vibratory movement, in particular oscillating movement. The drive comprises in particular a positionally fixed iron core with an exciter coil and a movable rotor, which comprises at least one magnet. The rotor is preferably held in the rest position by means of a resetting spring.

It is furthermore proposed that the drive unit has at least one stator which has a carrier implemented as a single piece, a metal-sheet package which is inserted into the carrier, and a coil which engages around the metal-sheet package. Preferably, the metal-sheet package forms an iron core of the stator, whereas the coil forms an exciter coil of the stator. The coil of the stator is preferably activated in sinusoidal fashion during operation. The coil and the metal-sheet package are particularly preferably free from contact. The stator is preferably formed in particular from a prefabricated module, which can be inserted as a single piece. In this way, it is possible in particular for an advantageously compact and easily assemblable stator to be provided. It is possible in particular for a number of components to be kept low. Furthermore, in this way, it is possible to provide an advantageously modular stator. In this context, a "metal-sheet package" is to be understood in particular to mean a core which is composed of multiple lamination parts which are connected to one another and/or which bear against one another. The lamination parts preferably each have the same shape and are connected side-by-side in the same orientation to form a core.

It is furthermore proposed that the carrier of the drive unit is connected directly to the frame unit and covers a rotor of the drive unit from at least one side. The carrier of the drive unit is preferably screwed directly to the frame unit. Some other form of the connection which appears expedient to a person skilled in the art would however also be conceivable. The rotor of the drive unit is preferably received in particular in a receptacle region of the frame unit, wherein the receptacle region is open preferably to one, preferably to at least two sides. The carrier is in particular configured for closing off at least one open side of the receptacle region of the frame unit. It is preferable if, in an assembled state, the rotor of the drive unit is at least partially engaged around by the metal-sheet package of the stator. In this way, it is possible in particular for an advantageously easily assemblable toothbrush handpiece to be provided. It is possible in particular to realize an advantageously simple and reliable orientation of the stator relative to the rotor during an assembly process. In this way, it is possible in particular for assembly errors to be avoided.

It is furthermore proposed that the electric toothbrush handpiece has at least one stop element which is configured for limiting a rotation of a rotor of the drive unit out of an initial position. The stop element is preferably configured for limiting an oscillating movement of the rotor. The stop element preferably serves in particular for providing a consistent movement of the rotor. Preferably, the stop element is formed in particular by a mechanical stop, against which the rotor mechanically abuts when it reaches an end position during a movement. In this way, a movement of the rotor can be targetedly limited. It is possible in particular for a movement of the rotor to be targetedly limited in defined fashion. In particular, it is thus possible to prevent damage to the resetting spring, in particular as a result of overloading and/or over-rotation. Furthermore, manual over-rotation of the rotor, for example by an operator, by rotation of the brush attachment can be avoided. It is possible in particular for damage to the toothbrush handpiece to be targetedly avoided.

It is furthermore proposed that the at least one stop element is formed by a pin which is connected fixedly to the rotor of the drive unit and which is mounted with one end elastically on the frame unit. The pin is preferably inserted radially into an opening of the rotor, in particular of the spindle projection, particularly preferably of the second spindle projection. The pin is preferably arranged in a positionally fixed manner on the rotor, and in particular projects radially out of the rotor. The pin is particularly preferably mounted, with an end averted from the rotor, in the frame unit by means of an elastic sleeve, in particular by means of a rubber sleeve. An advantageously simple stop element can be realized in this way. In particular, an advantageously compact stop element can be provided in this way.

It is furthermore proposed that the stop element be designed to be integrated directly into the shaft wing. The wings of the shaft wing lie over the spring and damping element, which in turn lies against the frame unit. By means of this arrangement, the movement of the wing of the shaft wing is limited, which corresponds to a limitation of the movement of the rotor, because the rotor is directly connected to the shaft wing, or the shaft wing is mounted onto the rotor.

It is furthermore proposed that the electric toothbrush handpiece has at least one rotor cover which is connected fixedly to the frame unit and which, together with the frame unit, is configured for the support and/or fixation of a rotor of the drive unit. The rotor of the drive unit is preferably received in particular in a receptacle region of the frame unit, wherein the receptacle region is open preferably to one, preferably to at least two sides. It is preferable for at least one open side of the receptacle region of the frame unit to be closed off by a carrier of the drive unit, wherein the rotor cover closes off in particular the second open side. Preferably, the rotor cover is screwed to the frame unit. Some other form of the connection which appears expedient to a person skilled in the art would however also be conceivable. It is particularly preferable if both the rotor cover and the frame unit form at least a semicircular spindle receptacle for receiving at least one spindle projection of the rotor. The rotor is preferably mounted directly between the frame unit and the rotor cover. Advantageously simple and fast assembly can be achieved in this way. It is possible in particular for an advantageous cover and bearing arrangement of the rotor to be provided. Furthermore, it is possible in particular for advantageously fast and positionally accurate installation of the rotor to be ensured. The rotor cover and the frame unit preferably furthermore serve for bearing and/or sealing off the spindle of the interface. The spindle is preferably mounted by means of a seal in a spindle receptacle which is made up of a semicircular spindle receptacle of the frame unit and a semicircular spindle receptacle of the rotor cover.

It is furthermore proposed that the at least one stop element is implemented integrally with the rotor cover. The stop element preferably forms a projection which is implemented integrally with the rotor cover and which faces toward the rotor. It is preferable here if the shape of the projection is adapted to the end positions of the rotor. Preferably, the stop element is formed in particular by a protuberance in the rotor cover. An advantageously simple stop element can be realized in this way. It is possible in particular for an advantageously easily assemblable stop element to be provided. Furthermore, it is possible in particular for a stop element to be provided which is advantageously robust and easy to produce. It is preferably possible in particular for a separate stop element to be provided. In particular, it is merely necessary for a shape of the rotor cover to be adapted.

The handpiece or the spindle 110 is, in at least one operating state, operated with a frequency of 200 Hz to 320 Hz, preferably of 240 Hz to 280 Hz. The angle of deflection of the spindle 110 to each side of the zero position lies in particular in a range from 2.5° to 9°, preferably from 4° to 7°.

The invention furthermore proceeds from a method for producing an electric toothbrush handpiece.

The invention furthermore proceeds from an electric toothbrush having the electric toothbrush handpiece and having the brush attachment.

The invention furthermore proceeds from a system having a first electric toothbrush handpiece with a first interface, having a second electric toothbrush handpiece with a second interface which differs from the first interface, and having a brush attachment with an interface receptacle for receiving the first interface and the second interface. The first interface and the second interface preferably have differing shapes and/or dimensions, wherein the brush attachment is suitable for captively receiving the first interface and the second interface. Owing to the embodiment according to the invention of the system, the brush attachment can be utilized in particular for different toothbrush handpieces. It is possible in particular to realize universal use of the brush attachment.

In this context, the expressions "axial" and "radial" are in particular in relation to a main extent axis of the brush attachment and/or of the electric toothbrush handpiece, such that the expression "axial" refers in particular to a direction which runs parallel or coaxially with respect to one of the main extent axes. Furthermore, the expression "radial" hereinafter refers in particular to a direction which runs perpendicular to one of the main extent axes. It is preferable if the main extent axis of the brush attachment runs parallel to the main extent axis of the electric toothbrush handpiece. Here, a "main extent axis" of an object is to be understood in particular to mean an axis which runs parallel to a longest edge of a smallest geometrical rectangular cuboid which just completely encloses the object, and which in particular intersects a geometrical central point of the object.

Furthermore, the expressions "top side" or "front side" of the toothbrush are to be understood in this context to mean in particular that side of the toothbrush on which the thumb is placed. The top side or front side is normally also the side toward which the bristle array, in particular of the brush head of the brush attachment, is directed. The "bottom side" or "rear side" of the toothbrush is to be understood in particular to mean that side which is averted from the bristle array of the brush head. Furthermore, the expressions "left-hand side" and "right-hand side" are each in relation to a view directed onto the front side. The "bottom side of the head plate" refers to that side which is placed into the recess of the base body and which points in the direction of the bottom side of the toothbrush. Correspondingly, the "top side of the head plate" points in the direction of the top side of the toothbrush.

Here, it is not the intention for the brush attachment according to the invention, the electric toothbrush handpiece, the electric toothbrush, the system and the method to be restricted to the use and embodiment described above. In particular in order to perform a function described herein, the brush attachment according to the invention, the electric toothbrush handpiece, the electric toothbrush, the system and the method may have a number of individual elements, components and units which differs from a number stated herein.

DRAWINGS

Further advantages will emerge from the following description of the drawings. Two exemplary embodiments of the invention are illustrated in the drawings. The drawings, the description and the claims include numerous features in combination. The design variants presented in this document are self-evidently exemplary. Within the scope of the invention, the individual implementations and elements of these design variants may be combined with other design variants without departing from the scope of this invention. A person skilled in the art will therefore expediently also consider the features individually and combine them to form further meaningful combinations.

Figure 2:
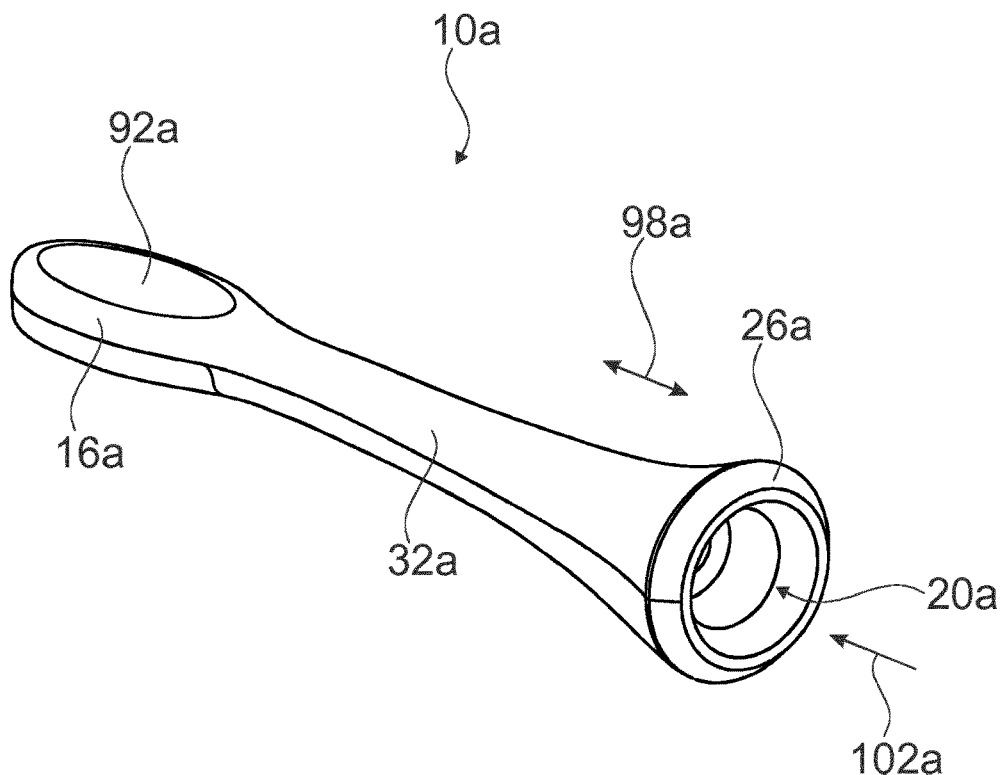
Figure 3:
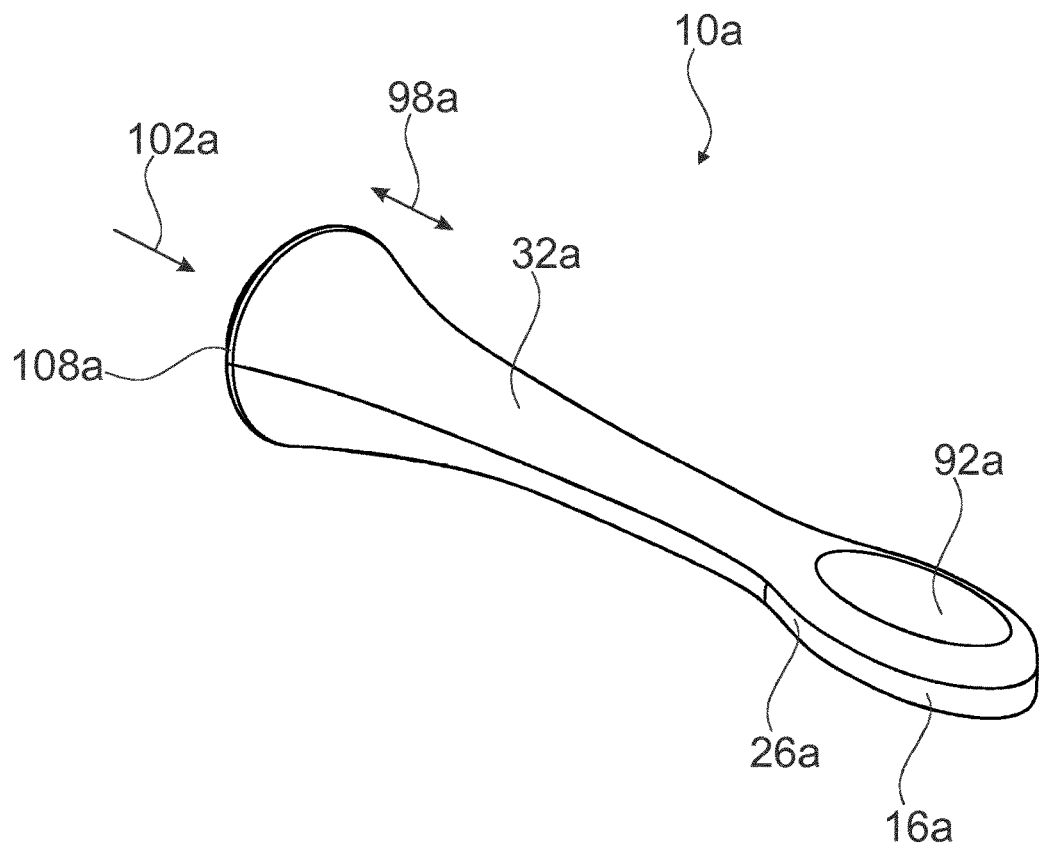
Figure 4:
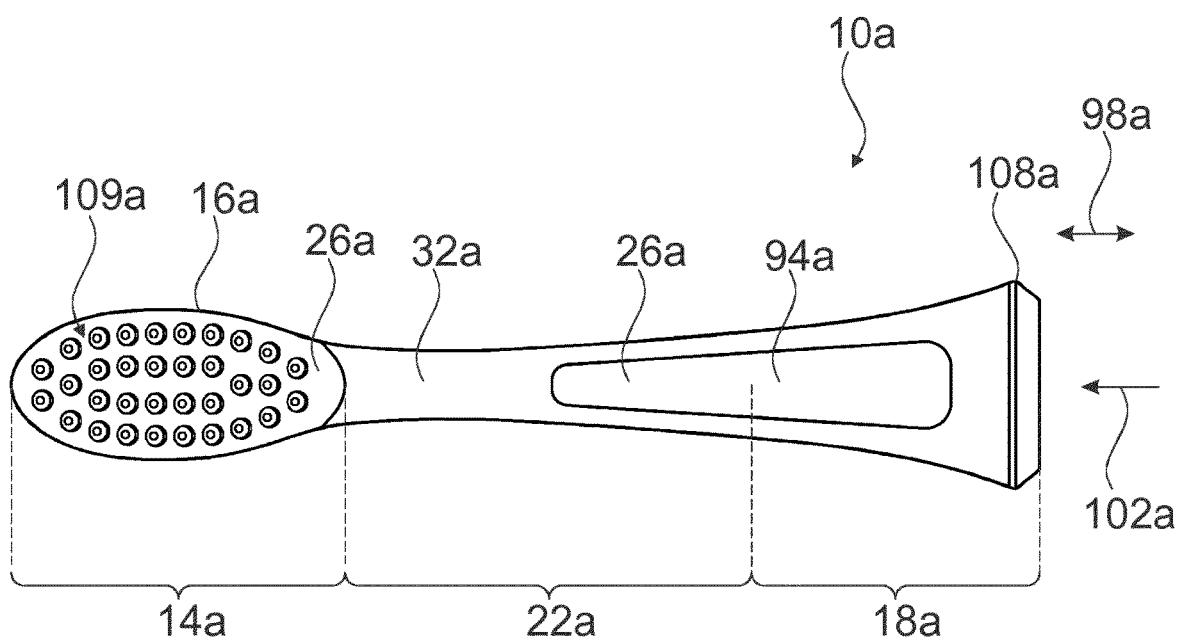
Figure 5:
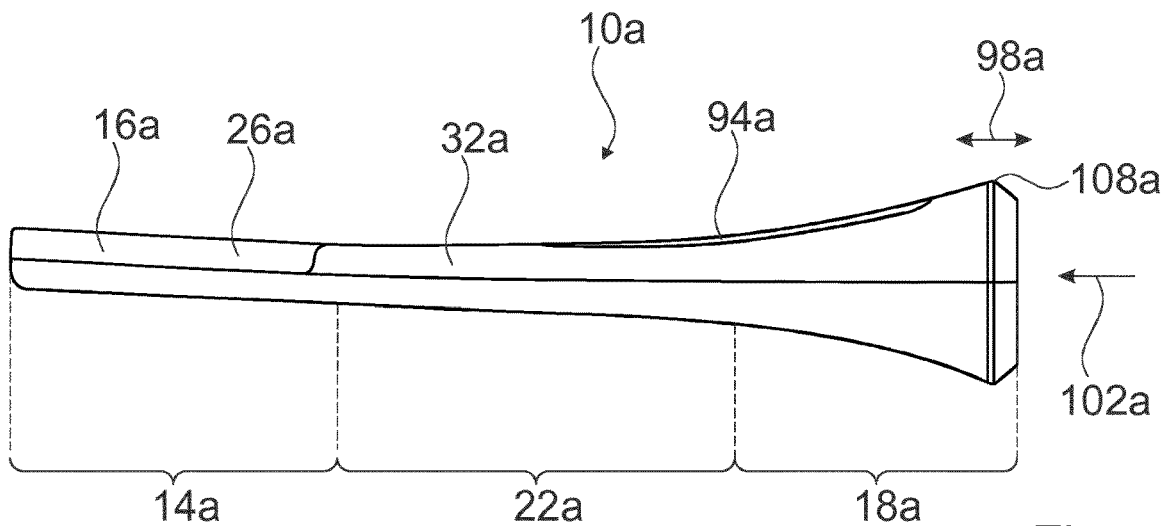
Figure 6:
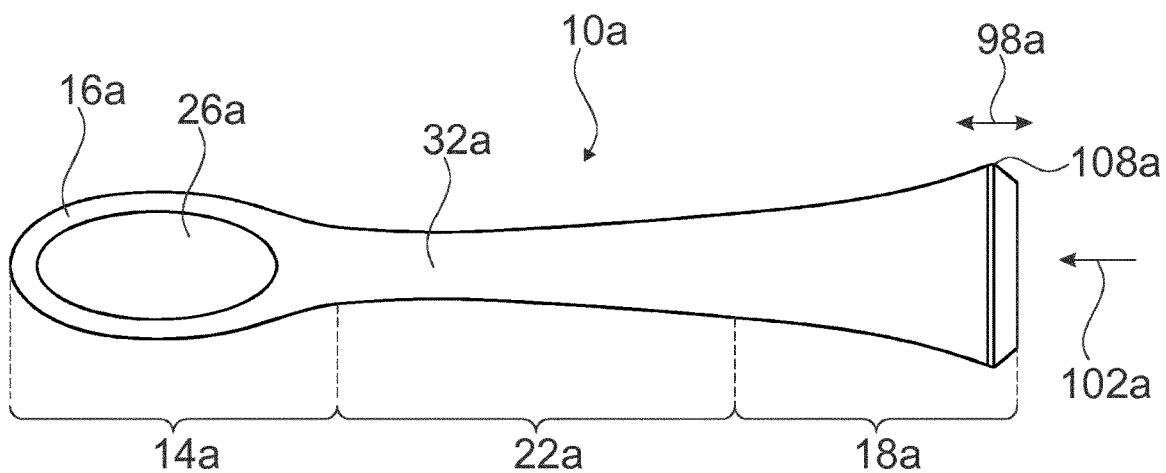
Figure 7:
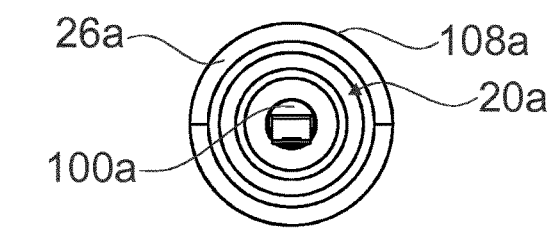
Figure 8:
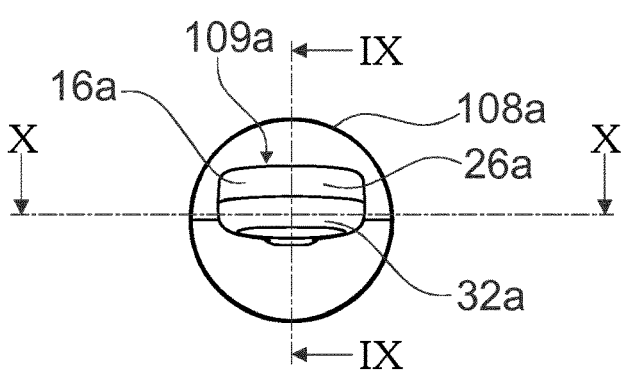
Figure 9:
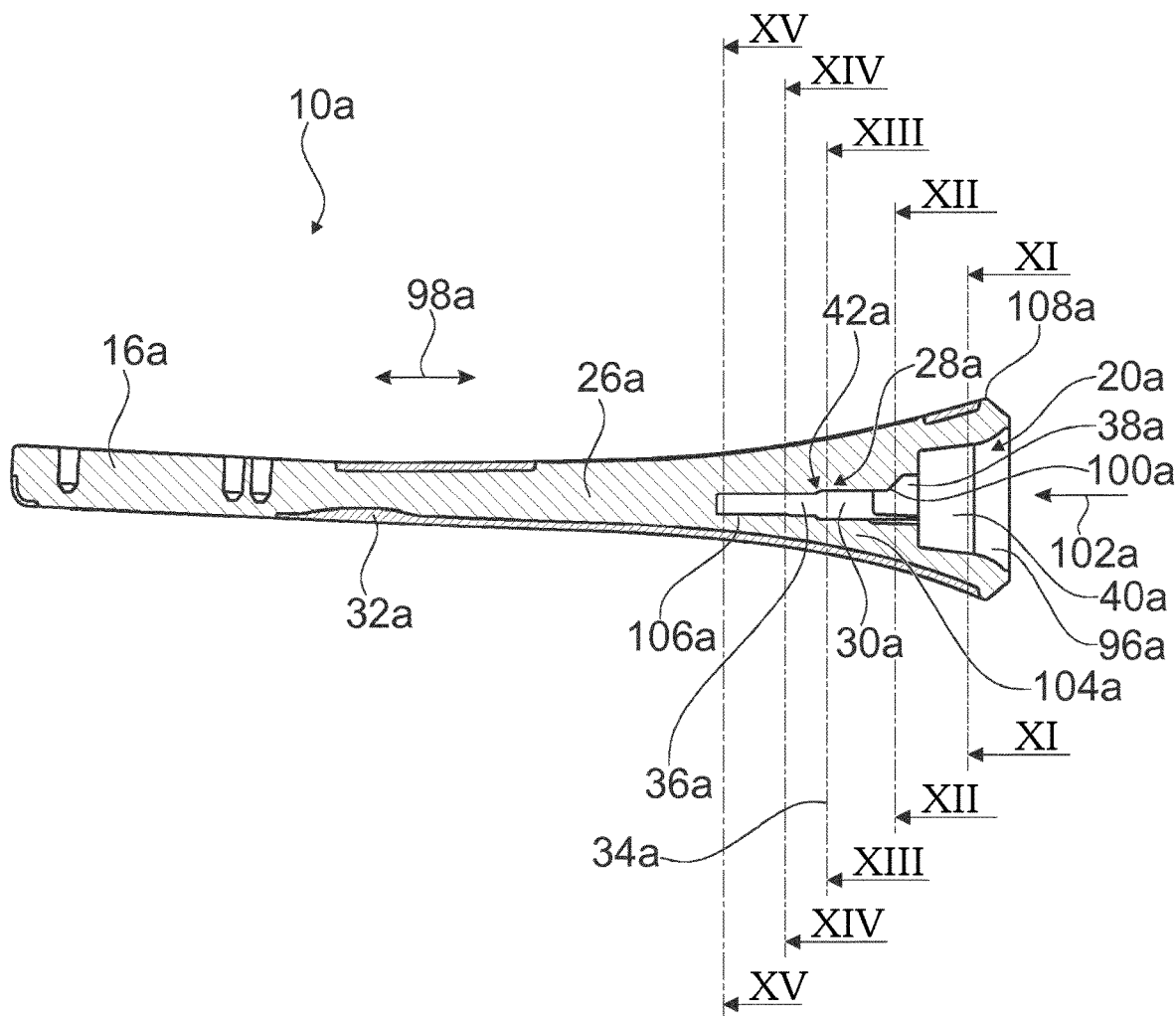
Figure 10:
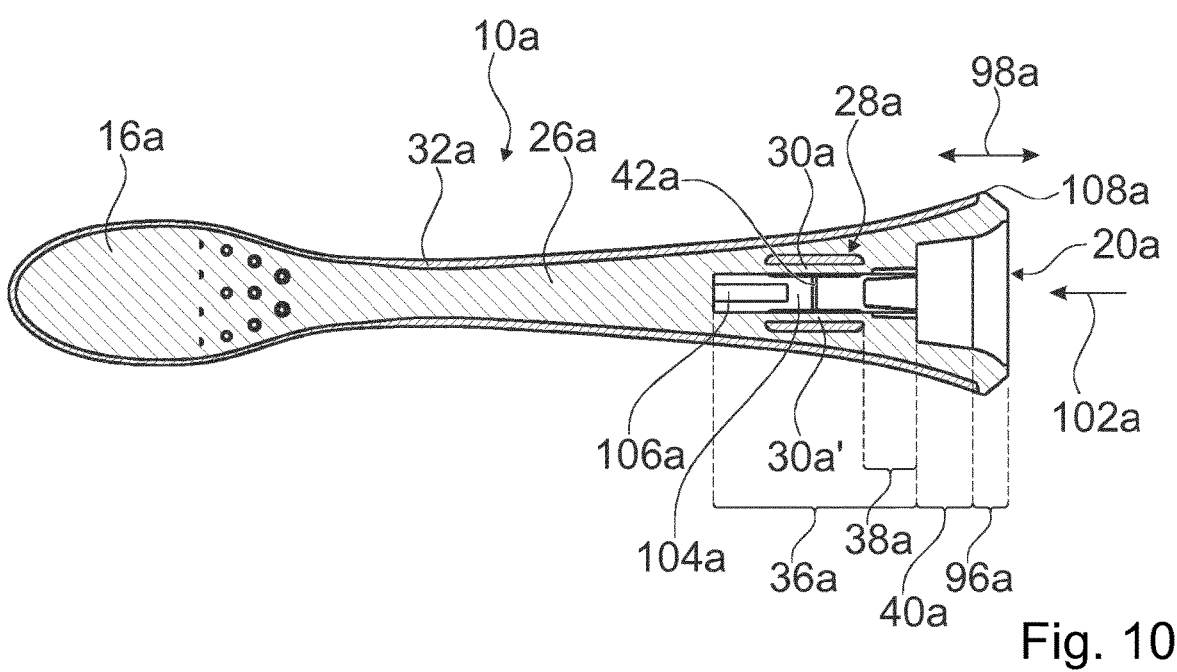
Figure 11:
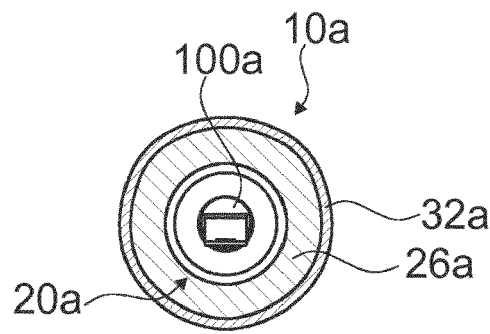
Figure 12:
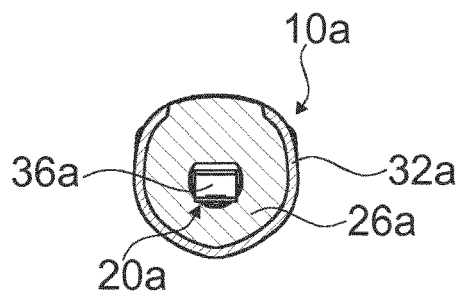
Figure 13:
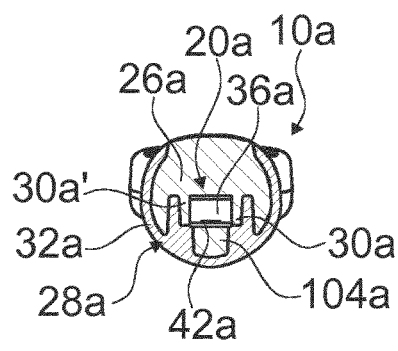
Figure 14:
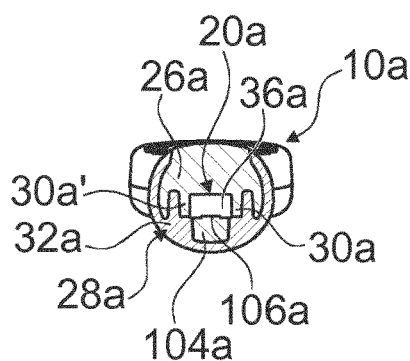
Figure 15:
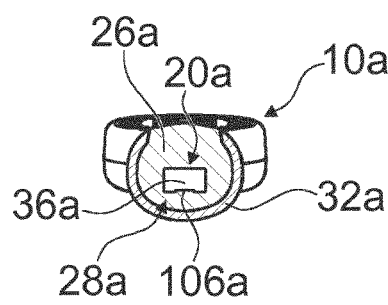
Figure 16:
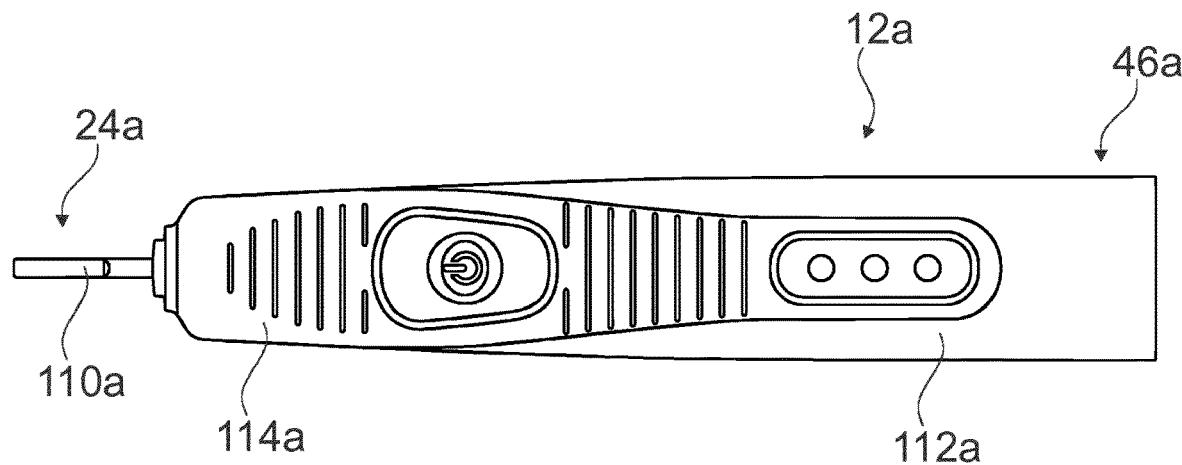
Figure 17:
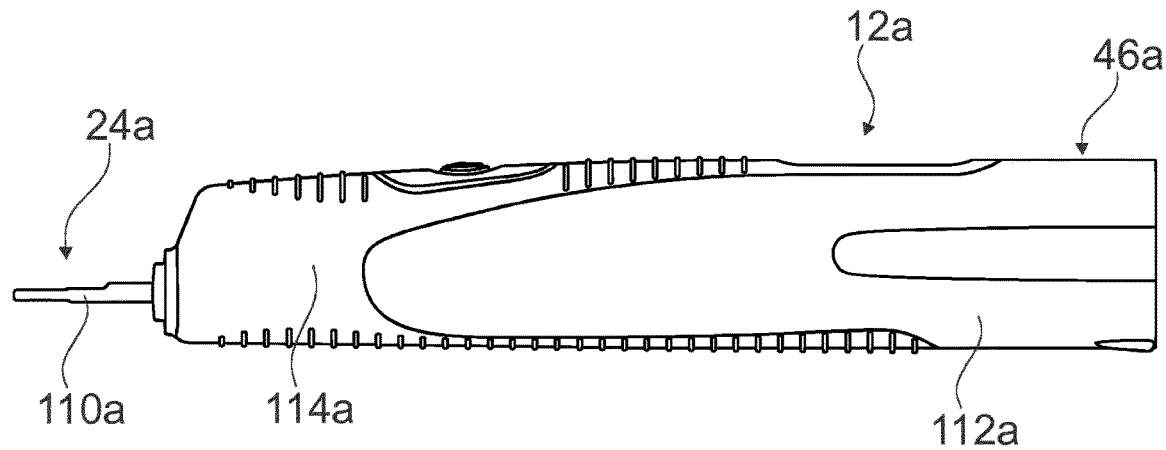
Figure 18:
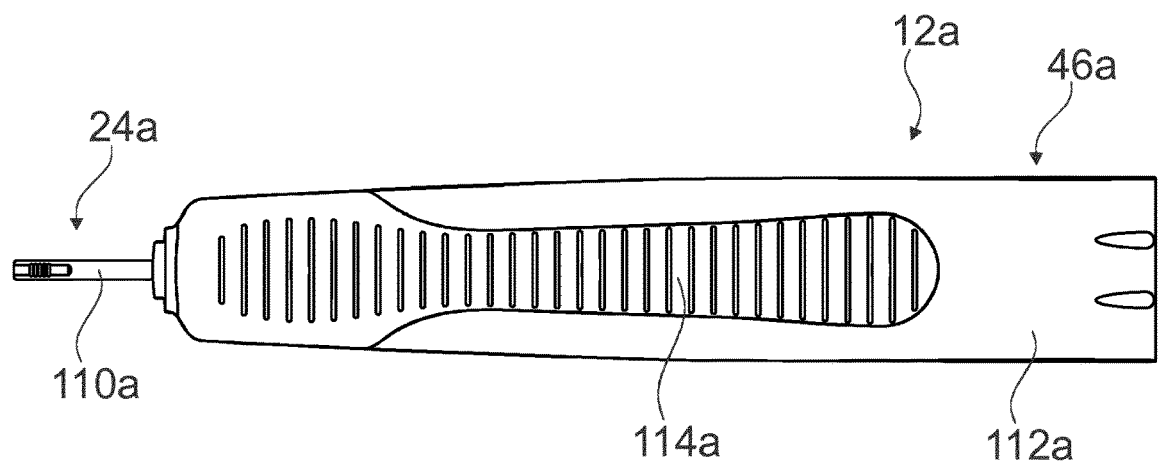
Figure 19:
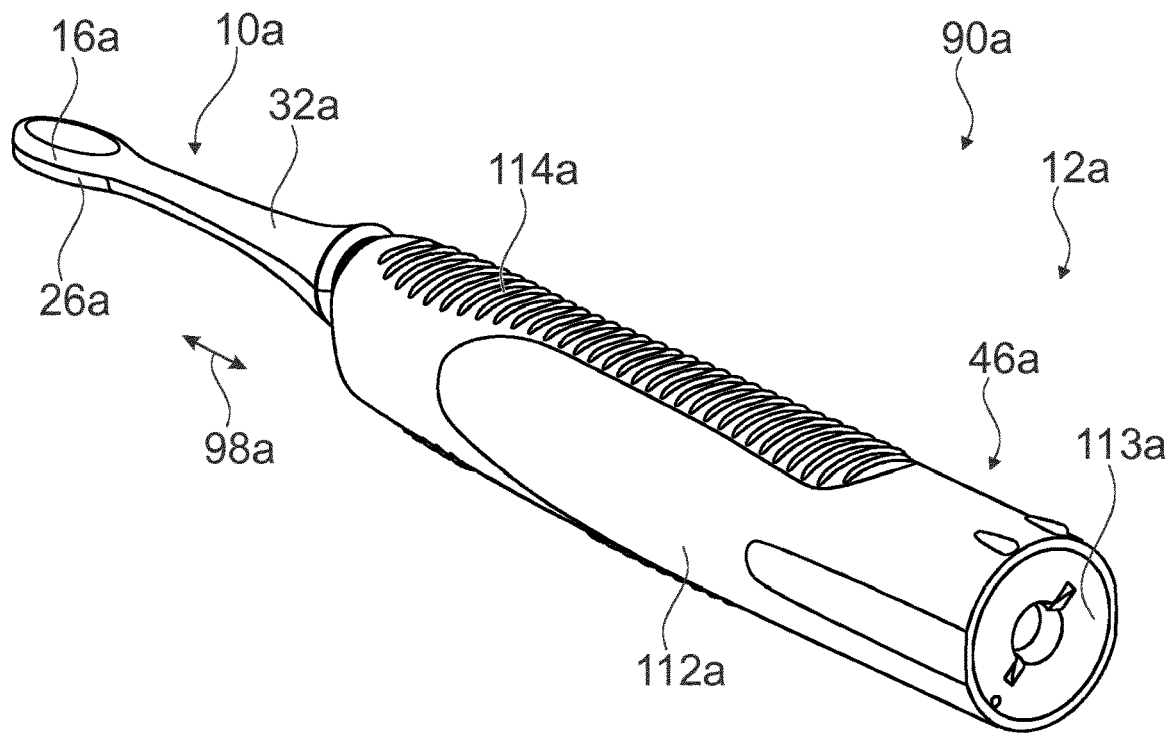
Figure 20:
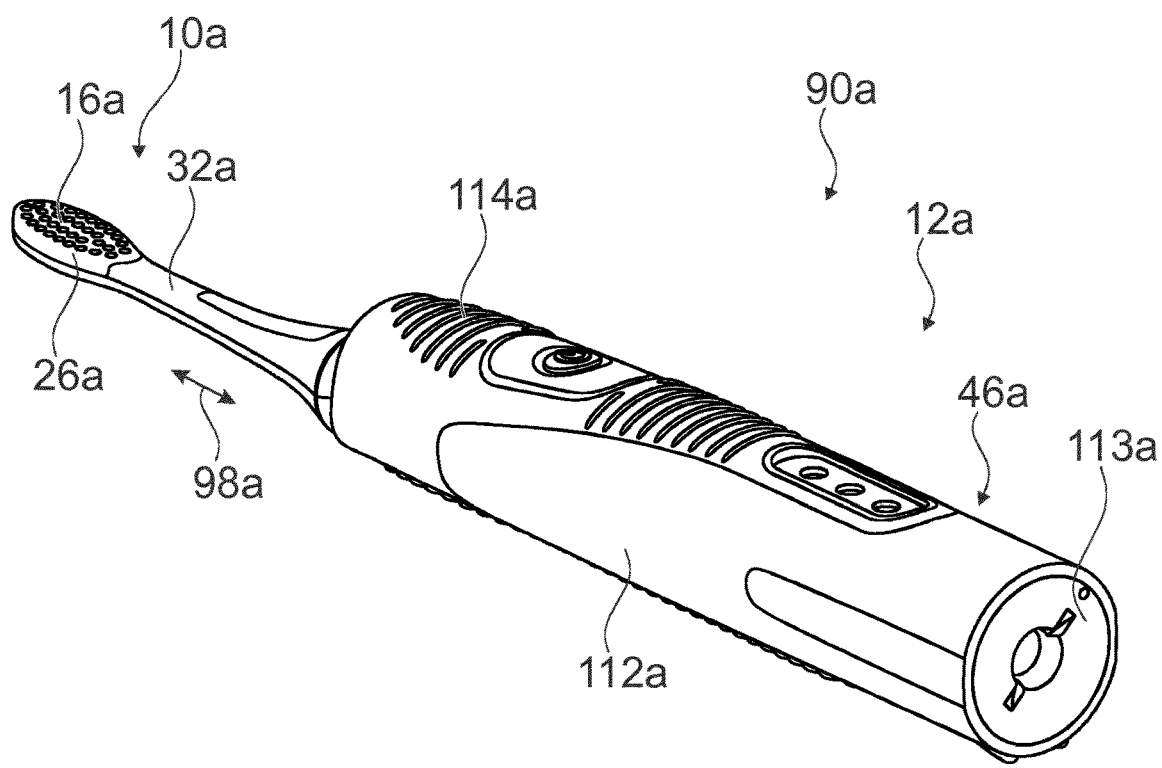
Figure 21:
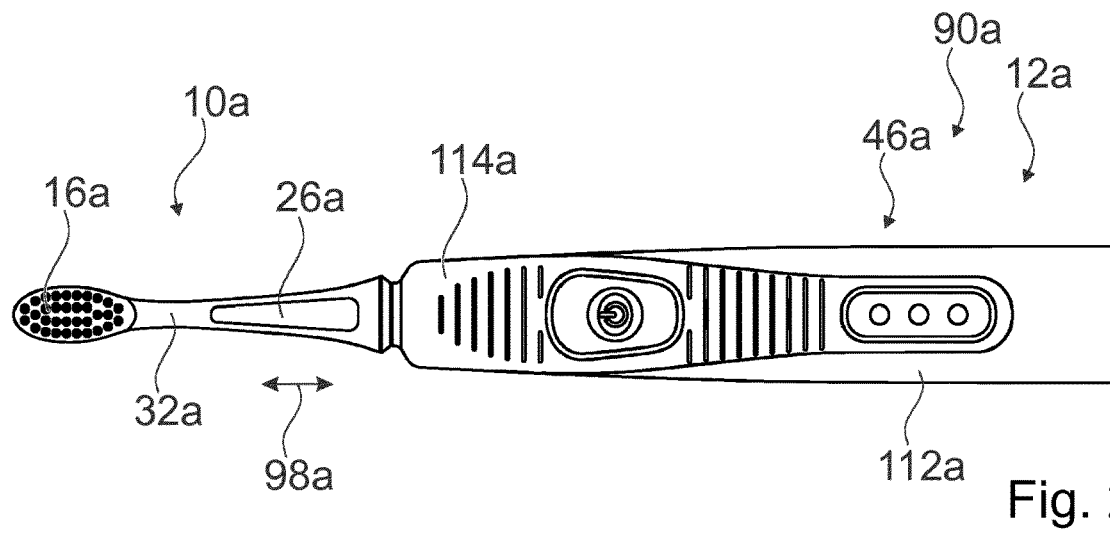
Figure 22:
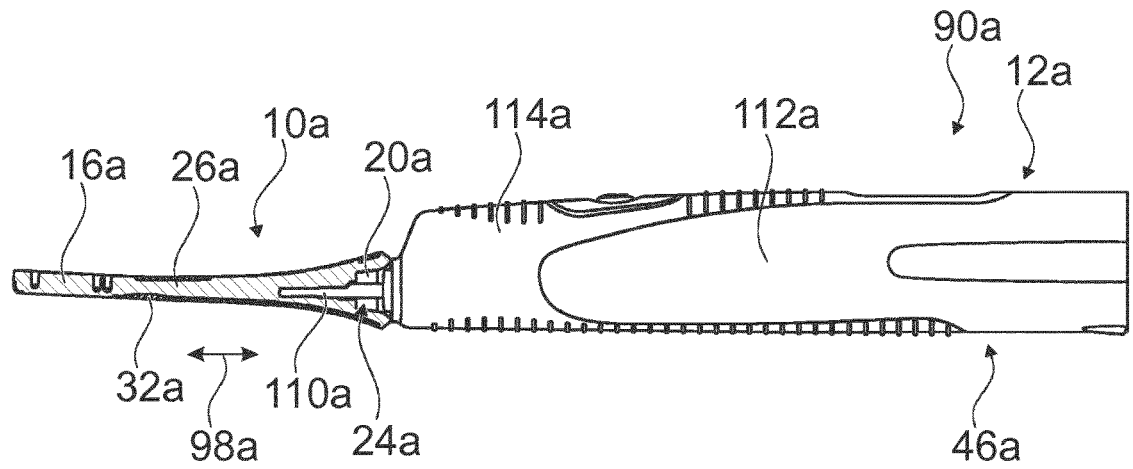
Figure 23:
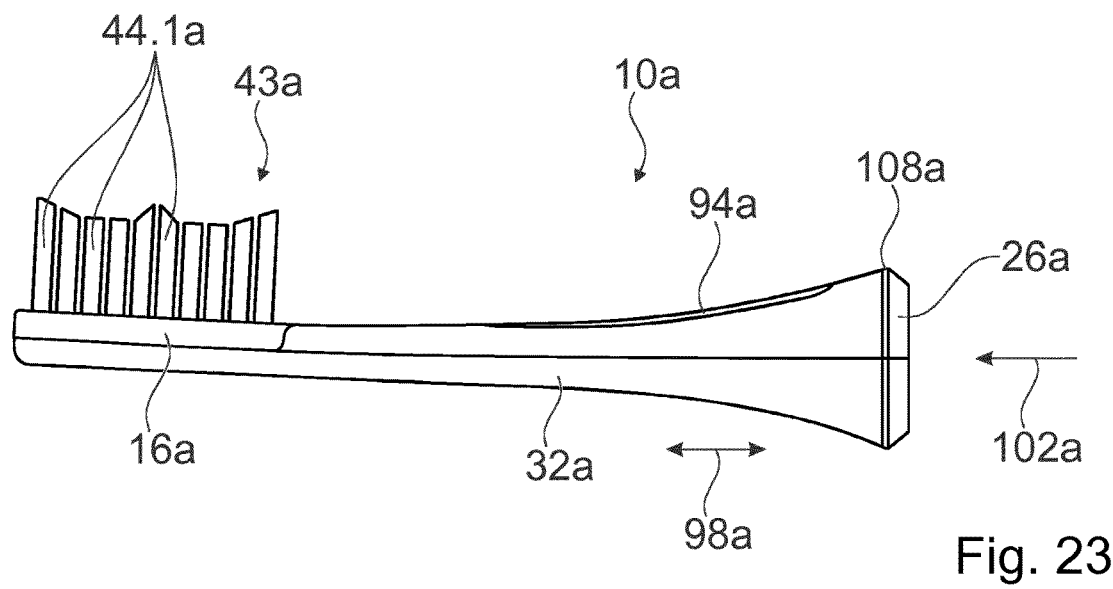
Figure 24:
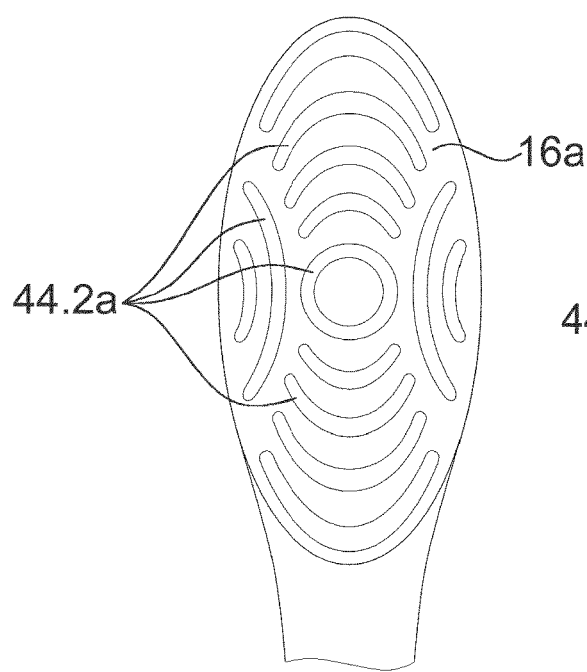
Figure 25:
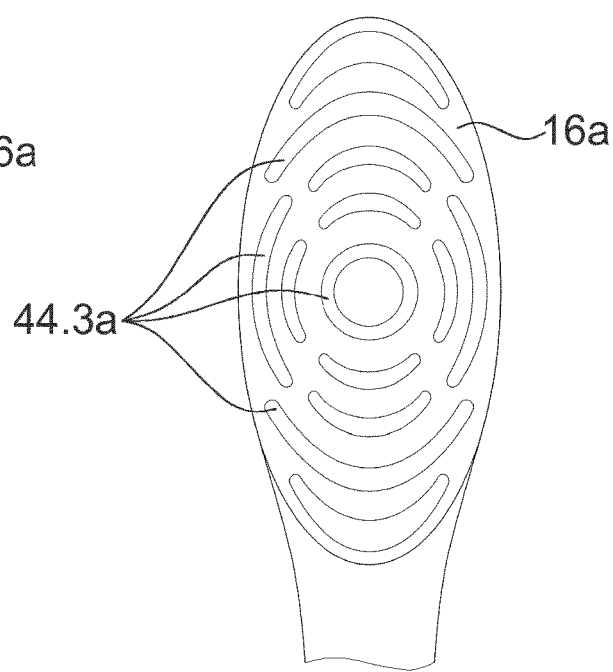
Figure 26:
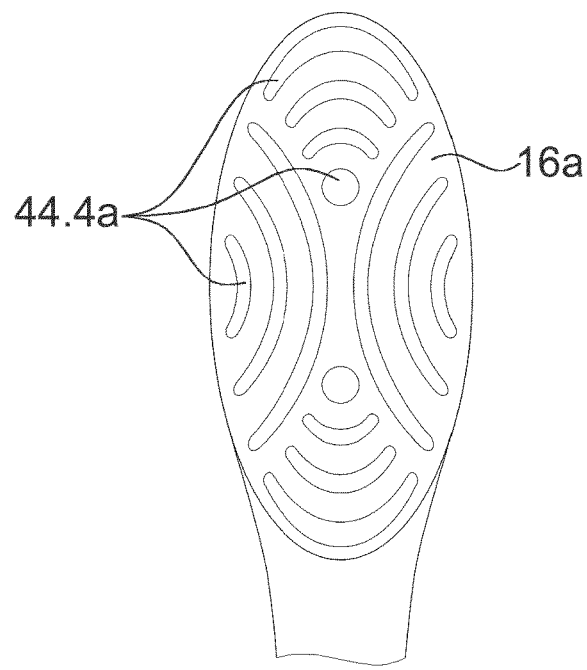
Figure 27:
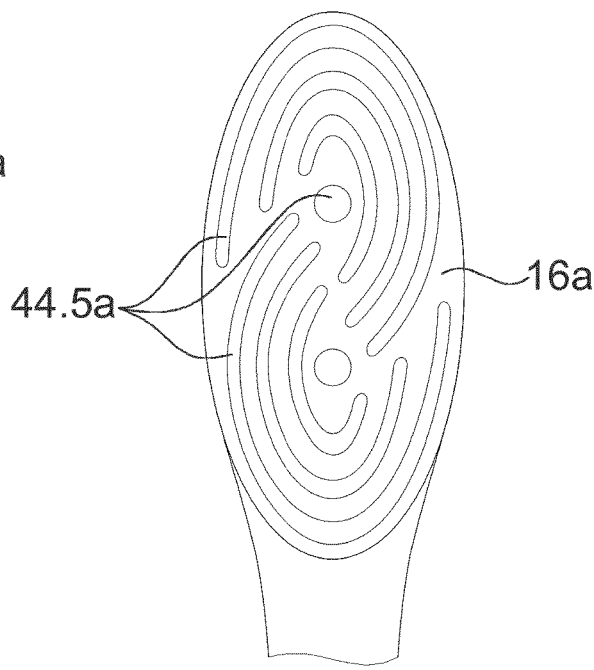
Figure 38:
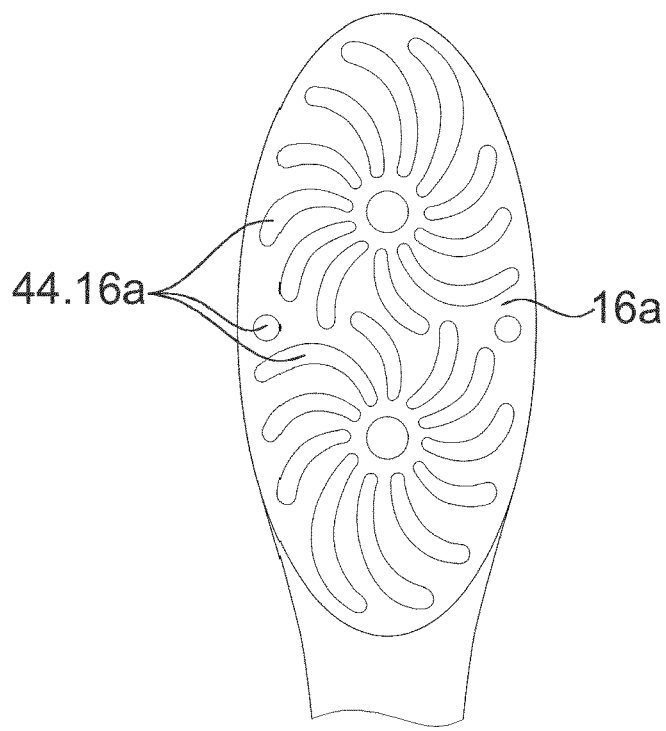
Figure 39:
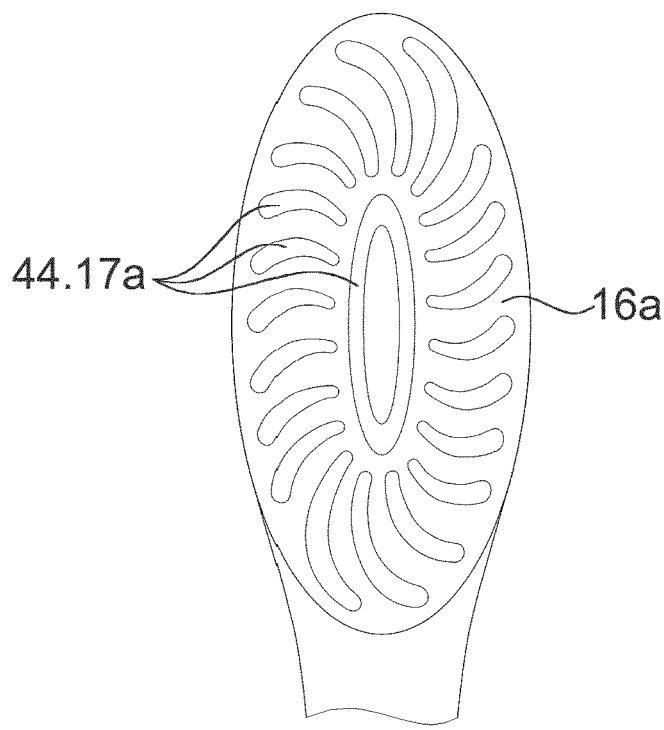
Figure 40:
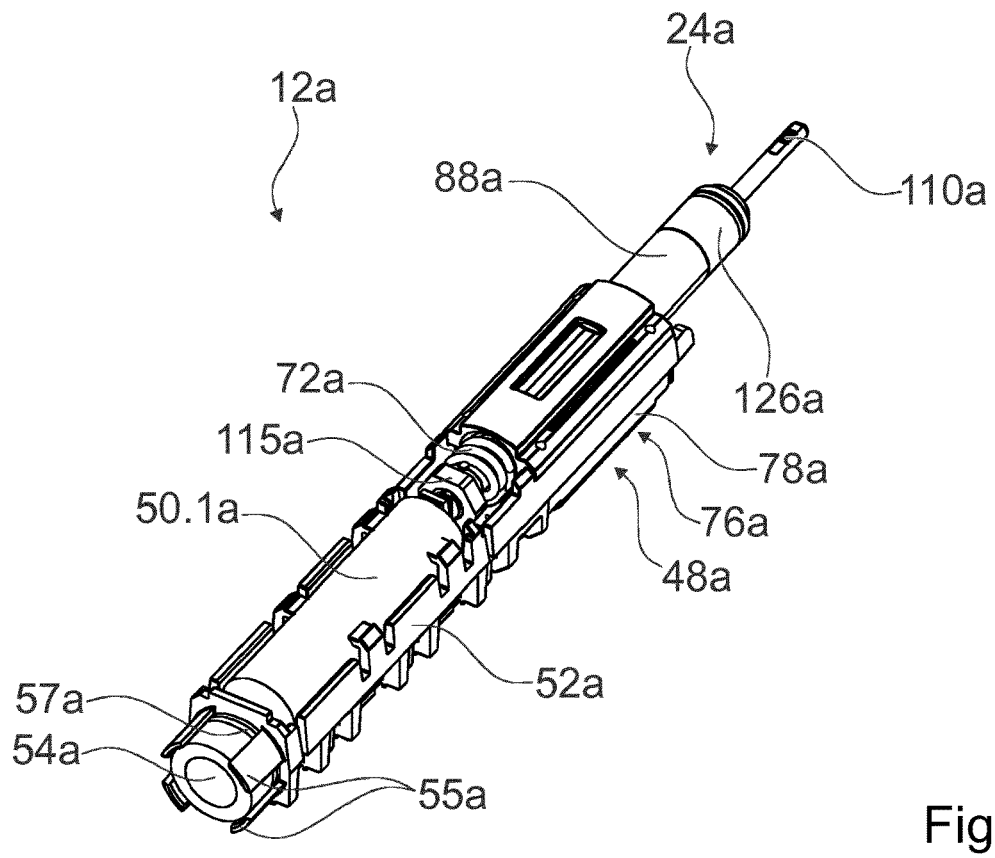
Figure 41:
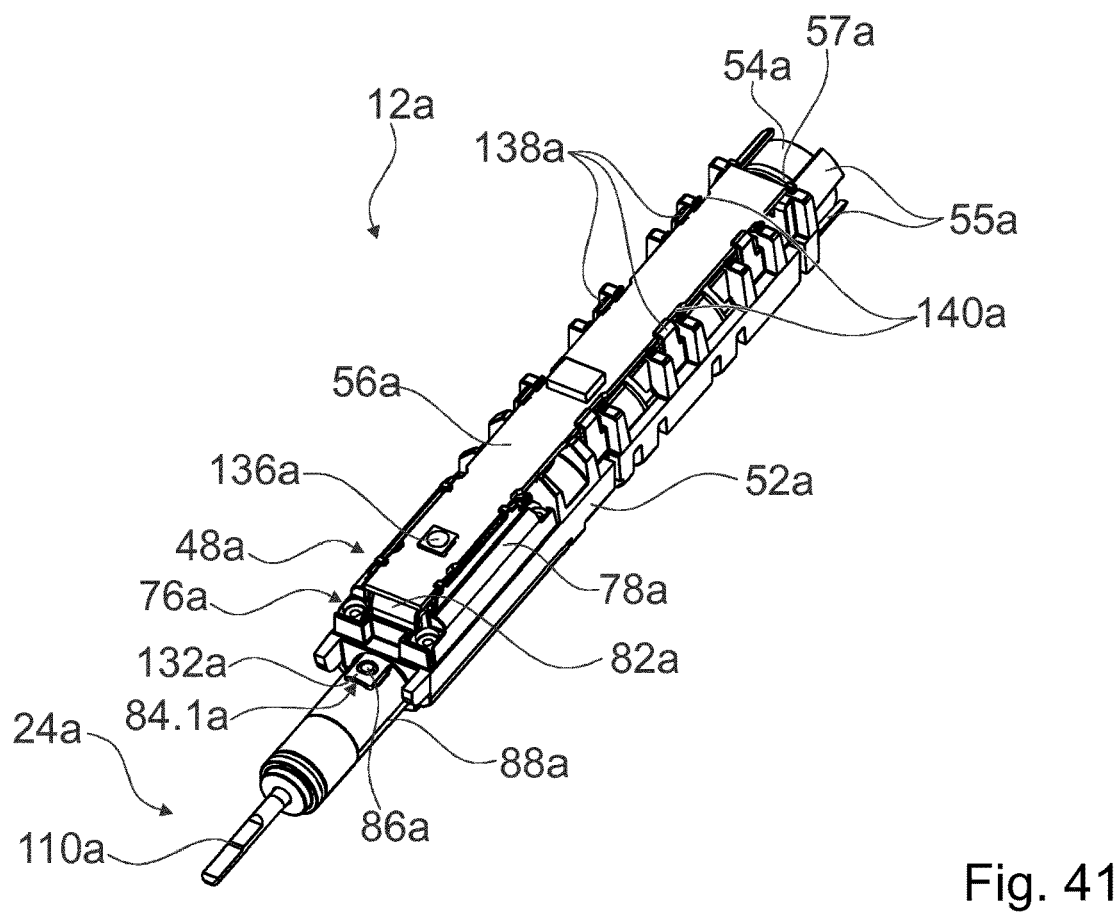
Figure 42:
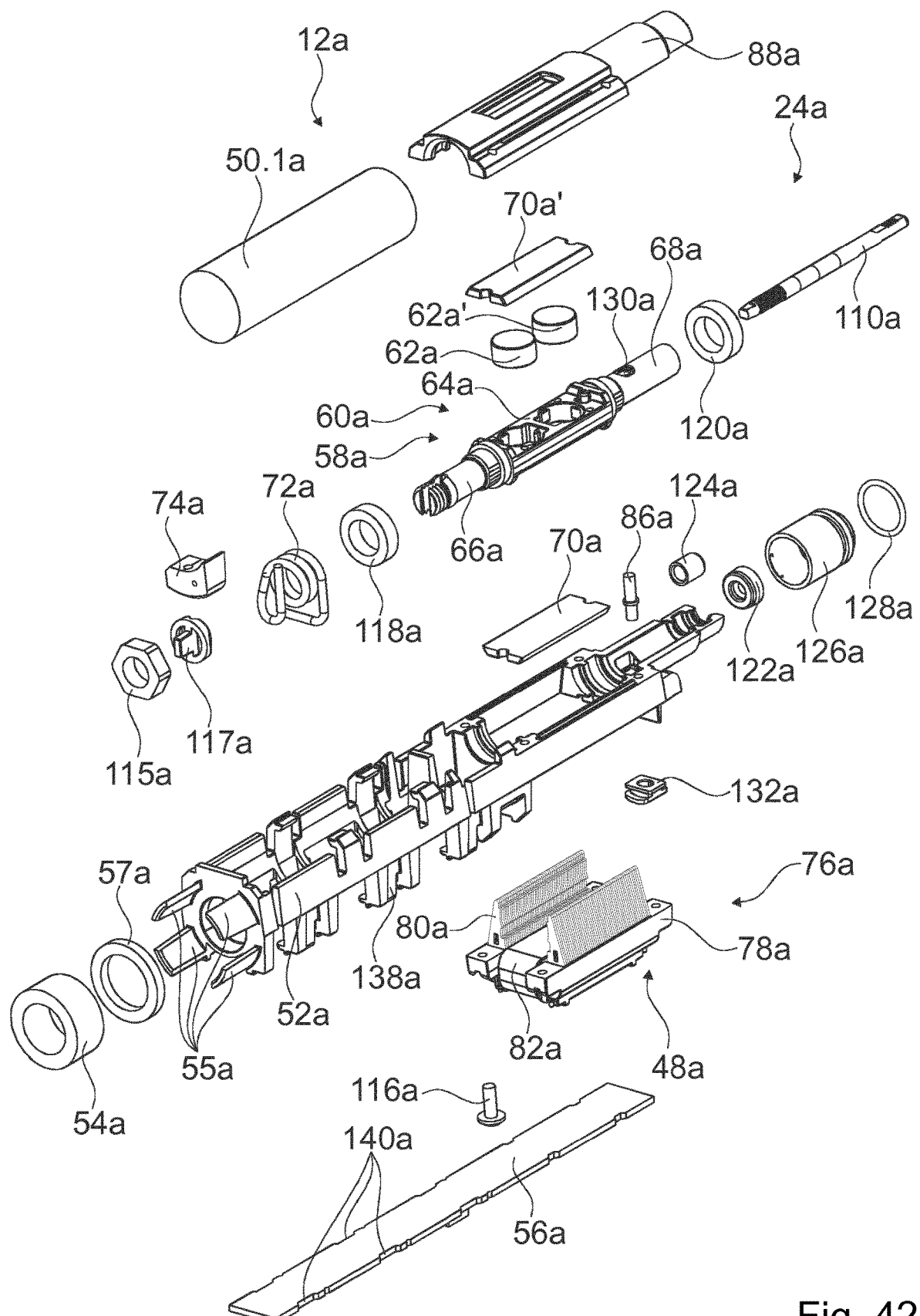
Figure 43:
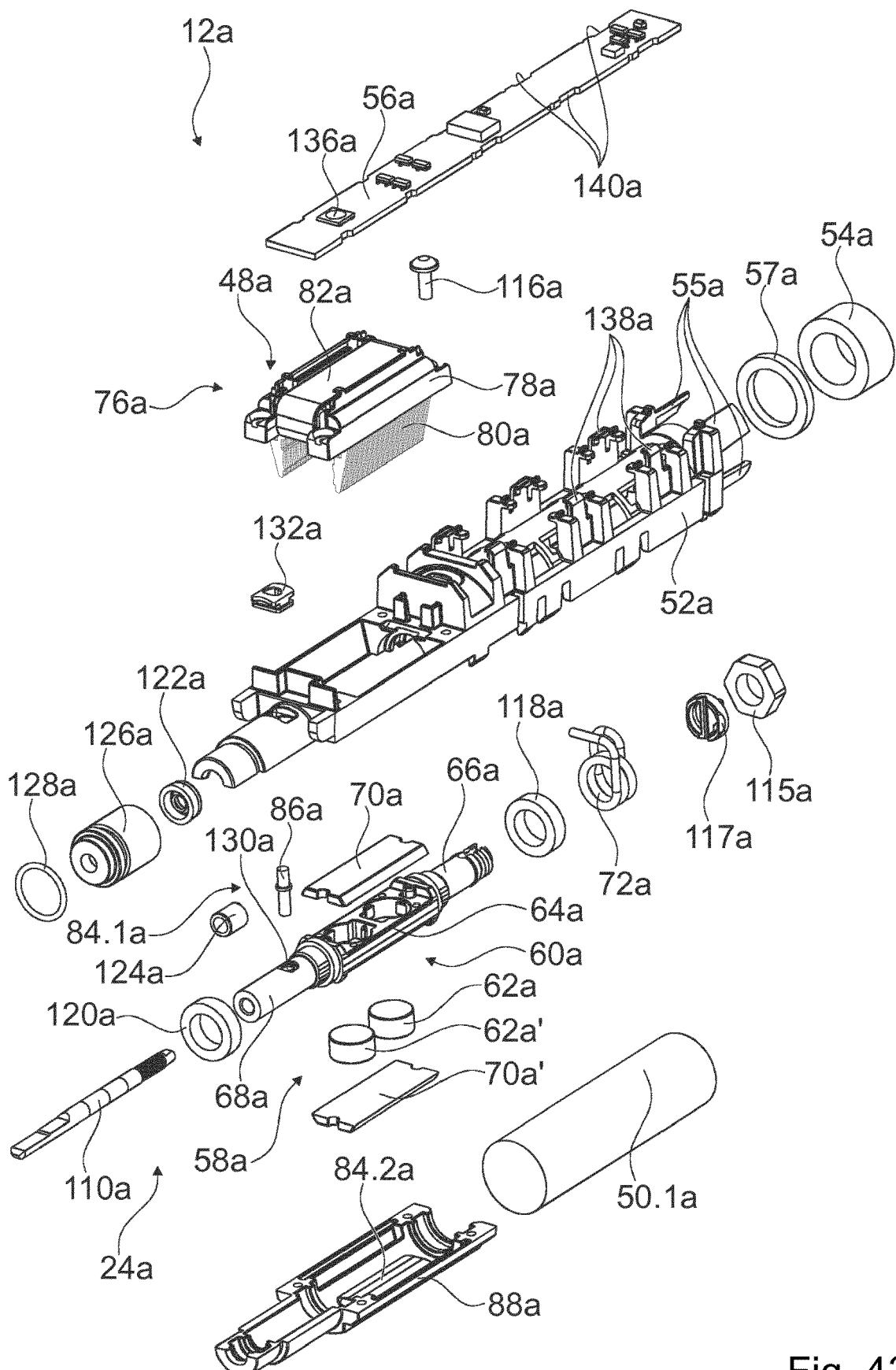
Figure 44:
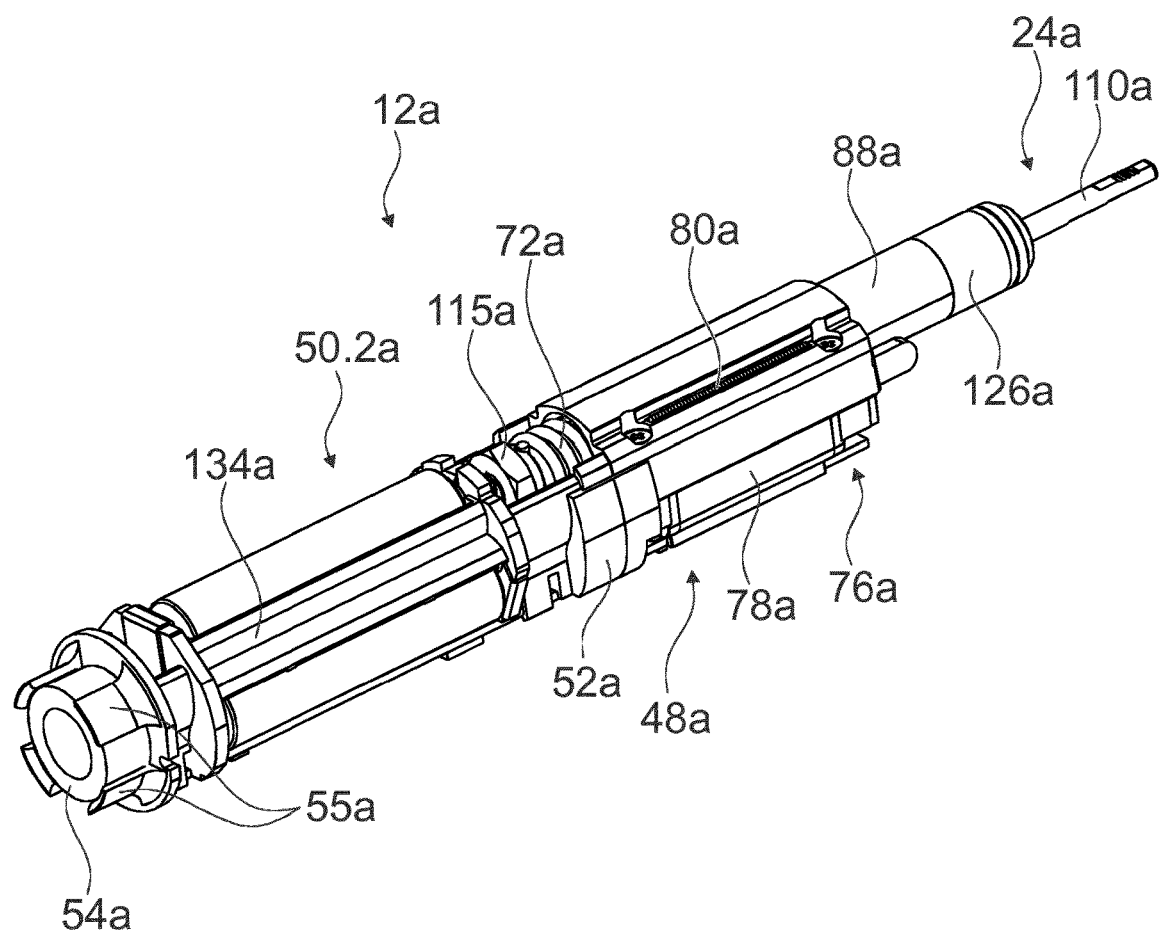
Figure 45:
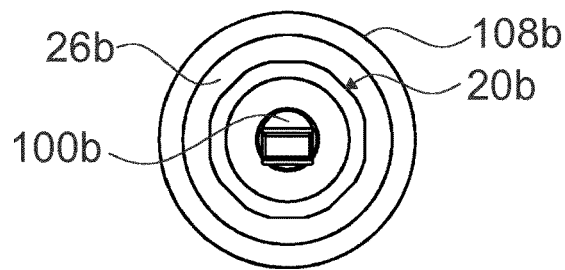
Figure 46:
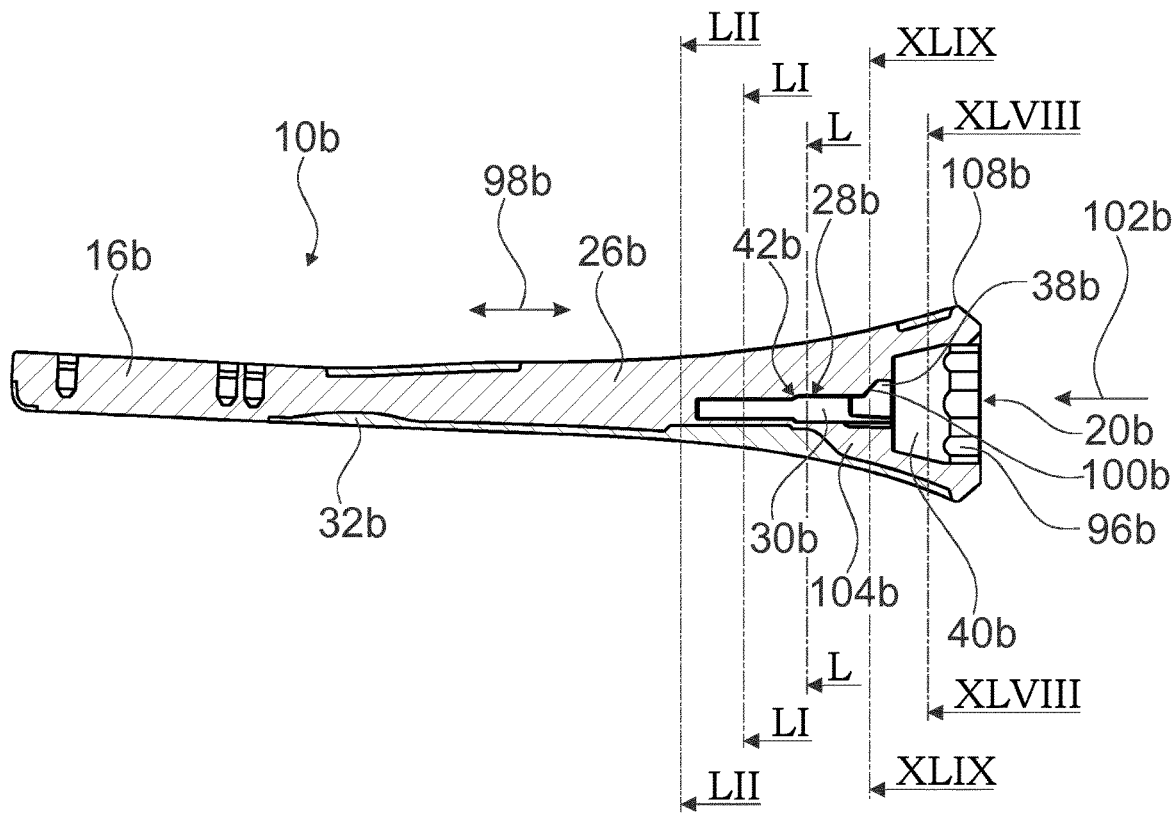
Figure 47:
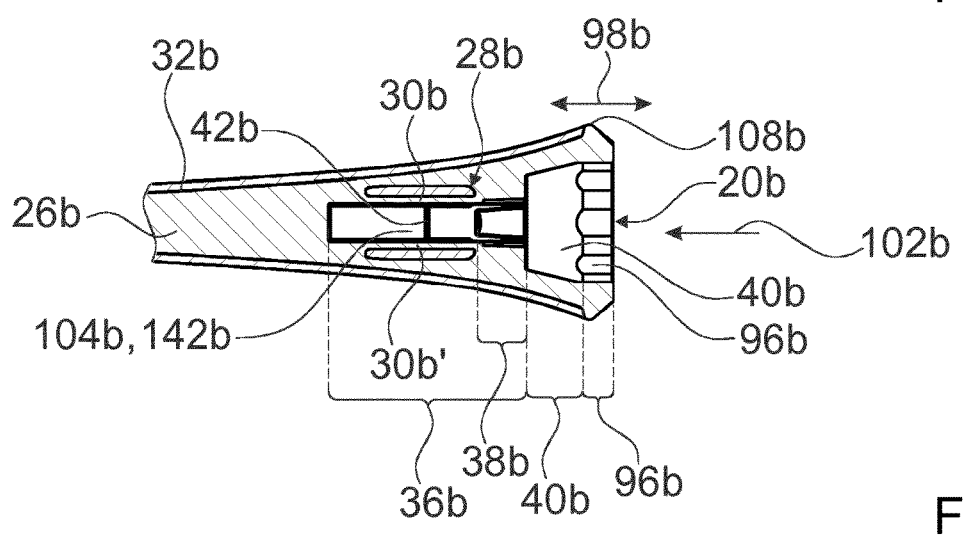
Figure 48:
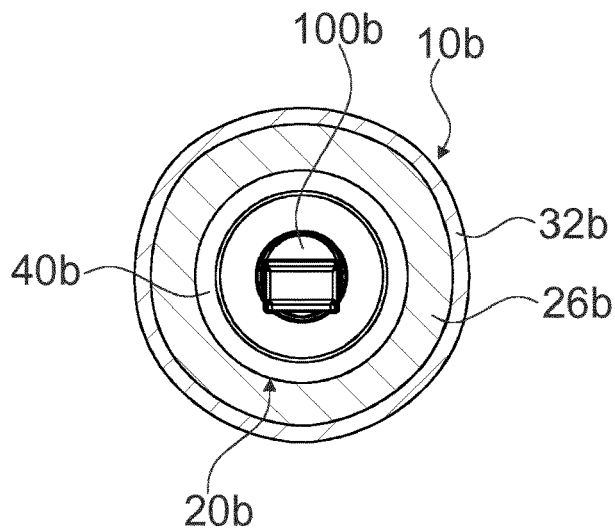
Figure 49:
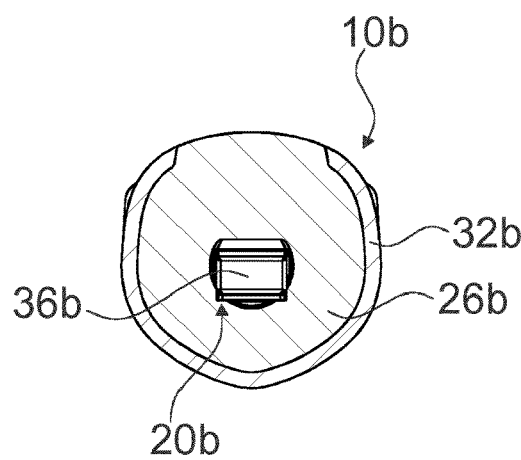
Figure 50:
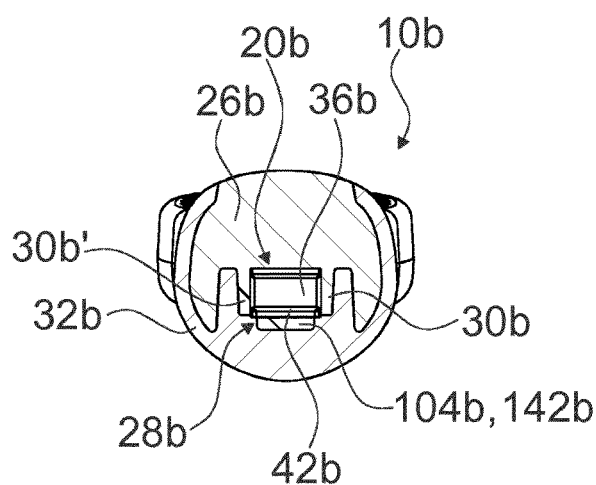
Figure 51:
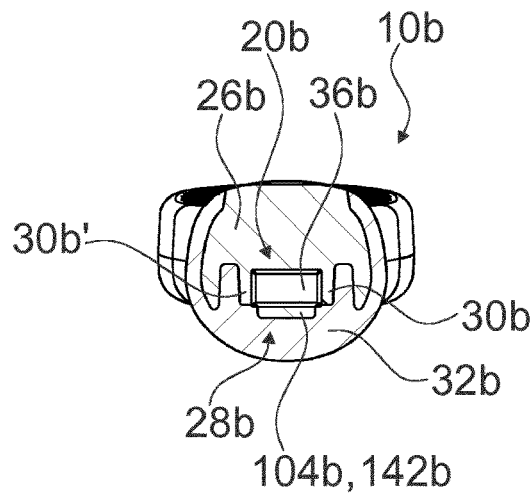
Figure 52:
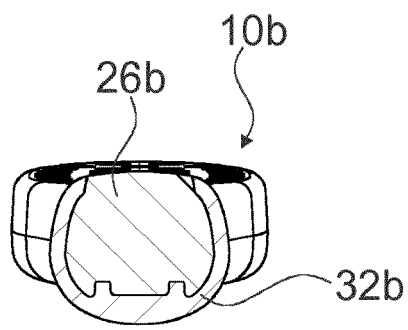
Figure 53:
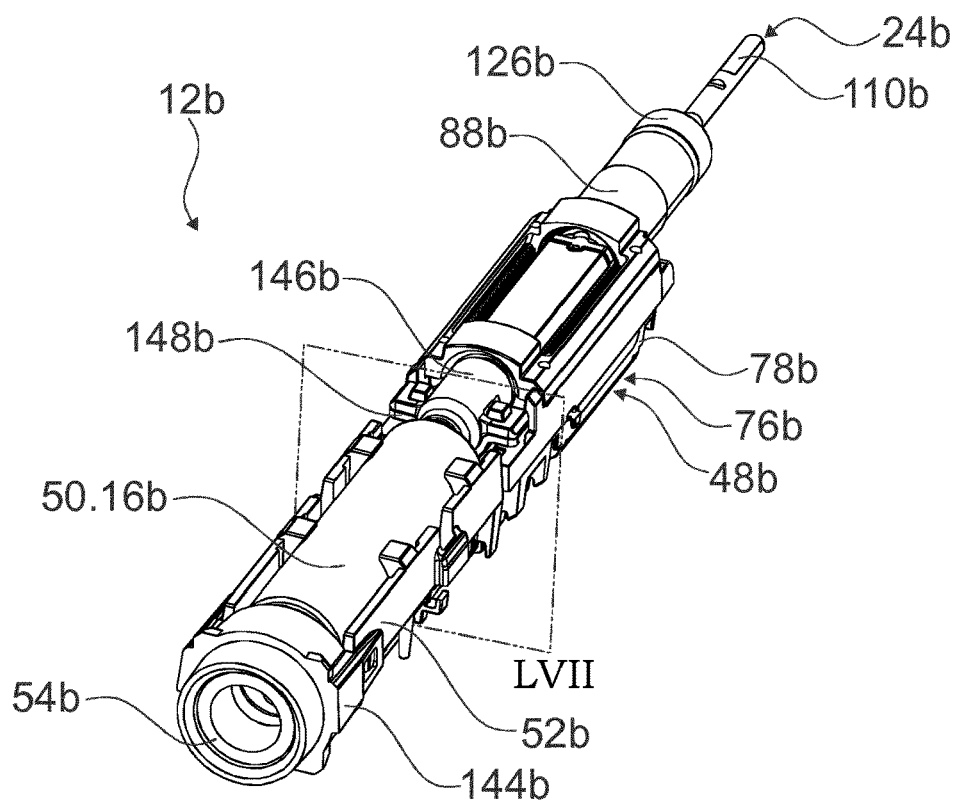
Figure 54:
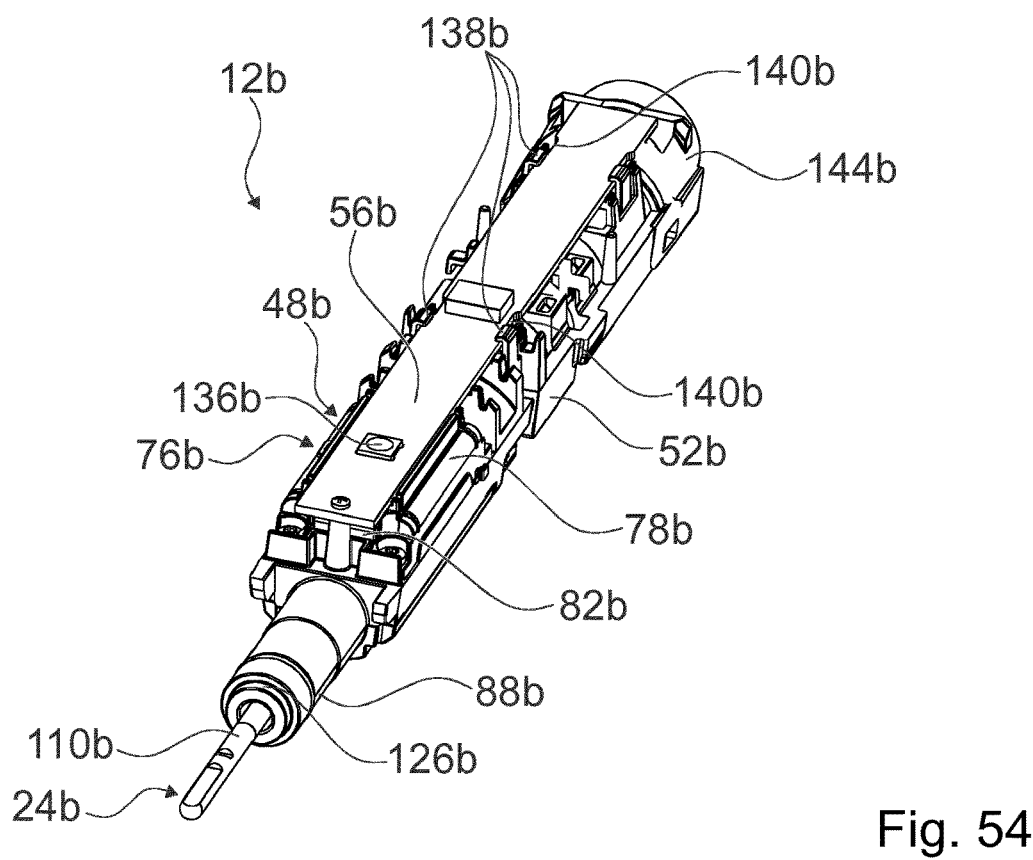
Figure 55:
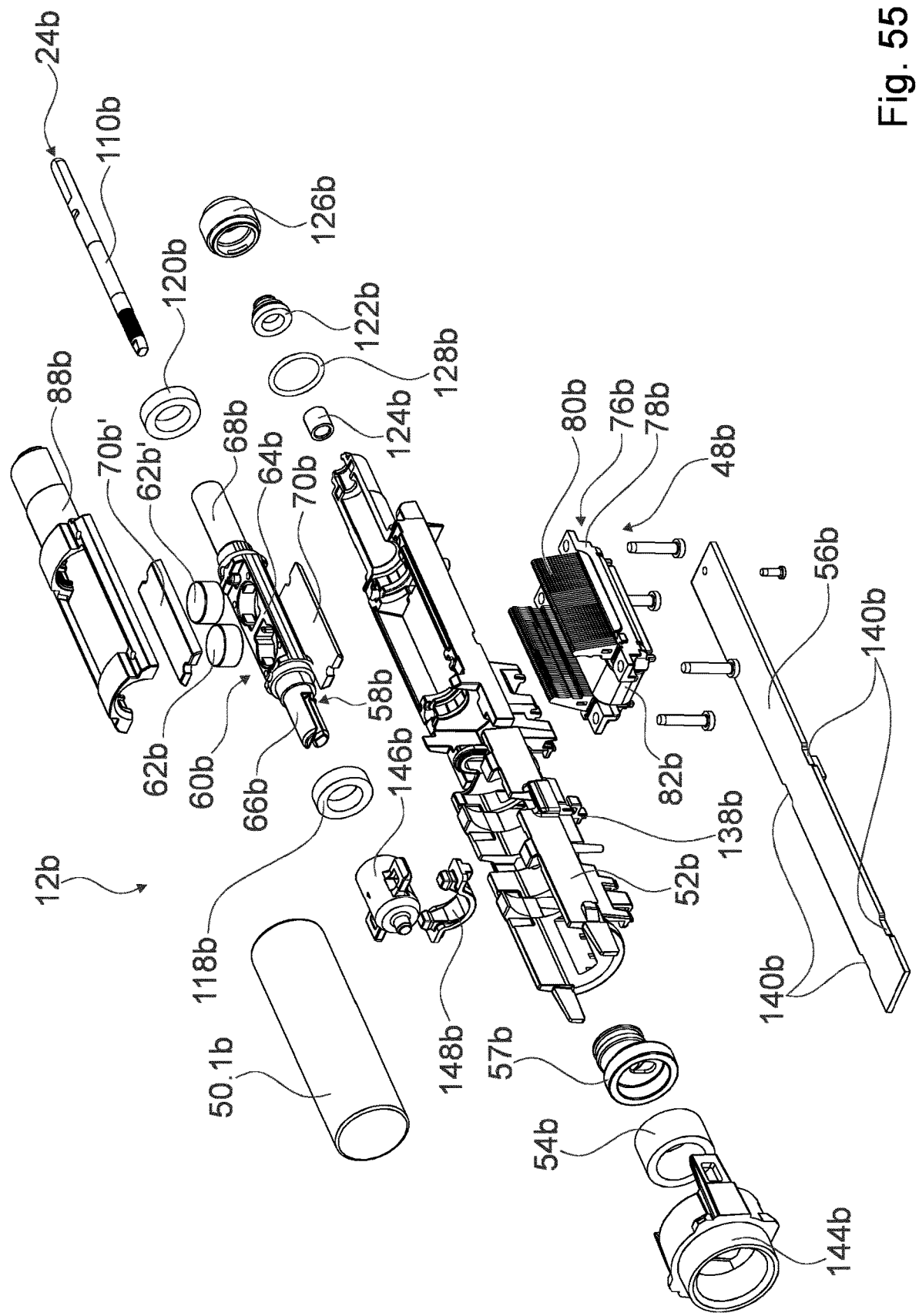
Figure 56:
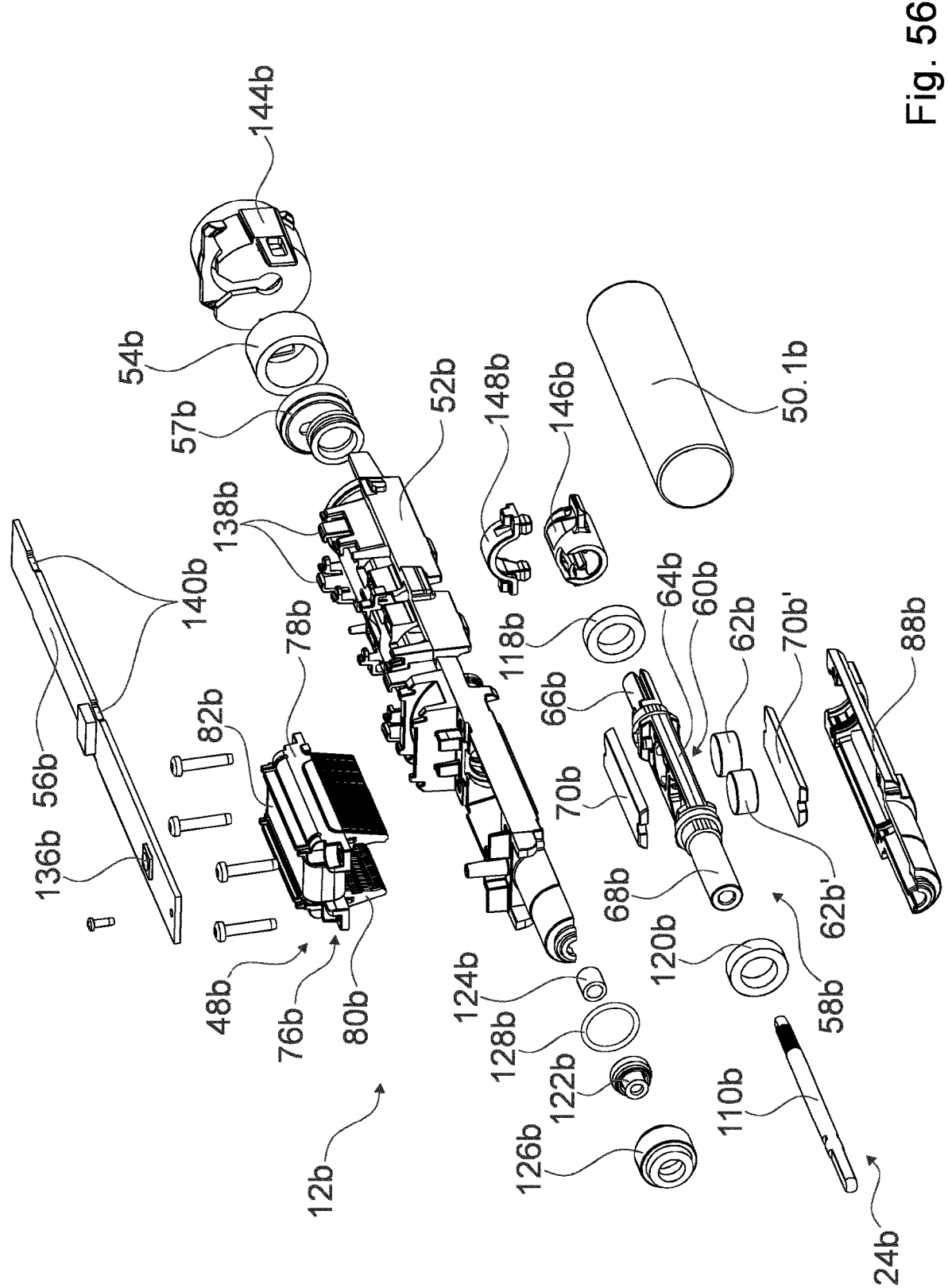
Figure 57:
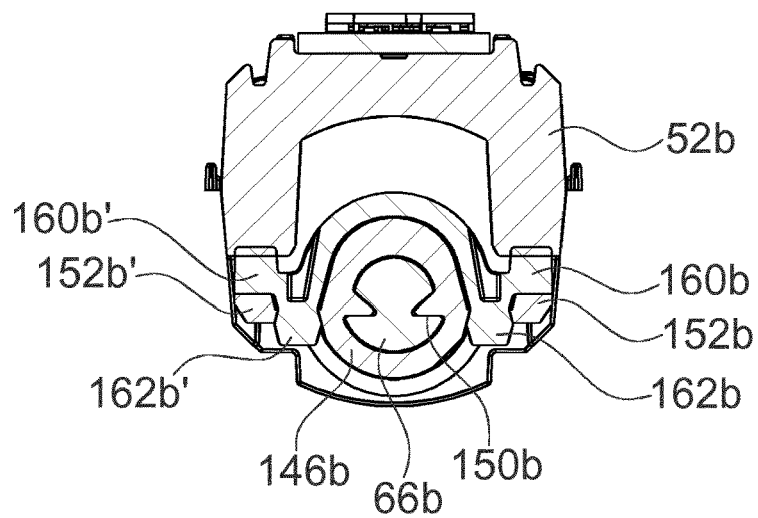
Figure 58:
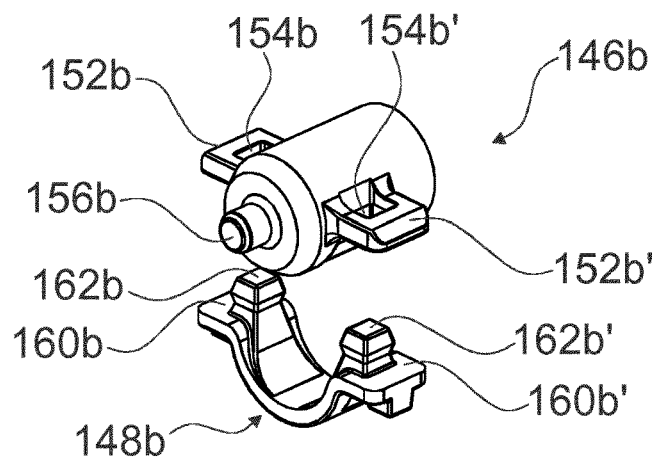
Figure 59:
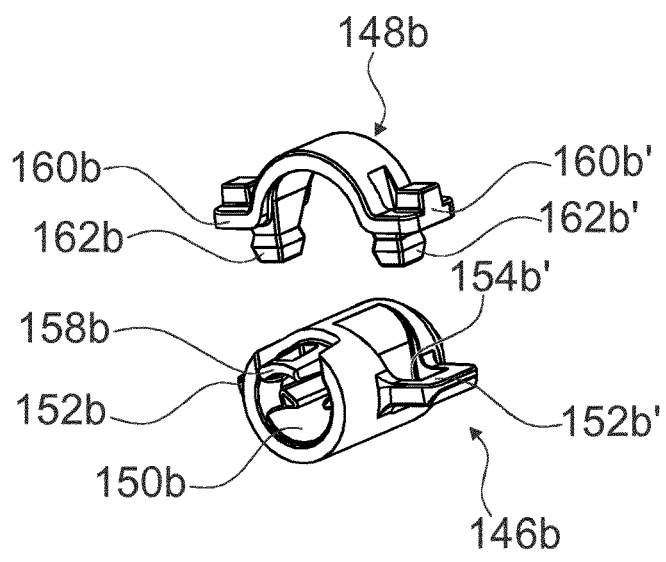

In the figures:

FIG. 1 shows a brush attachment according to the invention with a brush head and with an interface receptacle in a first 3D view, FIG. 2 shows the brush attachment according to the invention with the interface receptacle in a second 3D view, FIG. 3 shows the brush attachment according to the invention in a third 3D view, FIG. 4 shows the brush attachment according to the invention with the brush head in a plan view from the front, FIG. 5 shows the brush attachment according to the invention with the brush head in a plan view from the side, FIG. 6 shows the brush attachment according to the invention in a plan view from the rear, FIG. 7 shows the brush attachment according to the invention in a plan view directed along a longitudinal axis onto the interface receptacle, FIG. 8 shows the brush attachment according to the invention in a plan view directed along a longitudinal axis onto the brush head, FIG. 9 shows the brush attachment according to the invention in a longitudinal sectional illustration along the section line IX-IX, FIG. 10 shows the brush attachment according to the invention in a longitudinal sectional illustration along the section line X-X, FIG. 11 shows the brush attachment according to the invention in a cross-sectional illustration along the section line XI-XI, FIG. 12 shows the brush attachment according to the invention in a cross-sectional illustration along the section line XII-XII, FIG. 13 shows the brush attachment according to the invention in a cross-sectional illustration along the section line XIII-XIII, FIG. 14 shows the brush attachment according to the invention in a cross-sectional illustration along the section line XIV-XIV, FIG. 15 shows the brush attachment according to the invention in a cross-sectional illustration along the section line XV-XV, FIG. 16 shows a toothbrush handpiece according to the invention with a housing and with an interface in a plan view from the front, FIG. 17 shows the toothbrush handpiece according to the invention with the housing and with the interface in a plan view from the side, FIG. 18 shows the toothbrush handpiece according to the invention with the housing and with the interface in a plan view from the rear, FIG. 19 shows an electric toothbrush with the electric toothbrush handpiece and with the brush attachment in a first 3D view, FIG. 20 shows the electric toothbrush with the electric toothbrush handpiece and with the brush attachment in a second 3D view, FIG. 21 shows an electric toothbrush with the electric toothbrush handpiece and with the brush attachment in a plan view from the front, FIG. 22 shows an electric toothbrush with the electric toothbrush handpiece and with the brush attachment in a partially sectional illustration from the side, FIG. 23 shows the brush attachment with a first bristle array arrangement in a plan view from the side, FIG. 24 shows the brush head of the brush attachment with an alternative second bristle array arrangement in a plan view from the front, FIG. 25 shows the brush head of the brush attachment with an alternative third bristle array arrangement in a plan view from the front, FIG. 26 shows the brush head of the brush attachment with an alternative fourth bristle array arrangement in a plan view from the front, FIG. 27 shows the brush head of the brush attachment with an alternative fifth bristle array arrangement in a plan view from the front, FIG. 28 shows the brush head of the brush attachment with an alternative sixth bristle array arrangement in a plan view from the front, FIG. 29 shows the brush head of the brush attachment with an alternative seventh bristle array arrangement in a plan view from the front, FIG. 30 shows the brush head of the brush attachment with an alternative eighth bristle array arrangement in a plan view from the front, FIG. 31a shows the brush head of the brush attachment with an alternative ninth bristle array arrangement in a plan view from the front, FIG. 31b shows the brush head of the brush attachment with the alternative ninth bristle array arrangement in a 3D view, FIG. 32a shows the brush head of the brush attachment with an alternative tenth bristle array arrangement in a plan view from the front, FIG. 32b shows the brush head of the brush attachment with the alternative tenth bristle array arrangement in a 3D view, FIG. 33a shows the brush head of the brush attachment with an alternative eleventh bristle array arrangement in a plan view from the front, FIG. 33b shows the brush head of the brush attachment with the alternative eleventh bristle array arrangement in a 3D view, FIG. 34a shows the brush head of the brush attachment with an alternative twelfth bristle array arrangement in a plan view from the front, FIG. 34b shows the brush head of the brush attachment with the alternative twelfth bristle array arrangement in a 3D view, FIG. 35a shows the brush head of the brush attachment with an alternative thirteenth bristle array arrangement in a plan view from the front, FIG. 35b shows the brush head of the brush attachment with the alternative thirteenth bristle array arrangement in a 3D view, FIG. 36 shows the brush head of the brush attachment with an alternative fourteenth bristle array arrangement in a plan view from the front, FIG. 37 shows the brush head of the brush attachment with an alternative fifteenth bristle array arrangement in a plan view from the front, FIG. 38 shows the brush head of the brush attachment with an alternative sixteenth bristle array arrangement in a plan view from the front, FIG. 39 shows the brush head of the brush attachment with an alternative seventeenth bristle array arrangement in a plan view from the front, FIG. 40 shows a part of the toothbrush handpiece according to the invention with a frame unit, with an energy store, with a drive unit and with the interface in a first 3D view, FIG. 41 shows the part of the toothbrush handpiece according to the invention with the frame unit, with the energy store, with the drive unit and with the interface in a second 3D view, FIG. 42 shows the part of the toothbrush handpiece according to the invention with the frame unit, with the energy store, with the drive unit and with the interface in an exploded illustration in the first 3D view, FIG. 43 shows the part of the toothbrush handpiece according to the invention with the frame unit, with the energy store, with the drive unit and with the interface in an exploded illustration in the second 3D view, FIG. 44 shows a part of the toothbrush handpiece according to the invention with the frame unit, with an alternative energy store, with the drive unit and with the interface in a third 3D view, FIG. 45 shows an alternative brush attachment according to the invention in a plan view directed along a longitudinal axis onto the interface receptacle, FIG. 46 shows the alternative brush attachment according to the invention in a longitudinal sectional illustration corresponding to the section line IX-IX as per FIG. 8 of the first example embodiment, FIG. 47 shows the alternative brush attachment according to the invention in a longitudinal sectional illustration corresponding to the section line X-X as per FIG. 8 of the first example embodiment, FIG. 48 shows the alternative brush attachment according to the invention in a cross-sectional illustration along the section line XLVIII-XLVIII, FIG. 49 shows the alternative brush attachment according to the invention in a cross-sectional illustration along the section line XLIX-XLIX, FIG. 50 shows the alternative brush attachment according to the invention in a cross-sectional illustration along the section line L-L, FIG. 51 shows the alternative brush attachment according to the invention in a cross-sectional illustration along the section line LI-LI, FIG. 52 shows the alternative brush attachment according to the invention in a cross-sectional illustration along the section line LII-LII, FIG. 53 shows a part of an alternative toothbrush handpiece according to the invention with a frame unit, with an energy store, with a drive unit and with the interface and a frame unit of the charging coil in a first 3D view, FIG. 54 shows the part of the alternative toothbrush handpiece according to the invention with the frame unit, with the energy store, with the drive unit and with the interface and a frame unit of the charging coil in a second 3D view, FIG. 55 shows the part of the alternative toothbrush handpiece according to the invention with the frame unit, with the energy store, with the drive unit and with the interface and a frame unit of the charging coil in an exploded illustration in the first 3D view, FIG. 56 shows the part of the alternative toothbrush handpiece according to the invention with the frame unit, with the energy store, with the drive unit and with the interface and a frame unit of the charging coil in an exploded illustration in the second 3D view, FIG. 57 shows the part of an alternative toothbrush handpiece according to the invention with the frame unit, with the energy store, with the drive unit which has a resetting unit which is composed of a shaft wing and a spring and damping element, with the interface and with a frame unit of the charging coil in a sectional illustration along LVII-LVII through the shaft wing and the spring and damping element, FIG. 58 shows the shaft wing and the spring and damping element of the drive unit of the alternative toothbrush handpiece according to the invention in an exploded illustration in the first 3D view, and FIG. 59 shows the shaft wing and the spring and damping element of the drive unit of the alternative toothbrush handpiece according to the invention in an exploded illustration in the second 3D view.

DESCRIPTION OF THE EXEMPLARY EMBODIMENTS

FIGS. 1 to 15 show a brush attachment 10a. The brush attachment 10a is intended for a toothbrush handpiece 12a. The brush attachment 10a is intended for an electric toothbrush handpiece 12a. The brush attachment 10a is implemented of an exchangeable brush. The brush attachment 10a and/or an interface receptacle 20a or 24a is basically designed for use with electric toothbrushes 90a with a pivoting movement or with a vibrating movement. The brush attachment 10a and/or the interface receptacle 20a or 24a may however also be used for other products, for example manual toothbrushes, in particular reusable toothbrushes, for example exchangeable-head toothbrushes, alternative electric toothbrushes, in particular with translational and/or rotating movements, with attachment parts with interdental cleaners, such as in particular interdental brushes with twisted-in bristles and/or tongue cleaners.

Reference will be made below to FIGS. 1 to 15, which show different views of the brush attachment 10a. Owing to the different views, some elements are not illustrated in all of the figures, and are correspondingly not denoted by reference designations in all of the figures.

The brush attachment 10a has a head portion 14a. The head portion 14a comprises a brush head 16a. Furthermore, the brush attachment 10a has an attachment portion 18a. The attachment portion 18a comprises an interface receptacle 20a. Furthermore, the brush attachment 10a has a neck portion 22a arranged between the head portion 14a and the attachment portion 18a. The head portion 14a, the attachment portion 18a and the neck portion 22a are in each case spatial portions of the brush attachment 10a. The head portion 14a, the attachment portion 18a and the neck portion 22a are in each case axial sub-portions of the brush attachment 10a. Furthermore, the brush attachment 10a is advantageously composed of exactly three portions, specifically the head portion 14a, the neck portion 22a and the attachment portion 18a. The portions advantageously directly adjoin one another. The head portion 14a, the attachment portion 18a and the neck portion 22a together extend in an axial direction over the entire brush attachment 10a.

As viewed from a front side, a general shape of the brush attachment 10a forms a profile from a relatively large width in the attachment portion 18a to a narrowing in the neck portion 22a to a relatively large width in the head portion 14a. The brush head 16a of the brush attachment 10a has a narrow, long basic shape. As viewed from a front side, the brush head 16a of the brush attachment 10a is of substantially elliptical shape. As viewed from the side, the brush head 16a has a constant thickness. It would however also be conceivable for the brush head 16a to have, as viewed from the side, a profile such as for example an undulating shape or a thickness which increases toward the neck region. Furthermore, additional functional elements such as for example tongue cleaners may influence this dimension of the brush head 16a. Without bristles, the brush head 16a has a height of 3 mm to 9 mm, preferably of 4 mm to 6 mm. The brush head 16a has no sharp edges. Furthermore, the brush attachment 10a is of substantially rotationally symmetrical shape in the neck portion 22a and in the attachment portion 18a, wherein a smooth transition occurs, and the rotational symmetry is lost, in the direction of the head portion 14a. The transition between the neck portion 22a and the head portion 14a is realized preferably by means of a waisted portion, which forms a minimum diameter of the brush attachment 10a. A profile without a waisted portion would however alternatively also be conceivable. The consequence is that the head portion 14a takes on a more bulky, less elegant appearance and is less differentiated from the neck portion 22a. Here, the brush attachment 10a is of conical form in the neck portion 22a, wherein a diameter increases toward the attachment portion 18a. A conical shape of the neck portion 22a is continued in the attachment portion 18a, wherein the brush attachment 10a is furthermore, in the attachment portion 18a, of concave conical form toward a free end. Prior to a free end averted from the brush head 16a, the brush attachment 10a has a short portion cut in frustoconical shape, which forms a bevel and by means of which a drip edge 108a is formed. The drip edge 108a forms a hard transition from the bevel into the rounded profile of the outer skin. The drip edge 108a forms a radially outermost edge of the brush attachment 10a. Measured as a surface normal with respect to the longitudinal axis, the bevel has an angle of 30° to 70°, preferably of 40° to 60°. Furthermore, as viewed in an axial direction, the drip edge 108a has a spacing of 0.5 mm to 4 mm, preferably of 1 mm to 3 mm, to the standing surface. The drip edge 108a furthermore has a diameter of 12 mm to 20 mm, preferably of 14 mm to 18 mm. By means of the present design, it is possible for both geometrically relatively large handpieces and also relatively slim handpieces to be coupled in a visually appealing manner to the brush attachment 10a. In the case of wide hand parts, the drip edge 108a and the bevel form a termination, whereas, in the case of slim hand parts, the drip edge 108a and the bevel form a transition. Furthermore, the drip edge 108a has the function whereby, when the brush attachment 10a is standing on a standing surface, liquid advantageously drips off the drip edge. Furthermore, by means of the drip edge 108a, less liquid runs in the direction of the standing surface, and thus, in the installed state, it is also the case that less liquid flows in the direction of the interface 24a.

The standing surface is formed at a free end, averted from the brush head, of the attachment portion 18a. A base body 26a of the brush attachment 10a forms the standing surface. The standing surface is formed by a ring-shaped surface of the base body 26a which is arranged around the longitudinal axis. Here, the surface has a width of 0.5 mm to 2 mm, preferably of 0.7 mm to 1.5 mm. Furthermore, an outer diameter of the standing surface amounts to 9 mm to 17 mm, preferably 11 mm to 15 mm, and an inner diameter amounts to 7 mm to 15 mm, preferably 9 mm to 13 mm. The standing surface makes it possible for the brush attachment 10a to be set down on a planar surface such that a main extent direction 98a of the brush attachment 10a extends substantially perpendicular to the surface. The question of whether the standing surface can perform its function effectively is dependent on various factors which influence the center of gravity, for example a configuration of the bristle array 43a, in particular of the bristle length, and/or a mass distribution in the body.

The brush attachment 10a has an axial length of 50 mm to 110 mm, preferably of 70 mm to 90 mm. Furthermore, the brush attachment 10a has, in the head portion 14a, a width of 7 mm to 16 mm, preferably of 10 mm to 14 mm. In the neck portion 22a, the brush attachment 10a has a width of 3 mm to 8 mm, preferably of 5 mm to 7 mm. In the neck portion 18a, the brush attachment has a width of 12 mm to 20 mm, preferably of 14 mm to 18 mm.

Furthermore, the brush attachment 10a has a supporting base body 26a. The supporting base body 26a has a hard component. The supporting base body 26a is composed of a hard component. It would however basically also be conceivable for the base body to be composed of multiple different hard components. In particular, it would thus be possible to realize different characteristics in different body parts of the base body 26a by means of the various components. For example, it would be possible for the interface receptacle 20a to be formed from a material for a good form and good characteristics of the interface receptacle 20a, whereas the head portion 14a itself is composed of a second material which is more resistant to chemical oral hygiene agents such as toothpaste. Alternatively, use may be made of plastics of varying density or else of specific masterbatch with different density. For vibrating toothbrushes such as sonic, ultrasonic etc., the weight distribution in the product may be of extremely high relevance for the propagation of the vibrations. For example, it would be possible for components of the base body 26a or else other components to be designed to be of high density in order to increase the weight in order to optimize vibration. Furthermore, by means of heavy regions, a certain weight distribution can be realized in order to obtain optimum vibration. For example, with a second, heavy hard material, in particular 2-component injection molding, it is preferably even possible for a ring to be introduced by injection molding on the inside so as not to be visible. Three hard components, and/or a combination with soft components, are furthermore also conceivable. The supporting base body 26a forms a supporting structure of the brush attachment 10a. The supporting base body 26a forms a supporting structure of the brush head 16a. Furthermore, the supporting base body 26a forms a supporting delimitation of the interface receptacle 20a. Furthermore, the brush head 16a is coupled substantially rigidly to the interface receptacle 20a by means of the supporting base body 26a. The supporting base body 26a extends from the attachment portion 18a via the neck portion 22a to the head portion 14a. The base body 26a is implemented as a single piece. It would however basically also be conceivable for the base body 26a to be at least partially interrupted, and for the brush attachment 10a to have, for example, a movable joint by means of which the brush head 16a is movably mounted.

The brush attachment 10a may also be formed only from hard components, or be composed only of a base body 26a without overmold 32a.

Furthermore, the brush attachment 10a has an overmold 32a. The overmold 32a is composed of a different material than the base body 26a. The overmold 32a has a soft component. The overmold 32a is composed of a soft component. The overmold 32a and the base body 26a are produced in a multi-component injection molding process. In principle, however, some other production method that appears to be expedient to a person skilled in the art would also be conceivable. The overmold 32a encloses a substantial part of an outer surface of the base body 26a. In the region of a front side of the brush head 16a, the base body 26a is free from the overmold 32a. In this way, it is possible in particular for an introduction of bristles to be made possible more effectively. it would however also be conceivable for the brush head 16a to be equipped with soft elements composed of the soft component of the overmold 32a. Furthermore, the base body 26a is free from the overmold 32a in the region of the interface receptacle 20a. Furthermore, the base body 26a has, on a rear side of the brush head 26a, a support region 92a which is free from the overmold 32a. The support region 92a serves in particular for supporting the brush head 16a during an introduction of bristles into the base body 26a and/or during the overmolding of the base body 26a. Here, the overmold 32a would deflect, and, in the process, would not allow accurate positioning for a bristle-fitting process. Additionally, a tongue cleaner could also be realized on the rear side of the brush head 26a. The tongue cleaner may for example have studs and/or lamellae, in particular in circles or in a straight line, or undulating longitudinal or transverse strips, and be produced from a hard component, a soft component or hard and soft components. In the case of soft components being used, the soft component may be formed for example as a ring around the support region 92a. Furthermore, the base body 26a has, in the neck portion 22a, a logo region 94a which is free from the overmold 32a. The logo region 94a serves in particular for the application of a print to the base body 26a, for example by pad printing, laser labelling or embossment. Alternatively, a labelling may be realized already as a labelling insert in the injection molding tool. Here, the labelling is realized as recessed or elevated lettering. A secondary function of the logo region 94a is furthermore support for accurate positioning of the base body 26a in the injection molding tool during the injection of a second component, or the soft component, for the overmold 32a.

The interface receptacle 20a has multiple partial receptacle regions 36a, 38a, 40a, 96a. The interface receptacle 20a is divided into multiple partial receptacle regions 36a, 38a, 40a, 96a. The interface receptacle 20a has a first, substantially rectangular-cuboidal partial receptacle region 36a. The first partial receptacle region 36a forms a partial receptacle region of the interface receptacle 20a. The first partial receptacle region 36a is configured for receiving a tip of the interface 24a of the toothbrush handpiece 12a. The first partial receptacle region 36a is configured for receiving a front, free spindle region of a spindle 110a of the interface 24a of the toothbrush handpiece 12a. The first partial receptacle region 36a forms a partial receptacle region, facing toward the brush head 16a, of the interface receptacle 20a. Furthermore, the first, substantially rectangular-cuboidal partial receptacle region 36a has a narrowing 42a. The first partial receptacle region 36a narrows radially from at least one side at the narrowing 42a. The first partial receptacle region 36a narrows radially from two opposite sides at the narrowing 42a. Here, the narrowing 42a is formed by two oppositely situated bevelled shoulders. Here, a cross section of the first partial receptacle region 36a decreases in an axial direction toward the brush head 16a. On a side of the narrowing 42a facing toward the second partial receptacle region 38a, the first partial receptacle region 36a has an axial length of 2 mm to 7 mm, preferably of 3.5 mm to 5 mm. On a side of the narrowing 42a averted from the second partial receptacle region 38a, the first partial receptacle region 36a has an axial length of 5 mm to 11 mm, preferably of 7 mm to 9 mm. A rear side of the first partial receptacle region 36a has, on a side of the narrowing 42a facing toward the second partial receptacle region 38a, a maximum spacing of 0.5 mm to 3 mm, preferably of 1 mm to 2 mm, to a longitudinal axis of the brush attachment 10a. Furthermore, the rear side of the first partial receptacle region 36a has, on a side of the narrowing 42a averted from the second partial receptacle region 38a, a maximum spacing of 0.8 mm to 1.6 mm, preferably of 1.1 mm to 1.4 mm, to a longitudinal axis of the brush attachment 10a. Furthermore, the front side of the first partial receptacle region 36a has, on a side of the narrowing 42a averted from the second partial receptacle region 38a, a maximum spacing of 0.8 mm to 1.6 mm, preferably of 1.1 mm to 1.4 mm, to a longitudinal axis of the brush attachment 10a. The sides of the first partial receptacle region 36a have, on a side of the narrowing 42a facing toward the second partial receptacle region 38a, a maximum spacing of 0.5 mm to 3 mm, preferably of 1 mm to 2 mm, to a longitudinal axis of the brush attachment 10a. Furthermore, the sides of the first partial receptacle region 36a have, on a side of the narrowing 42a averted from the second partial receptacle region 38a, a maximum spacing of 1 mm to 2 mm, preferably of 1.3 mm to 1.7 mm, to a longitudinal axis of the brush attachment 10a. The first partial receptacle region 36a has a certain "taper" owing to the required demoldability during the production process, in particular during the injection molding process. The clamping of the spindle 110a occurs in the first partial receptacle region 36a. The spindle 110a does not however lie completely thereon, because complementary geometries with an air gap in between are formed. For example, the spindle has, as viewed in a cross section, a rounded geometry, which is arranged in a polygonal part of the interface geometry.

Furthermore, the interface receptacle has a second, substantially cylindrical partial receptacle region 38a. The second partial receptacle region 38a projects axially at least partially into the first partial receptacle region 36a. The second partial receptacle region 38a is arranged so as to axially fully overlap the first partial receptacle region 36a. The second partial receptacle region 38a is arranged axially entirely within the first partial receptacle region 36a. The second partial receptacle region 38a is arranged at an end of the first partial receptacle region 36a which is averted from the end of the interface receptacle 20a. The second partial receptacle region 38a terminates, on a side facing toward the opening of the interface receptacle 20a, together with the first partial receptacle region 36a. A maximum cross section of the second partial receptacle region 38a perpendicular to a main extent direction 98a of the brush attachment 10a is larger than a corresponding maximum cross section of the first partial receptacle region 36a. The first partial receptacle region 36a is eccentric in relation to the second partial receptacle region 38a. The first partial receptacle region 36a projects, in a region of overlap with the second pressure receptacle region, with at least two edges axially through the second partial receptacle region 38a. The first partial receptacle region 36a projects, in a region of overlap with the second pressure receptacle region, with at least two edges radially out of the second partial receptacle region 38a. Furthermore, the second partial receptacle region 38a has a narrowing 100a. The second partial receptacle region 38a narrows from at least one side radially toward the first partial receptacle region 36a at the narrowing 100a. Here, the narrowing 100a is formed by a bevelled shoulder. The narrowing 100a has an angle of 25° to 65°, preferably of 35° to 55°, with respect to the longitudinal axis of the brush attachment 10a. A minimum spacing of the narrowing to the longitudinal axis of the brush attachment 10a amounts to 0.3 mm to 1.5 mm, preferably 0.5 mm to 1 mm. The narrowing has an axial length of 0.2 mm to 2 mm, preferably of 0.5 mm to 1.5 mm. Here, a cross section of the second partial receptacle region 38a decreases in an axial direction toward the brush head 16a. The first partial receptacle region 36a and the second partial receptacle region 38a are jointly of mirror-symmetrical form. The second partial receptacle region 38a has, on a side averted from the brush head 16a, a diameter of 2 mm to 6 mm, preferably of 3.5 mm to 5 mm. Furthermore, the second partial receptacle region 38a has a length of 2 mm to 6 mm, preferably of 2.5 mm to 4.5 mm. The second partial receptacle region 38a is partially slightly inclined relative to a longitudinal axis of the brush attachment 10a. Here, the second partial receptacle region 38a or the side walls thereof, has an angle of 0.5° to 5°, preferably of 1° to 3°, with respect to the longitudinal axis. Furthermore, on a side facing toward the brush head 16a, the second partial receptacle region forms a bevel toward the first partial receptacle region 36a. The second partial receptacle region 38a serves for receiving the spindle 110a and for guiding the spindle 110a into the correct position in the interface receptacle 20a. For this purpose, the spindle 110a is, at this location, of rounded form on one side, in the direction of the rear side, and has a flattened portion on the front side.

Furthermore, the interface receptacle 20a has a third, frustoconical partial receptacle region 40a. The third partial receptacle region 40a axially directly adjoins the second partial receptacle region 38a. The third partial receptacle region 40a has no overlap with the first partial receptacle region 36a and the second partial receptacle region 38a. Furthermore, the third partial receptacle region 40a is arranged at least approximately coaxially with respect to the second partial receptacle region 38a. Preferably, the third partial receptacle region 40a directly adjoins the first partial receptacle region 36a and the second partial receptacle region 38a. The third partial receptacle region 40a adjoins the first partial receptacle region 36a and the second partial receptacle region 38a on a side facing toward the opening of the interface receptacle 20a. Preferably, the interface receptacle 20a comprises a union of the first partial receptacle region 36a, the second partial receptacle region 38a and the third partial receptacle region 38a. A maximum cross section of the third partial receptacle region 40a perpendicular to the main extent direction 98a of the brush attachment 10a is larger than a corresponding maximum cross section of the second partial receptacle region 38a. At an end averted from the second partial receptacle region 26a, the third partial receptacle region 40a has a diameter of 5 mm to 13 mm, preferably of 7 mm to 11 mm. At an end facing toward the second partial receptacle region 26a, the third partial receptacle region 40a has a diameter of 4 mm to 12 mm, preferably of 6 mm to 10 mm. Furthermore, the third partial receptacle region 40a has an axial length of 3 mm to 11 mm, preferably of 5 mm to 9 mm. The third partial receptacle region 40a is substantially rotationally symmetrical.

Furthermore, the interface receptacle 20a has a fourth partial receptacle region 96a. The fourth partial receptacle region 96a has a frustoconical shape, wherein a lateral surface of the partial receptacle region 96a is concavely curved. The fourth partial receptacle region 96a axially directly adjoins the third partial receptacle region 40a. Furthermore, the fourth partial receptacle region 96a is arranged approximately coaxially with respect to the third partial receptacle region 40a. The fourth partial receptacle region 96a directly adjoins the third partial receptacle region 40a. On a side facing toward the opening of the interface receptacle 20a, the fourth partial receptacle region 96a adjoins the third partial receptacle region 40a. The fourth partial receptacle region 96a forms the opening of the interface receptacle 20a. The fourth partial receptacle region 96a serves for receiving a shank of the interface 24a of the toothbrush handpiece 12a. The fourth partial receptacle region 96a forms the location at which a spindle 110a of the toothbrush handpiece 12a is inserted into the brush attachment 10a. The fourth partial receptacle region 96a serves as an insertion aid and starts with a small shoulder in relation to the standing surface. The fourth partial receptacle region 96a has, at a free end, a diameter of 7 mm to 15 mm, preferably of 9 mm to 13 mm. At a transition to the third partial receptacle region 40a, the fourth partial receptacle region 96a has a diameter of 5 mm to 13 mm, preferably of 7 mm to 11 mm. Furthermore, the fourth partial receptacle region 96a axially has a length of 1 mm to 5 mm, preferably of 1.5 mm to 3.5 mm. The fourth partial receptacle region 96a is substantially rotationally symmetrical. The third partial receptacle region 40a and the fourth partial receptacle region 96a serve for receiving a cam of the toothbrush handpiece 12a. If no cam is present, the spindle 110a is guided through the "space" through which it can be guided, because the spindle 110a generally has a smaller volume than a cam.

The interface receptacle 20a is formed by a universal interface receptacle. The interface receptacle 20a is suitable for receiving at least two different interfaces 24a of different toothbrush handpieces 12a. The interface receptacle 20a therefore fits with interfaces 24a of different shape and/or dimensions. The supporting base body 26a, which partially adjoins the interface receptacle 20a, has a clamping unit 28a for this purpose. The clamping unit 28a is configured for being elastically deflected for the purposes of receiving an interface 24a of a toothbrush handpiece 12a. The clamping unit 28a is configured for clamping the spindle 110a. The clamping unit 28a directly adjoins the interface receptacle 20a. The clamping unit 28a is arranged axially in a region of the first partial receptacle region 36a. The clamping unit 28a is arranged axially entirely in a region of the first partial receptacle region 36a. Furthermore, the clamping unit 28a is arranged partially axially in a region of the second partial receptacle region 38a.

The clamping unit 28a has an at least partially freestanding clamping wall 30a, 30a' which directly adjoins the interface receptacle 20a. The clamping unit 28a has two partially freestanding clamping walls 30a, 30a' which directly adjoin the interface receptacle 20a on opposite sides. The clamping walls 30a, 30a' adjoin in each case one side of the interface receptacle 20a. The first partial receptacle region 36a of the interface receptacle 20a is delimited to two opposite sides by the clamping walls 30a, 30a'. The clamping walls 30a, 30a' are partially free-standing relative to a remaining part of the base body 26a. The clamping walls 30a, 30a' are partially set free in relation to the remaining part of the base body 26a by means of slots and apertures with respect to the interface receptacle 20a, which slots and apertures extend in each case parallel to the longitudinal axis. In each case proceeding from the interface receptacle 20a, the slots are arranged behind the clamping walls 30a, 30a', whereas the apertures are arranged adjacent to the clamping walls 30a, 30a' and open into the interface receptacle 20a. The slots and apertures each have a length of 6.5 mm to 9 mm, preferably of 7 mm to 8 mm. The overall dimension of slot together with the width of the clamping wall amounts to 1 mm to 2.5 mm, preferably 1.2 mm to 1.8 mm. The apertures each have a height of 0.02 mm to 0.3 mm, preferably of 0.05 mm to 0.15 mm, and a width of 0.1 mm to 0.5 mm, preferably of 0.15 mm to 0.3 mm. The clamping walls 30a, 30a' are configured for being deflected radially outward when the brush attachment 10a is attached to a toothbrush handpiece 12a. The clamping walls 30a, 30a' of the clamping unit 28a extend axially in an insertion direction 102a of the interface 24a beyond the narrowing 42a of the first partial receptacle region 36a. The clamping walls 30a, 30a' of the clamping unit 28a are, in the insertion direction 102a, arranged axially behind the narrowing 100a of the second partial receptacle region 38a. The overmold 32a directly encloses at least a substantial part of the clamping walls 30a, 30a' in each case in at least one plane 34a. The overmold 32a encloses the clamping walls 30a, 30a' in each case in a radial direction on a side averted from the interface receptacle 20a. The clamping walls 30a, 30a' are delimited to two sides by the overmold 32a. As viewed radially from the interface receptacle 20a, the overmold 32a is situated behind the clamping walls 30a, 30a'. The base body 26a has, behind the clamping walls 30a, 30a' on a side averted from the interface receptacle 20a, in each case one two-stage recess which becomes narrower toward the inside and wider toward the outside. In a region of the apertures of the base body 26a which have been formed by injection molding by means of the overmold 32a, the overmold 32a directly adjoins the interface receptacle 20a. The overmold 32a serves for cushioning an elastic deflection of the clamping walls 30a, 30a'. The clamping walls 30a, 30a' have an axial spacing to the standing surface of 3 mm to 6 mm, preferably of 4 mm to 5 mm. Furthermore, the clamping walls 30a, 30a' each have a wall thickness of 0.3 mm to 1.2 mm, preferably of 0.5 mm to 0.9 mm. The clamping walls 30a, 30a' are designed such that, in the inserted state of the spindle 110a, they lie flat against the spindle 110a. The spindle 110a is of laterally flat design in the region of the clamping walls 30a, 30a'. The contact surfaces of the clamping walls 30a, 30a' are likewise of smooth form.

A clamping force imparted by the clamping walls 30a, 30a' is basically dependent on the spindle construction or on the geometry of the spindle 110a and the dimensions of the spindle 110a. Clamping occurs not by means of punctiform contact but by means of areal contact of the parts. In parallel with the lateral clamping, there is automatically also a certain facility for clamping of the element on the rear side, between the two apertures. A desired clamping force of the clamping walls 30a, 30a' amounts to 1 kg to 4 kg, preferably 1.2 kg to 2.5 kg.

It would basically also be conceivable for the free spaces around the inner geometry not to be filled with overmold 32a. This could in particular constitute a single-component solution, for example by virtue of the brush attachment 10a being composed only of a hard component, and technical geometries, such as in particular the clamping walls 30a, 30a', not being overmolded, and thus being free-standing. An inexpensive brush attachment 10a could be created in this way. Furthermore, a further facility for ventilation during the insertion of the spindle 110a can be created.

Furthermore, the clamping unit 28a has a partially free-standing clamping web 104a. The clamping web 104a is arranged axially at the height of the clamping walls 30a, 30a'. The clamping web 104a delimits the first partial receptacle region 36a of the interface receptacle 20a to a third side. The clamping web 104a of the clamping unit 28a extends axially in an insertion direction 102a of the interface 24a beyond the narrowing 42a of the first partial receptacle region 36a. The overmold 32a directly encloses at least a substantial part of the clamping web 104a in at least one plane 34a. The overmold 32a encloses the clamping web 104a in a radial direction on a side averted from the interface receptacle 20a.

The overmold 32a has various functions. By means of the overmold 32a, a high level of flexibility of the clamping, and of the resetting, can be achieved. Furthermore, it is generally possible for improved grip of the brush attachment 10a to be realized. Furthermore, in the assembled state, the overmold 32a has sealing functions for example of the interface receptacle 20a with respect to the environment. Furthermore, the overmold 32a serves for damping of the brush head 16a. The possible molding of a tongue cleaner out of the overmold has already been discussed.

Furthermore, the clamping unit 28a has a clamping elevation 106a which projects at least partially into the interface receptacle 20a. The clamping elevation 106a is realized as an elevation on an inner wall, which delimits the interface receptacle 20a, of the base body 26a. The clamping elevation 106a is arranged axially entirely in a region of the first partial receptacle region 36a. The clamping elevation 106a is, in the insertion direction 24a, arranged axially behind the narrowing 42a of the first partial receptacle region 36a. The clamping elevation 106a is at an axial distance of at least 1 mm, preferably at least 1.5 mm and preferably at most 3 mm, particularly preferably at most 2.5 mm, from the narrowing 42a. The clamping elevation 106a extends axially as far as an end of the first partial receptacle region 36a. For the purposes of demoldability, the clamping elevation 106a extends axially as far as an end of the first partial receptacle region 36a. The clamping elevation 106a has an axial length of 4 mm to 8 mm, preferably of 5 mm to 7 mm. Furthermore, the clamping elevation 106a has a width of 0.7 mm to 1.8 mm, preferably of 1 mm to 1.5 mm, and a height of 0.04 mm to 0.5 mm, preferably of 0.06 mm to 0.3 mm. The clamping elevation 106a furthermore has a spacing to the central axis of 0.7 mm to 1.5 mm, preferably of 1 mm to 1.3 mm. The clamping elevation 106a is arranged on a side the clamping web 104a of the clamping unit 28a. The clamping elevation 106a is arranged on a rear side of the first partial receptacle region 38a. The clamping elevation 106a extends partially axially beyond the clamping web 104a. A pulling-off force of the brush attachment can be set through adaptation of a height of the clamping elevation 106a. The clamping elevation 106a therefore serves for settability of the retention force and for clamping of the spindle 110a in the interface receptacle 20a. A contact surface of the spindle 110a with respect to the clamping elevation 106a preferably has a corrugation and/or roughening.

An illustrated hole array 109a of the brush head 16a in the base body 26a is, as illustrated, designed for the use of conventional filaments. The hole array 109a has three regions. The hole array 109a has a front region, which is directed toward the free end. The front region has two transverse rows. A foremost row has two holes, whereas a second row has three holes. The hole array 109a has an increasing number of holes toward a central region of the hole array 109a. The central region of the hole array 109a is arranged in the center of the hole array 109a and has five transverse rows. The transverse rows each have four holes. Furthermore, the hole array 109a has a rear region, which is directed toward the brush neck. The rear region has three transverse rows. A first transverse row, adjoining the central region, has three holes. This is followed by a further row with three holes. At the free end, another transverse row with two holes is provided. The number of holes decreases toward the neck portion 22a. In order that the different regions can be created, the holes are arranged in transverse rows in order that a displacement and thus cutting/profiling of the bristles is possible.

FIG. 23 shows the brush head 16a with a conventional bristle array 43a with a conventional arrangement of the bristle bundles 44.1a. Here, in particular, different implementations of the bristle array 43a in the hole array 109a are conceivable. For example, bundles of bristles with a pointed and with a rounded cylindrical end may be provided, wherein the bristle array 43a may provide identical bristle bundles 44.1a and/or asymmetrically punched bristle bundles 44a. Furthermore, a central ridge may be formed in the bristle array 43a, wherein the bristle array 43a is in this case composed in particular of cylindrical filaments. Here, a section is in particular implemented such that the front and the rear end are elevated and an elevation and/or a ridge is likewise formed in the center of the bristle array 43a. The central ridge may in this case be realized both by means of flat bristle bundles 44.1a, wherein a profiling is realized by means of multiple small steps, and by means of bristle bundles 44.1a cut at an angle, as shown in FIG. 23. It would alternatively also be conceivable for the ridge to be formed as a relatively tall bundle transverse row, wherein a front and rear end of the bundle transverse row is cut obliquely. As filaments for the bristle bundles 44.1a, various filaments that appear expedient to a person skilled in the art are conceivable, for example 2-component filaments, Stain Devil filaments (of Perlon®), charcoal or spiral/twister filaments in a bristle array of a sonic brush.

Further bristle fitting methods that appear expedient to a person skilled in the art are furthermore also conceivable. For example, it would be conceivable for recesses for AFT plates or for the PTt process to be provided in the brush head 16a. In particular, it would be conceivable for the bristle fitting method to be designed specifically for pivoting and sonic movements. This may be realized for example by means of the PTt process, because here, a minimal head thickness is required, and therefore less "material" is required. It is thus possible to realize a small spacing of the bristles from the edge.

Furthermore, further alternative designs and arrangements of the bristle bundles 44.1a.1 of the bristle array 43a are also conceivable. FIGS. 24 to 39 show, by way of example, different alternative embodiments and arrangements of bristle bundles 44.2a; 44.3a; 44.4a; 44.5a; 44.6a; 44.7a; 44.8a; 44.9a; 44.10a; 44.11a; 44.12a; 44.13a; 44.14a; 44.15a; 44.16a; 44.17a of the bristle array 43a for the brush head 16a. Here, the brush head 16a has in each case one bristle array 43a with at least two significantly differing bristle bundles 44.2a; 44.3a; 44.4a; 44.5a; 44.6a; 44.7a; 44.8a; 44.9a; 44.10a; 44.11a; 44.12a; 44.13a; 44.14a; 44.15a; 44.16a; 44.17a. The bristle bundles 44.2a; 44.3a; 44.4a; 44.5a; 44.6a; 44.7a; 44.8a; 44.9a; 44.10a; 44.11a; 44.12a; 44.13a; 44.14a; 44.15a; 44.16a; 44.17a in this case differ in each case with regard to a shape and/or an orientation.

FIG. 24 shows the brush head 16a of the brush attachment 10a with an alternative second arrangement of the bristle bundles 44a.2 of the bristle array 43a. The bristle bundles 44.2a are each formed by ridges. The bristle bundles 44.2a are each formed by ridges which, in a longitudinal profile, are curved and have different lengths. Here, a bend is in particular individual and may basically also vary within a bristle array 43a and/or within the bristle bundle 44.2a. One of the bristle bundles 44.2a has a ring shape. A proportion of the bristle bundles 44.2a is curved around the ring-shaped bristle bundle 44.2a, whereas a proportion of the bristle bundles 44.2a is curved away from the ring-shaped bristle bundle 44.2a.

FIG. 25 shows the brush head 16a of the brush attachment 10a with an alternative third arrangement of the bristle bundles 44.3a of the bristle array 43a. The bristle bundles 44.3a are each formed by ridges. The bristle bundles 44.3a are each formed by ridges which, in a longitudinal profile, are curved. One of the bristle bundles 44.3a has a ring shape. A remainder of the bristle bundles 44.3a are curved around the ring-shaped bristle bundle 44.3a.

FIG. 26 shows the brush head 16a of the brush attachment 10a with an alternative fourth arrangement of the bristle bundles 44.4a of the bristle array 43a. The bristle bundles 44.4a are in each case partially formed by ridges. Furthermore, two of the bristle bundles 44.4a are formed by conventional circular bundles. A proportion of the bristle bundles 44.4a is curved around the circular bristle bundles 44.4a, whereas a proportion of the bristle bundles 44.4a is curved away from the circular bristle bundles 44.4a.

FIG. 27 shows the brush head 16a of the brush attachment 10a with an alternative fifth arrangement of the bristle bundles 44.5a of the bristle array 43a. The bristle bundles 44.5a are in each case partially formed by ridges. Furthermore, two of the bristle bundles 44.5a are formed by conventional circular bundles. The ridge-like bristle bundles 44.5a are curved around the circular bristle bundles 44.5a.

FIG. 28 shows the brush head 16a of the brush attachment 10a with an alternative sixth arrangement of the bristle bundles 44.6a of the bristle array 43a. The bristle bundles 44.6a in each case partially have an arrow shape, wherein the tips are directed outward. In this way, an advantageous cleaning action can be achieved, in particular in the case of use on a sonic toothbrush or a toothbrush with a reciprocating pivoting movement. Furthermore, several of the bristle bundles 44.6a are formed by conventional circular bundles.

FIG. 29 shows the brush head 16a of the brush attachment 10a with an alternative seventh arrangement of the bristle bundles 44.7a of the bristle array 43a. The bristle bundles 44.7a are formed by conventional circular bundles, wherein a size of the bristle bundles 44.7a varies and the distribution is at least partially random. The distribution in particular has no axis of symmetry parallel to the main directions of the toothbrush. Also integrated are two bristle bundles 44.7a situated one inside the other, wherein one is designed as a circular-ring-shaped bundle, and the other is shaped as a conventional circular bundle situated inside the circular-ring-shaped bundle.

FIG. 30 shows the brush head 16a of the brush attachment 10a with an alternative eighth arrangement of the bristle bundles 44.8a of the bristle array 43a. A proportion of the bristle bundles 44.8a is formed by conventional circular bundles, wherein a size of the bristle bundles 44.8a varies. A further proportion of the bristle bundles 44.8a has an open-die implementation.

FIGS. 31a and 31b show the brush head 16a of the brush attachment 10a with an alternative ninth arrangement of the bristle bundles 44.9a of the bristle array 43a. The bristle bundles 44.9a are each formed by ridges. The bristle bundles 44.9a are each formed by ridges which are of undulating form in a longitudinal profile and/or an end profile. The number of undulation peaks and troughs is in particular variable. It is possible for different undulations to be provided in the same bristle array 43a. The ridges have in each case partially different inclined positions, wherein the angle of the inclined positions in the bristle bundles 44.9a relative to a normal of the brush head 16a increases toward the front and rear end of the bristle array 43a, and the bristle bundles 44.9a of the central ridges stand more vertically.

FIGS. 32a and 32b show the brush head 16a of the brush attachment 10a with an alternative tenth arrangement of the bristle bundles 44a.10 of the bristle array 43a. The bristle bundles 44.10a have an elongate basic shape and have in each case partially different inclined positions. The transversely arranged ridges with an inclined position, considered together, form an X shape when the bristle array is viewed in a longitudinal direction.

FIGS. 33a and 33b show the brush head 16a of the brush attachment 10a with an alternative eleventh arrangement of the bristle bundles 44.11a of the bristle array 43a. The bristle bundles 44.11a are each partially formed by ridges which, in a longitudinal profile, are curved. Furthermore, the bristle bundles 44.11a have in each case partially different inclined positions, with an X shape again being formed.

FIGS. 34a and 34b show the brush head 16a of the brush attachment 10a with an alternative twelfth arrangement of the bristle bundles 44.12a of the bristle array 43a. The bristle bundles 44.12a are each partially formed by ridges which, in a longitudinal profile, are curved. Furthermore, the bristle bundles 44.12a have in each case partially different inclined positions. The main extent of most ridges is parallel to the longitudinal axis of the toothbrush, wherein the bend of the individual ridges is embodied symmetrically to the longitudinal axis of the toothbrush.

FIGS. 35a and 35b show the brush head 16a of the brush attachment 10a with an alternative thirteenth arrangement of the bristle bundles 44.13a of the bristle array 43a. The bristle bundles 44.13a are each partially formed by ridges which, in a longitudinal profile, are curved. Furthermore, the bristle bundles 44.13a have in each case partially different inclined positions. The main extent of the ridges is parallel to the longitudinal axis of the toothbrush, wherein the bend of the individual ridges is embodied symmetrically to the longitudinal axis of the toothbrush.

FIG. 36 shows the brush head 16a of the brush attachment 10a with an alternative fourteenth arrangement of the bristle bundles 44.14a.14 of the bristle array 43a. A proportion of the bristle bundles 44.14a is formed by conventional circular bundles. Furthermore, a proportion of the bristle bundles 44.13a is formed in each case by ridges which are curved in a longitudinal profile and which have in each case partially different inclined positions.

FIG. 37 shows the brush head 16a of the brush attachment 10a with an alternative fifteenth arrangement of the bristle bundles 44.15a of the bristle array 43a. Two of the bristle bundles 44.15a are of elliptical shape. Furthermore, multiple bristle bundles 44.15a are arranged around the elliptical bristle bundles 44.15a, which additional bristle bundles have different, in some cases also converging, inclined positions.

FIG. 38 shows the brush head 16a of the brush attachment 10a with an alternative sixteenth arrangement of the bristle bundles 44.16a of the bristle array 43a. A proportion of the bristle bundles 44.16a has an open-die form configuration and forms in each case the shape of a turbine blade. Furthermore, at least two of the bristle bundles 44.16a are formed by conventional circular bundles. The freeform bristle bundles 44.16a are arranged around the circular bristle bundles 44.16a.

FIG. 39 shows the brush head 16a of the brush attachment 10a with an alternative seventeenth arrangement of the bristle bundles 44.17a of the bristle array 43a. One of the bristle bundles 44.17a is of elliptical shape. A remainder of the bristle bundles 44.17a has an open-die form configuration and forms in each case the shape of a turbine blade. The freeform bristle bundles 44.17a are arranged around the elliptical bristle bundle 44.17a.

The bristle bundles 43a in each case all have a certain symmetry, in particular point symmetry and/or mirror symmetry. Arrangements without symmetry would however basically also be conceivable. Furthermore, yet further arrangements and shapes of the bristle bundles are conceivable, for example in the form of multilevel tufts, wherein the bristle bundles have different heights within the bristle bundle.

FIG. 16 shows an electric toothbrush handpiece 12a. The toothbrush handpiece 12a has an interface 24a for coupling to the brush attachment 10a. The interface 24a has a spindle 110a for direct engagement into the interface receptacle 20a of the brush attachment 10a. The spindle 110a is formed by a metal shaft. Some other embodiment of the spindle 110a that appears expedient to a person skilled in the art would however basically also be conceivable. Furthermore, the toothbrush handpiece 12a has a housing 46a. The housing 46a has a base body 112a composed of a hard component. The base body 112a forms a supporting structure of the housing 46a. The base body 112a is implemented as a single piece. In principle, however, a different embodiment that appears to be expedient to a person skilled in the art, for example a two-shell design, would also be conceivable. The housing 46a furthermore has an overmold 114a composed of a soft material. The overmold 114a is arranged partially on an outer surface of the base body 112a. The overmold 114a forms a grip region of the housing 46a. Furthermore, the electric toothbrush handpiece 12a has a lid 113a. The lid 113a is configured for closing off the housing 112a on a side averted from the interface 24a (FIGS. 16, 17, 18, 19 and 20).

Reference will be made below to FIGS. 40 to 44, which show different views of the toothbrush handpiece 12a, wherein the housing 46a and the lid 113a are omitted from the figures in each case. Owing to the different views, some elements are not illustrated in all of the figures, and are correspondingly not denoted by reference designations in all of the figures.

Furthermore, the toothbrush handpiece 12a has a fix frame unit 52a arranged in the housing 46a. In an assembled state, the frame unit 52a has been pushed into the housing 46a. The frame unit 52a is implemented as a single piece. The frame unit 52a extends axially over a major part of the housing 46a. The frame unit 52a is formed by a plastics frame. The frame unit 52a is composed of plastic, preferably a polypropylene. Some other embodiment of the frame unit 52a that appears expedient to a person skilled in the art would however basically also be conceivable. The frame unit 52a furthermore has various geometries, arranged adjacently in a line, for receiving different components of the internal parts of the toothbrush handpiece 12a. Furthermore, the frame unit 52a has apertures and slots for cables and for the purposes of reducing weight.

Furthermore, the toothbrush handpiece 12a has a drive unit 48a for driving the interface 24a, which is received in the housing 46a. The drive unit 48a is configured for driving the spindle 110a of the interface 24a. The drive unit 48a is formed by a motor. The drive unit 48a is implemented of an oscillating armature motor. The frame unit 52a at least partially receives the drive unit 48a. The frame unit 52a fully receives the drive unit 48a. The drive unit 48a is installed directly in the frame unit 52a. In particular, no separate motor assembly is provided. The drive unit 48a has a rotor 58a. The rotor 58a is configured for performing an oscillating movement. The rotor 58a has an integrally formed cage element 60a. The cage element 60a is configured for receiving at least one magnet 62a, 62a'. The cage element 60a is configured for receiving two magnets 62a, 62a'. The magnets 62a, 62a' are formed in each case by permanent magnets. The cage element 60a has in each case one receiving region for receiving the magnets 62a, 62a'. Furthermore, the cage element 60a has a base body 64a, which comprises the at least one receiving region, and spindle projections 66a, 68a which are arranged to both sides of the base body 64a and which form a rotary spindle of the rotor 58a. The spindle projections 66a, 68a are arranged in each case on opposite sides of the base body 64a. A first spindle projection 66a is arranged on a side of the base body 64a averted from the interface 24a. A second spindle projection 68a is arranged on a side of the base body 64a facing toward the interface 24a. The second spindle projection 68a is coupled directly to the interface. The second spindle projection 68a is configured for rotationally conjointly receiving the spindle 110a of the interface 24a. Here, the spindle 110a can be received for example by means of an interference fit, by adhesive bonding or by welding. Furthermore, the rotor 58a has at least one cover 70a, 70a' which is configured for closing off the receptacle regions of the cage element 60a. The rotor 58a has at least two covers 70a, 70a' which are configured in each case for closing off one side of the receiving regions of the cage element 60a and which in particular simultaneously also serve for diverting the magnetic field. The receiving regions are in each case open to two opposite sides and are closed off by means of the covers 70a, 70a' after the magnets 62a, 26a' have been inserted. The covers 70a, 70a' are in each case screwed onto, adhesively bonded to or screwed to the base body 64a of the cage element 60a. During an assembly process, it is preferably firstly the case that the first cover 70a is connected to the base body 64a, the magnets 62a, 62a' are subsequently inserted, and thereafter the second cover 70a' is connected to the base body 64a. Bearings 118a, 120a for the bearing of the rotor 58a are subsequently installed. The rotor 58a is received by means of its bearings 118a, 120a in a receiving region of the frame unit 52a. The receiving region for the rotor 58a is open to two opposite sides. The covers 70a, 70a"" are configured for covering the magnets 62a, 62a" and for distributing a magnetic field of the magnets 62a, 62a".

Furthermore, the drive unit 48a has a resetting spring 72a. The resetting spring 72a is formed by a helical spring. Some other embodiment of the resetting spring that appears expedient to a person skilled in the art, for example in the form of a spiral spring or leaf spring, would however also be conceivable. The resetting spring 72a is, by way of a first end, coupled rotationally conjointly to the first spindle projection 66a of the rotor 58a. For this purpose, the resetting spring 72a engages with a first end into a groove of the first spindle projection 66a of the cage element 60a, which groove runs radially through an axis of rotation of the rotor 58a. The first end of the resetting spring 72a is furthermore fixed on the first spindle projection 66a by means of a nut 115a, which is screwed onto the first spindle projection 66a, and by means of a clamping ring 117a which interacts with said nut. The clamping ring 117a serves for optimally distributing, onto the resetting spring 72a, the force for the fixing by means of the nut 115a. Furthermore, the resetting spring 72a is, by way of a second end, fixed in a variable rotationally fixed manner to the frame unit 52a by means of a fixing element 74a. The resetting spring 72a is fixed in a variable rotationally fixed manner to the frame unit 52a with regard to a rotational position. The resetting spring 72a is designed to be fixable in a rotationally fixed manner to the frame unit 52a in different rotational positions relative to the frame unit 52a by means of the fixing element 74a. By means of the fixing element 74a, an overall rotational position of the resetting spring 72a relative to the frame unit 52a can be set in order to compensate for tolerances in the manufacture of the resetting spring 72a. An initial position of the rotor 58a relative to the frame unit 52a can be indirectly set. For this purpose, the fixing element 74a, receiving the second end of the resetting spring 72a, is fixed against the frame unit 52a by means of a screw 116a which extends through the frame unit 52a into the fixing element 74a. Here, the second end of the resetting spring 72a is received in a recess of the fixing element 74a. Here, the screw 116a is guided through an elongated hole of the frame unit 52a, such that the fixing element 74a can be fixed to the frame unit 52a in different positions relative to the frame unit 52a. The second end of the resetting spring 72a is thus held in a present position. Here, in particular, the second end of the resetting spring 72a can be fixed in different positions relative to the frame unit 52a. During an assembly process, it is possible here for the fixing element 74a to be preassembled with the resetting spring 52a, with the screw 116a not being tightened. Subsequently, the spindle 110a or the rotor 58a can be oriented, and the screw 116a can be subsequently tightened. The resetting spring 72a is configured in particular for performing a rotation of 2° to 10°, preferably of 3° to 7°.

Alternatively, the screw 116a may be guided not through an elongated hole but through a simple blind hole. In this way, the settability is lost, such that no orientation is possible. The resetting spring 72a can however nevertheless be positioned and fixed.

Furthermore, the drive unit 48a has a stator 76a. The stator 76a comprises a carrier 78a which is implemented as a single piece, a metal-sheet package 80a which is inserted into the carrier 78a, and a coil 82a which engages around the metal-sheet package 80a. The stator 76a comprises the carrier 78a which is implemented as a single piece and which is composed of a hard component, the metal-sheet package 80a which is inserted into the carrier 78a, the coil 82a which engages around the metal-sheet package 80a, and a lamination plate cover arranged between the coil 82a and the metal-sheet package 80a. The stator 76a is formed as a module. The carrier 78a is formed by a plastics carrier. The carrier 78a is formed by a substantially rectangular-cuboidal carrier which has, on a first side, a rectangular-cuboidal recess for receiving the metal-sheet package 80a. The metal-sheet package 80a has a U-shaped cross section, wherein the free ends of the metal-sheet package 80a point in each case away from the carrier. The metal-sheet package 80a is composed of a multiplicity of lamination plates packed side-by-side. The lamination plates are adhesively bonded, pressed, engaged with detent action, or connected in some other way in the carriers 78a. Furthermore, the carrier 78a has, on a rear side of the recesses, a guide groove for receiving the coil 82a. The coil 82a encloses the carrier 78a and the metal-sheet package 80a. The coil 82a is wound around the metal-sheet package 80a and the carrier 78a. The coil 82a is oriented in a longitudinal direction. The coil 82a and the metal-sheet package 80a are designed to be free from contact. For isolation of the coil 82a relative to the metal-sheet package 80a on a side averted from the carrier 78a, the stator 76a has an isolation plate (not shown in any more detail) which is arranged between the coil 82a and the metal-sheet package 80a. The isolation plate is formed by a lamination plate cover. The isolation plate is composed of plastic. The lamination plate cover is installed by engagement with detent action, adhesive bonding or the like. The isolation plate protects the wire of the coil 82a from the edges of the metal-sheet package 80a and prevents a short circuit between the coil 82a and the metal-sheet package 80a. The carrier 78a of the drive unit 48a is connected directly to the frame unit 52a. The carrier 78a is screwed to the frame unit 52a. In principle, however, some other connection that appears expedient to a person skilled in the art would also be conceivable. The carrier 78a covers the rotor 58a of the drive unit 48a from one side. The carrier 78a covers a first open side of the receiving region of the frame unit 52a for the rotor 58a. Furthermore, the metal-sheet package 80a projects partially into the receiving region of the rotor 58a. The metal-sheet package 80a engages at least partially around the rotor 58a in an assembled state.

Furthermore, the electric toothbrush handpiece 12a has a rotor cover 88a. The rotor cover 88a covers the rotor 58a of the drive unit 48a from a side situated opposite the carrier 78a. The rotor cover 88a covers a second open side of the receiving region of the frame unit 52a for the rotor 58a. In an assembled state, the rotor 58a is surrounded directly by the stator 76a, the frame unit 52a and the rotor cover 88a. The rotor cover 88a is formed by a plastics part. The rotor cover 88a is fixedly connected to the frame unit 52a. The rotor cover 88*a* is connected opposite the carrier 78*a* to the frame unit 52*a*. The rotor cover 88*a* is screwed to the frame unit 52*a*. In principle, however, some other form of the connection which appears expedient to a person skilled in the art would also be conceivable. The rotor cover 88*a* is configured together with the frame unit 52*a* for bearing and fixing the rotor 58*a* of the drive unit 48*a*. The rotor cover 88*a* and the frame unit 52*a* form in each case two semicircular spindle receptacles for receiving the rotor 58*a*. The semicircular spindle receptacles are formed in each case by corresponding spindle receptacles which together form a complete spindle receptacle. The spindle receptacles are configured in each case for receiving the two spindle projections 66*a*, 68*a* of the rotor 58*a* by means of in each case one bearing 118*a*, 120*a*. For this purpose, the bearings 118*a*, 120*a* are received in the spindle receptacles, which bearings 118*a*, 120*a* are in turn configured for bearing the spindle projections 66*a*, 68*a* of the rotor 58*a* relative to the frame unit 52*a*. Various embodiments of the bearings 118*a*, 120*a* which appear expedient to a person skilled in the art are conceivable. The rotor 58*a* is mounted between the frame unit 52*a* and the rotor cover 88*a*. The rotor cover 88*a* is furthermore configured together with the frame unit 52*a* for bearing and sealing off the spindle 110*a* of the interface 24*a*. For this purpose, the rotor cover 88*a* and the frame unit 52*a* form in each case one semicircular spindle receptacle for receiving a sealing ring 122*a* and a bearing 124*a* for the spindle 110*a*. The spindle 110*a* is mounted between the rotor cover 88*a* and the frame unit 52*a*. Various embodiments of the bearing 124*a* which appear expedient to a person skilled in the art are conceivable. For example, it would be conceivable for the bearing 124*a* to be formed in each case by a plain bearing composed of plastic or of the material iglidur. The rotor cover 88*a* therefore extends axially from the drive unit 48*a* to a point at which the spindle of the interface 24*a* emerges from the housing 46*a*.

Furthermore, the electric toothbrush handpiece 12*a* has a covering cap 126*a*. The covering cap 126*a* is configured for being pushed over a spindle-side end of the rotor cover 88*a* and of the frame unit 52*a*. In an assembled state, the covering cap 126*a* engages around in each case the spindle-side end of the rotor cover 88*a* and of the frame unit 52*a*. The covering cap 126*a* serves for further connection and centering of the rotor cover 88*a* and of the frame unit 52*a* relative to one another. Furthermore, the covering cap 126*a* serves for spindle guidance of the spindle 110*a* of the interface 24*a*. For this purpose, the spindle 110*a* is guided through the covering cap 126*a*. Furthermore, the covering cap 126*a* serves for sealing off a housing interior with respect to the interface 24*a*. The covering cap 126*a* serves for sealing between the housing 46*a* and the frame unit 52*a*. For this purpose, the covering cap 126*a* comprises a sealing ring 128*a*.

Furthermore, the electric toothbrush handpiece has at least one stop element 84.1*a*, 84.2*a*. In the exemplary embodiment illustrated, two stop elements 84.1*a*, 84.2*a* are disclosed by way of example, wherein it would basically also be possible for only one of the two stop elements 84.1*a*, 84.2*a* to be provided. The stop elements 84.1*a*, 84.2*a* are configured for limiting a rotation of the rotor 58*a* of the drive unit 48*a* out of an initial position. The stop elements 84.1*a*, 84.2*a* form in each case one end stop of the rotor 58*a* in the case of an oscillating drive movement. The stop elements 84.1*a*, 84.2*a* serve in particular for preventing an overextension of the resetting spring 72*a*. A first stop element 84.1*a* is formed by a pin 86*a* which is fixedly connected to the rotor 58*a* of the drive unit 48*a*. The pin 86*a* is inserted radially into an opening 130*a* of the rotor 58*a*. The pin 86*a* is inserted radially into an opening 130*a* of the second spindle projection 68*a*. The pin 86*a* is arranged in a positionally fixed manner on the rotor 58*a* and projects partially radially out of the rotor 58*a*. Furthermore, the pin 58*a* is, by way of one end, mounted elastically on the frame unit 52*a*. The pin 58*a* is, by way of a free end, mounted elastically on the frame unit 52*a*. The pin 58*a* is, by way of an end averted from the rotor 58*a*, mounted by means of an elastic sleeve 132*a* in an opening 131*a* of the frame unit 52*a*. The sleeve 132*a* is formed for example by a silicone sleeve. In principle, however, some other embodiment that appears expedient to a person skilled in the art would also be conceivable. The stop positions ora maximum angle is defined here by means of the size of the opening 131*a* in the frame unit 52*a*.

A second stop element 84.2*a* is implemented integrally with the rotor cover 88*a*. The second stop element 84.2*a* forms a projection which is implemented integrally with the rotor cover 88*a* and which faces toward the rotor 58*a*. Here, the shape of the second stop element 84.2*a* is adapted to the end positions of the rotor 58*a*. The second stop element 84.2*a* serves as a stop for the base body 64*a* of the cage element 60*a* and/or for the covers 70*a*, 70*a*' of the rotor 58*a*. The second stop element 84.2*a* is formed by a protuberance in the rotor cover 88*a*. It would however basically also be conceivable for the second stop element 84.2*a* to be formed by a separate component which is fastened to the rotor cover 88*a*.

The stop elements 84.1*a*, 84.2*a* and the corresponding delimiting counterpart elements, that is to say in particular the openings 130*a*, 131*a* and the cover 70*a*', are selected/shaped such that a movement out of a zero position is possible only to an extent of 3° to 12°, preferably of 4° to 8°, to each side.

Furthermore, the toothbrush handpiece 12*a* has an energy store 50.1*a*; 50.2*a* which is received in the housing 46*a* and which serves for supplying energy to the drive unit 48*a*. The frame unit 52*a* receives the energy store 50.1*a*; 50.2*a*. The energy store 50.1*a*; 50.2*a* is arranged on a side of the drive unit 48*a* averted from the interface 24*a*. The energy store 50.1*a*; 50.2*a* is clamped radially by lateral holding arms of the frame unit 52*a*. Furthermore, a longitudinal displacement of the energy store 50.1*a*; 50.2*a* is prevented by means of the chamber-like construction of the frame unit 52*a*. The energy store 50.1*a*; 50.2*a* is arranged substantially coaxially with respect to the drive unit 48*a*. The energy store 50.1*a*; 50.2*a* is embodied as an accumulator, in particular an NiMh accumulator and/or an Li-ion accumulator. In principle, however, a different embodiment of the energy store 50.1*a*; 50.2*a* that appears to be expedient to a person skilled in the art, for example as a battery, would also be conceivable. For example, two different energy stores 50.1*a*; 50.2*a* are provided, which are used for the toothbrush handpiece 12*a*. A first proposed energy store 50.1*a*, as illustrated in FIGS. 40, 42 and 43, is formed by a single energy storage cell. The first proposed energy store 50.1*a* is embodied as an AA energy storage cell. A second proposed energy store 50.2*a*, as illustrated in FIG. 44, is formed by three energy storage cells which are connected by means of a frame 134*a* of the energy store 50.2*a*. The frame 52*a* is, with slight modifications, suitable for receiving both energy stores 50.1*a*; 50.2*a*. The frame unit 52*a* is configured both for receiving a single AA energy storage cell and for receiving three AAA energy storage cells in the frame 134*a*. The frame 134*a* is configured for connecting the three energy storage cells in series. The series connection is realized by means of plates which constitute the contact points with respect to the energy storage cells. An axial extent of the frame 134a corresponds to an axial extent of the individual AA energy storage cells.

The electric toothbrush handpiece 12a furthermore has a charging coil 54a for charging of the energy store 50.1a; 50.2a. Charging of the energy store 50.1a; 50.2a directly by means of a plug-in connection would however basically also be conceivable. The charging coil 54a is implemented of an induction coil. The charging coil 54a is received in the fix frame unit 52a. The frame unit 52a has a receiving region for receiving the charging coil 54a in a positionally fixed manner. The charging coil 54a is held and clamped from the outside by the frame unit 52a. For this purpose, the frame unit 52a has at least two to five, preferably at least three to four, holding arms 55a, which are formed integrally on a base body of the frame unit 52a and which secure the position of the charging coil 54a both radially and axially. The frame unit 52a preferably has, for example, exactly four holding arms. Some other number of holding elements that appears expedient to a person skilled in the art, in particular also of more than five, is however basically also conceivable. The charging coil 54a is installed in particular along the longitudinal axis. The charging coil 54a is arranged on a side of the energy store 50.1a; 50.2a which is averted from the drive unit 48a. The charging coil 54a is arranged substantially coaxially with respect to the energy store 50.1a; 50.2a and the drive unit 48a. Furthermore, in an assembled state, the lid 113a engages into the charging coil 54a in order to make it possible for a ferrite core of a charging unit to be positioned in the coil. The charging coil 54a has in particular an inner diameter of 6 mm to 14 mm, preferably of 8 mm to 15 mm, and an outer diameter of 12 mm to 19 mm, preferably of 14 mm to 17 mm. Furthermore, the charging coil 54a has in particular a height of 4 mm to 15 mm, preferably of 5 mm to 10 mm.

Furthermore, the electric toothbrush handpiece 12a has a circuit board 56a. The circuit board 56a is configured for controlling the drive unit 48a. The circuit board 56a is configured for activating the drive unit 48a in sinusoidal fashion during operation. For this purpose, the circuit board 56a is coupled to the energy store 50.1a; 50.2a. The energy store 50.1a; 50.2a is connected by means of lines via the circuit board 56a, on which the controller is integrated, to the drive unit 48a itself. The energy store 50.1a; 50.2a is connected to the coil 82a which is wound around the metal-sheet package 80a, wherein the coil 82a lies not directly on the metal-sheet package 80a but lies at one side on the carrier 78a and at the other side on the lamination plate cover. In the coil 82a, an alternating current is generated which has the effect that an alternating polarity forms at the free ends of the metal-sheet package 80a. The magnets 62a, 62a' are arranged fixedly in the rotor 58a and are installed by means of the covers 70a, 70a', which optimize the field formed by the magnets 62a, 62a'. The rotor 58a is mounted rotatably within the metal-sheet package 80a. Owing to the polarization of the free ends of the metal-sheet package 80a, the rotor 58a with the magnets 62a, 26a' seeks to realign in the field, giving rise to a movement. If the polarity of the ends of the metal-sheet package 80a is reversed, then the rotor 58a seeks to rotate in the other direction. This gives rise to an oscillating back-and-forth movement of the rotor 58a. The resetting spring 72a on the rotary spindle ensures the return of the rotor 58a into a zero position, and it furthermore ensures softer movement transitions when the polarity changes. Overall, the resetting spring 72a is required in order that the movements are possible in the first place, because the forces resulting from the polarization would otherwise be so great that no oscillation would be possible.

What the circuit board 56a controls are the energy pulses fed to the drive unit 48a. These variables are specifically adapted to the present drive or to the product. In order that smooth running of the drive unit 48a is achieved, the drive unit 48a is activated in sinusoidal fashion and not with pulses and intervals.

Furthermore, the circuit board 56a is coupled to the charging coil 54a. The circuit board 56a is configured for controlling a charging process of the energy store 50.1a; 50.2a. Furthermore, the circuit board 56a has an actuating element 136a which can be actuated through the base body 112a of the housing 46a and which serves for an activation and/or deactivation of the toothbrush handpiece 12a. The actuating element 136a is configured for being actuated through the overmold 114a of the housing 46a. Also provided on the circuit board 56a are further elements such as, in particular, lines, resistors, LEDs and/or a control unit. The circuit board 56a is furthermore partially received in positively locking fashion by the frame unit 52a and extends over a major part of the axial extent of the frame unit 52a. The circuit board 56a extends at least over the energy store 50.1a; 50.2a and the drive unit 48a of the toothbrush handpiece 12a. To receive the circuit board 56a in positively locking fashion, the frame unit 52a has multiple hook-like positive-locking elements 138a, which are configured for partially engaging over the circuit board 56a in an assembled state. For an installation process, the circuit board 56a has, on an outer edge, recesses 140a which correspond to the positive-locking elements 138a and via which the circuit board 56a can, for installation thereof, be moved past the positive-locking elements 138a into an end position. During an installation process, the circuit board 56a is preferably mounted onto the frame unit 52a in a manner offset with respect to a final position, wherein the circuit board 56a can be guided past the positive-locking elements 138a by means of the recesses 140a. The circuit board 56a is subsequently pushed under the positive-locking elements 138a and thereby fixed. For this purpose, the circuit board 56a has separate small cutouts (not visible in any more detail) for the detent engagement in the end position. The positive-locking elements 138a additionally serve as hold-down means, which hold the circuit board 56a in non-positively locking fashion. At a lower end of the circuit board 56a, the frame unit 52a furthermore has a stop with a ramp, which serves for exact positioning of the circuit board 56a.

Tolerances between the frame unit 52a and its components and the housing 46a must be compensated for in order that firstly the actuating element 136a, in the assembled state, is in the correct position for the actuation through the housing 46a, but secondly also the charging coil 54a is situated optimally in order that the inductive charging process attains an optimum efficiency. Furthermore, tolerances must be compensated in order that the frame unit 52a is seated firmly in the housing 46a and no noises are generated during operation. The length compensation for the compensation of tolerances may be realized through the installation of a compressible length compensation element 57a, for example composed of a compressible plastic, which is fitted for example between charging coil 54a and frame unit 52a. It would however furthermore also be possible for elastic elements to be integrated on the frame unit 52a in order to ensure the length compensation. By way of example, flexible elements which are placed under stress, that is to say bent, when the lid 113a is installed.

Altogether, the frame unit 52a may be divided into multiple zones. The frame unit 52a has a coil zone. The coil zone forms the first zone as viewed from below, and serves for directly receiving, and for the direct installation of, the charging coil 54a. The frame unit 52a furthermore has an accumulator zone. The accumulator zone directly adjoins the coil zone and is configured for receiving the energy store 50.1a; 50.2a. The frame unit 52a furthermore has a spring zone. The spring zone directly adjoins the accumulator zone on a side averted from the coil zone, and is configured for receiving the resetting spring 72a and the fixing element 74a. The frame unit 52a furthermore has an oscillating armature zone. The oscillating armature zone directly adjoins the spring zone on a side averted from the coil zone, and is configured for receiving the drive unit 48a. The frame unit 52a is of continuously open form in the region of the oscillating armature zone. The frame unit 52a furthermore has a spindle zone. The spindle zone directly adjoins the oscillating armature zone on a side averted from the coil zone, and is configured for receiving the interface 24a or the spindle 110a of the interface 24a. The frame unit 52a furthermore has a print zone. The print zone is arranged on a front side of the frame unit and is configured for receiving the circuit board 56a.

Fitting of items into the frame unit 52a is performed substantially via a rear side. Only the circuit board 56a and the stator 76a are installed from the front. Furthermore, the charging coil 54a and a connecting cap are installed along the longitudinal axis. The drive unit 48a and the energy store 50.1a; 50.2a are installed from a rear side of the frame unit 52a.

During a process of assembly of the electric toothbrush handpiece 12a, it is preferably the case that, in a first step, all of the internal parts are installed via the frame unit 52a and are subsequently, in a second step, pressed into the housing 46a. Here, the frame unit 52a is clamped in the housing 46a. For this purpose, the frame unit 52a has detent lugs which engage into detent recesses of the housing 46a. Subsequently, in a third step, the lid 113a is fixed to the housing 46a and thus fixes and closes off the internal parts. The lid 113a may be both screwed and for example locked by means of a bayonet fastener to the housing 46a.

FIGS. 19 to 22 show an electric toothbrush 90a with the electric toothbrush handpiece 12a and with the brush attachment 10a in an attached state. Owing to the different views, some elements are not illustrated in all of the figures, and are correspondingly not denoted by reference designations in all of the figures. During an installation of the brush attachment 10a onto the electric toothbrush handpiece 12a, the correct installation is ensured by means of the shape of the spindle 110a. During the insertion, the operator knows for example where the front is, in particular by means of the bristles on the brush attachment 10a and by means of the design of the toothbrush handpiece 12a. The geometry in the interior of the brush attachment 10a leads to accurate and correct installation owing to the different steps and profiles of the interface receptacle 20a and ultimately by means of the guidance of the two flattened portions of the spindle 110a at the front and at the rear. During the installation process, a free end of the spindle 110a serves as a stop.

To further stabilize the brush attachment 10a on the toothbrush handpiece 12a, it is possible to fill the cavity of the interface receptacle 20a in the region in which the spindle 110a emerges from the handpiece housing. This may be realized for example by means of the formation of a journal around the spindle 110a, wherein said journal may be designed as a continuation of the covering cap 126a. It is furthermore also possible to fill the cavity with a part which is fitted over the spindle 110a. It is possible here for the part to be mounted reversibly or irreversibly on the spindle. By virtue of the cavity being filled, the brush attachment 10a has a stop in the event of loading. In this way, the forces of the loading are, during use, diverted also to the housing and/or the frame unit rather than the spindle, such that the drive unit is relieved of load.

A further exemplary embodiment of the invention is shown in FIGS. 45 to 59. The following descriptions are restricted substantially to the differences between the exemplary embodiments, wherein, with regard to unmodified components, features and functions, reference may be made to the description of the exemplary embodiment of FIGS. 1 to 44. For distinction between the exemplary embodiments, the alphabetic character a in the reference designations of the exemplary embodiment in FIGS. 1 to 44 has been replaced by the alphabetic character b in the reference designations of the exemplary embodiment of FIGS. 45 to 59. With regard to identically designated components, in particular with regard to components with identical reference designations, reference may basically also be made to the drawings and/or the description of the exemplary embodiment of FIGS. 1 to 59.

FIGS. 45 to 52 show an alternative design variant of an interface receptacle 20b or of a clamping unit 28b of a brush attachment 10b. The external shape of the brush attachment 10b does not visually change if it is overmolded. A base body 26b of the brush attachment 10b however has a different appearance.

The clamping unit 28b has an at least partially freestanding clamping wall 30b, 30b' which directly adjoins the interface receptacle 20b. The clamping unit 28b has two partially freestanding clamping walls 30b, 30b' which directly adjoin the interface receptacle 20b on opposite sides. The clamping walls 30b, 30b' adjoin in each case one side of the interface receptacle 20b. The first partial receptacle region 36b of the interface receptacle 20b is delimited to two opposite sides by the clamping walls 30b, 30b'. The clamping walls 30b, 30b' are partially free-standing relative to a remaining part of the base body 26b. The clamping walls 30b, 30b' are partially set free in relation to the remaining part of the base body 26b by means of slots and apertures with respect to the interface receptacle 20b, which slots and apertures extend in each case parallel to the longitudinal axis. In each case proceeding from the interface receptacle 20b, the slots are arranged behind the clamping walls 30b, 30b', whereas the apertures are arranged adjacent to the clamping walls 30b, 30b' and open into the interface receptacle 20b. In the embodiment, the slot is shaped such that, in a first part, the clamping walls 30b, 30b' are of identical shape to the first embodiment. The slot then continues in tapering fashion in the direction of the head portion, that is to say the height of the wall or the depth of the slot decreases to zero. The total length of the slots and of the apertures amounts to 10.5 mm to 14.5 mm, preferably 11 mm to 13 mm. The further dimensions remain the same as in the first embodiment. The clamping walls 30b, 30b' are configured for being deflected radially outward when the brush attachment 10b is attached to a toothbrush handpiece 12b. The clamping walls 30b, 30b' of the clamping unit 28b extend axially in an insertion direction 102b of an interface 24b beyond the narrowing 42b of the first partial receptacle region 36b. The clamping walls 30b, 30b' of the clamping unit 28b are, in the insertion direction 102b, arranged axially behind a narrowing 100b of the second partial receptacle region 38b. An overmold 32b directly encloses at least a substantial part of the clamping walls 30b, 30b' in each case in at least one plane 34b. The overmold 32b encloses the clamping walls 30b, 30b' in each case in a radial direction on a side averted from the interface receptacle 20b. The clamping walls 30b, 30b' are delimited to two sides by the overmold 32b. As viewed radially from the interface receptacle 20b, the overmold 32b is situated behind the clamping walls 30b, 30b'. The base body 26b has, behind the clamping walls 30b, 30b' on a side averted from the interface receptacle 20b, in each case one two-stage recess which becomes narrower toward the inside and wider toward the outside. In a region of the apertures of the base body 26b which have been formed by injection molding by means of the overmold 32b, the overmold 32b directly adjoins the interface receptacle 20b. The overmold 32b serves for cushioning an elastic deflection of the clamping walls 30b, 30b'. The contact surfaces of the clamping walls 30b, 30b' are of smooth form.

In this second embodiment, it is furthermore the case that the partially free-standing clamping web 104b is designed as a clamping bridge 142b. The clamping bridge 142b is identified by the fact that it is of elastic form like the clamping walls 30b, 30b'. The clamping bridge 142b is of elastic form. In this way, it can contribute to the clamping force and lead to an increased pulling-off force. If the clamping web 104b is designed to be less thick in a radial direction, it takes the form of a clamping bridge 142b, which is connected only at the front and at the rear to the body of the base body 26b and which is otherwise laterally set free by means of the apertures. The clamping bridge 142b is formed parallel to the clamping walls 30b, 30b'. The material thickness of the clamping bridge 142b is in the range of that of the clamping walls 30b, 30b'.

The clamping bridge 142b is arranged axially at the height of the clamping walls 30b, 30b'. The clamping bridge 142b delimits the first partial receptacle region 36b of the interface receptacle 20b to a third side. The clamping bridge 142b of the clamping unit 28b extends axially in an insertion direction 102b of the interface 24b beyond the narrowing 42b of the first partial receptacle region 36b. The overmold 32b directly encloses at least a substantial part of the clamping bridge 142b in at least one plane 34b. The overmold 32b encloses the clamping bridge 142b in a radial direction on a side averted from the interface receptacle 20b.

A clamping force imparted by the clamping walls 30b, 30b' and the clamping bridge 142b is basically dependent on the spindle construction or on the geometry of a spindle 110b and the dimensions of the spindle 110b. Clamping occurs not by means of punctiform contact but by means of areal contact of the parts on three or four sides. Three sides are equipped with flexible clamping elements, whereas the fourth side is designed without flexibility. Clamping by means of the clamping bridge 142b is thus generated in parallel with the lateral clamping by means of the clamping walls 30b, 30b'. The desired clamping force of the clamping unit 28b lies in the range of that of the first embodiment.

It would basically also be conceivable for the free spaces around the inner geometry not to be filled with overmold 32b. This could in particular constitute a single-component solution, for example by virtue of the brush attachment 10b being composed only of a hard component, and technical geometries, such as in particular the clamping walls 30b, 30b' and the clamping bridge 142b, not being overmolded, and thus being free-standing. An inexpensive brush attachment 10b could be created in this way. Furthermore, a further facility for ventilation during the insertion of the spindle 110b can be created.

Reference will be made below to FIGS. 53 to 56, and FIGS. 57 to 59, which show different views of the toothbrush handpiece 12b and details of the toothbrush handpiece and of its parts, wherein a housing 46b and a lid 113b are omitted from the figures in each case. Owing to the different views, some elements are not illustrated in all of the figures, and are correspondingly not denoted by reference designations in all of the figures.

Furthermore, the toothbrush handpiece 12b has a fix frame unit 52b arranged in the housing 46b and has an additional frame unit 144b of a charging coil 54b. In an assembled state, the frame unit 52b with installed frame unit 144b of the charging coil 54b has been pushed into the housing 46b. The frame unit 52b is implemented as a single piece, whereas the frame unit 144b of the charging coil 54b is installed thereon. In an assembled state, the frame unit 52b with installed frame unit 144b of the charging coil 54b extends axially over a major part of the housing 46b. The frame unit 52b and frame unit 144b of the charging coil 54b are formed by a plastics frame. The frame unit 52b and frame unit 144b of the charging coil 54b are composed of plastic, preferably a polypropylene. Some other embodiment of the frame unit 52b and/or frame unit 144b of the charging coil 54b that appears expedient to a person skilled in the art would however basically also be conceivable. The frame unit 52b with installed frame unit 144b of the charging coil 54b furthermore has various geometries, arranged adjacently in a line, for receiving different components of the internal parts of the toothbrush handpiece 12b. Furthermore, the frame unit 52b has apertures and slots for cables and for the purposes of reducing weight.

Furthermore, the toothbrush handpiece 12b has a drive unit 48b for driving the interface 24b, which is received in the housing 46b. The drive unit 48b is configured for driving the spindle 110b of the interface 24b. The drive unit 48b is formed by a motor. The drive unit 48b is implemented of an oscillating armature motor. The frame unit 52b at least partially receives the drive unit 48b. The frame unit 52b fully receives the drive unit 48b. The drive unit 48b is installed directly in the frame unit 52b. In particular, no separate motor assembly is provided. The drive unit 48b has a rotor 58b. The rotor 58b is configured for performing an oscillating movement. The rotor 58b has an integrally formed cage element 60b. The cage element 60b is configured for receiving at least one magnet 62b, 62b'. The cage element 60b is configured for receiving two magnets 62b, 62b'. The magnets 62b, 62b' are formed in each case by permanent magnets. The cage element 60b has in each case one receiving region for receiving the magnets 62b, 62b'. Furthermore, the cage element 60b has a base body 64b, which comprises the at least one receiving region, and spindle projections 66b, 68b which are arranged to both sides of the base body 64b and which form a rotary spindle of the rotor 58b. The spindle projections 66b, 68b are arranged in each case on opposite sides of the base body 64b. A first spindle projection 66b is arranged on a side of the base body 64b averted from the interface 24b. A second spindle projection 68b is arranged on a side of the base body 64b facing toward the interface 24b. The second spindle projection 68b is coupled directly to the interface. The second spindle projection 68b is configured for rotationally conjointly receiving the spindle 110b of the interface 24b. Here, the spindle 110b can be received for example by means of an interference fit, by adhesive bonding or by welding. Furthermore, the rotor 58*b* has at least one cover 70*b*, 70*b*' which is configured for closing off the receptacle regions of the cage element 60*b*. The rotor 58*b* has at least two covers 70*b*, 70*b*' which are configured in each case for closing off one side of the receiving regions of the cage element 60*b* and which in particular simultaneously also serve for diverting the magnetic field. The receiving regions are in each case open to two opposite sides and are closed off by means of the covers 70*b*, 70*b*' after the magnets 62*b*, 26*b*' have been inserted. The covers 70*b*, 70*b*' are in each case screwed onto, adhesively bonded to or screwed to the base body 64*b* of the cage element 60*b*, or are fastened as described above by being clamped/clicked in. During an assembly process, it is preferably firstly the case that the first cover 70*b* is connected to the base body 64*b*, the magnets 62*b*, 62*b*' are subsequently inserted, and thereafter the second cover 70*b*' is connected to the base body 64*b*. Bearings 118*b*, 120*b* for the bearing of the rotor 58*b* are subsequently installed. The rotor 58*b* is received by means of its bearings 118*b*, 120*b* in a receiving region of the frame unit 52*b*. The receiving region for the rotor 58*b* is open to two opposite sides. The covers 70*b*, 70*b*' are configured for covering the magnets 62*b*, 62*b*' and for distributing a magnetic field of the magnets 62*b*, 62*b*'.

Furthermore, the drive unit 48*b* has a resetting unit. The resetting unit is of two-part construction. The resetting unit is configured for resetting a rotor 58*b* into an initial position. The resetting unit is coupled rotationally conjointly to a first spindle projection 66*b* of the rotor 58*b* and is supported elastically on the frame unit 52*b*. The resetting unit has a shaft wing 146*b* which is installed directly axially on a first spindle projection 66*b* of the rotor 58*b*. Furthermore, the resetting unit has an elastic spring and damping element 148*b* which is arranged between the shaft wing 146*b* and the frame unit 52*b*. The resetting unit is formed by the shaft wing 146*b* and the spring and damping element 148*b*.

The shaft wing 146*b* is fitted with its opening, a blind hole, on the first spindle projection 66*b* of the rotor 58*b* and coupled to the latter. The dovetail-shaped geometry, as can also be seen in FIG. 57, gives rise to a rotationally conjoint connection of the shaft wing 146*b* to the first spindle projection 66*b* of the cage element 60*b*. The connection is preferably implemented as an interference fit, though it is also conceivable for the connection not to be rigid and for no further axial securing other than the radial rotational securing to be realized, because slippage in an axial direction is prevented in the interaction of the further components.

The shaft wing 146*b* lies on the spring and damping element 148*b* and is connected to the latter. The elastic spring and damping element 148*b* is connected fixedly to the shaft wing 146*b*. The spring and damping element 148*b* lies in turn on the frame unit 52*b*, such that, in the assembled state of all of the elements, the resetting unit is formed by the interaction of the stated elements. The spring and damping element 148*b* is in particular fixed in a rotationally fixed manner to the frame unit 52*b*. The resetting unit lies against the frame unit 52*b*. The spring and damping element 148*b* is configured for generating a resetting force in the event of a deflection of the shaft wing 146*b* in a circumferential direction out of a rest position. The elastic spring and damping element 148*b* furthermore, in an installed state, has a preload in relation to the frame unit 52*b*, wherein the frame unit 52*b* forms a support surface for the spring and damping element 148*b*. The shaft wing 146*b* is preferably formed from a rigid hard component, whereas the spring and damping element 148*b* is formed preferably from a soft component, preferably a silicone, with a Shore A hardness of 25 Shore A to 75 Shore A, preferably of 35 Shore A to 65 Shore A. This arrangement has the effect that, when the rotor 58*b* is deflected, the shaft wing 146*b* likewise deflects, and thus presses the spring and damping element 148*b* onto the frame unit 52*b*. When the forces for the deflection are withdrawn, the spring and damping element 148*b* pushes the shaft wing 146*b* back into the zero position again. The zero position is defined as a position without deflection of the drive.

The spring and damping element 148*b* may also, in the case of a different construction, be fixed to an element other than the frame unit 52*b*; for example, the spring and damping element 148*b* may bear against or be fixed to a housing, which serves as a fixed point of the application. The shaft wing 146*b* would thus be fitted onto a spindle, and the spring and damping element 148*b* would bear against/be fixed to the housing. The spring and damping element 148*b* and the shaft wing 146*b* do not imperatively need to be connected to one another in order that they can perform their action. The resetting in the application is possible by means of the fixed point given by the housing.

In any application of shaft wing 146*b* and spring and damping element 148*b*, it must be ensured that the spindle, in particular the spindle projection 66*b*, onto which the shaft wing 146*b* is mounted, is, together with the shaft wing 146*b*, sufficiently rigid and thus not bent by the loading during operation.

The resetting unit thus formed is in particular configured for performing a rotation of 2° to 10°, preferably of 3° to 7°. The elastic spring and damping element 148*b* limits a rotation of the shaft wing 146*b* to a rotational angle of 2° to 10°, preferably of 3° to 7°.

Furthermore, the drive unit 48*b* has a stator 76*b*. The stator 76*b* comprises a carrier 78*b* which is implemented as a single piece, a metal-sheet package 80*b* which is inserted into the carrier 78*b*, and a coil 82*b* which engages around the metal-sheet package 80*b*. The stator 76*b* comprises the carrier 78*b* which is implemented as a single piece and which is composed of a hard component, the metal-sheet package 80*b* which is inserted into the carrier 78*b*, the coil 82*b* which engages around the metal-sheet package 80*b*, and a lamination plate cover arranged between the coil 82*b* and the metal-sheet package 80*b*. The stator 76*b* is formed as a module. The carrier 78*b* is formed by a plastics carrier. The carrier 78*b* is formed by a substantially rectangular-cuboidal carrier which has, on a first side, a rectangular-cuboidal recess for receiving the metal-sheet package 80*b*. The metal-sheet package 80*b* has a U-shaped cross section, wherein the free ends of the metal-sheet package 80*b* point in each case away from the carrier. The metal-sheet package 80*b* is composed of a multiplicity of lamination plates packed side-by-side. The lamination plates are adhesively bonded, pressed, engaged with detent action, or connected in some other way in the carriers 78*b*. Furthermore, the carrier 78*b* has, on a rear side of the recesses, a guide groove for receiving the coil 82*b*. The coil 82*b* encloses the carrier 78*b* and the metal-sheet package 80*b*. The coil 82*b* is wound around the metal-sheet package 80*b* and the carrier 78*b*. The coil 82*b* is oriented in a longitudinal direction. The coil 82*b* and the metal-sheet package 80*b* are designed to be free from contact. For isolation of the coil 82*b* relative to the metal-sheet package 80*b* on a side averted from the carrier 78*b*, the stator 76*b* has an isolation plate (not shown in any more detail) which is arranged between the coil 82*b* and the metal-sheet package 80*b*. The isolation plate is formed by a lamination plate cover. The isolation plate is composed of plastic. The lamination plate cover is installed by engagement with detent action, adhesive bonding or the like. The isolation plate protects the wire of the coil 82*b* from the edges of the metal-sheet package 80b and prevents a short circuit between the coil 82b and the metal-sheet package 80b. The carrier 78b of the drive unit 48b is connected directly to the frame unit 52b. The carrier 78b is screwed to the frame unit 52b. In principle, however, some other connection that appears expedient to a person skilled in the art would also be conceivable. The carrier 78b covers the rotor 58b of the drive unit 48b from one side. The carrier 78b covers a first open side of the receiving region of the frame unit 52b for the rotor 58b. Furthermore, the metal-sheet package 80b projects partially into the receiving region of the rotor 58b. The metal-sheet package 80b engages at least partially around the rotor 58b in an assembled state.

Furthermore, the electric toothbrush handpiece 12b has a rotor cover 88b. The rotor cover 88b covers the rotor 58b of the drive unit 48b from a side situated opposite the carrier 78b. The rotor cover 88b covers a second open side of the receiving region of the frame unit 52b for the rotor 58b. In an assembled state, the rotor 58b is surrounded directly by the stator 76b, the frame unit 52b and the rotor cover 88b. The rotor cover 88b is formed by a plastics part. The rotor cover 88b is fixedly connected to the frame unit 52b. The rotor cover 88b is connected opposite the carrier 78b to the frame unit 52b. The rotor cover 88b is screwed to the frame unit 52b. In principle, however, some other form of the connection which appears expedient to a person skilled in the art would also be conceivable. The rotor cover 88b is configured together with the frame unit 52b for bearing and fixing the rotor 58b of the drive unit 48b. The rotor cover 88b and the frame unit 52b form in each case two semicircular spindle receptacles for receiving the rotor 58b. The semicircular spindle receptacles are formed in each case by corresponding spindle receptacles which together form a complete spindle receptacle. The spindle receptacles are configured in each case for receiving the two spindle projections 66b, 68b of the rotor 58b by means of in each case one bearing 118b, 120b. For this purpose, the bearings 118b, 120b are received in the spindle receptacles, which bearings 118b, 120b are in turn configured for bearing the spindle projections 66b, 68b of the rotor 58b relative to the frame unit 52b. Various embodiments of the bearings 118b, 120b which appear expedient to a person skilled in the art are conceivable. The rotor 58b is mounted between the frame unit 52b and the rotor cover 88b. The rotor cover 88b is furthermore configured together with the frame unit 52b for bearing and sealing off the spindle 110b of the interface 24b. For this purpose, the rotor cover 88b and the frame unit 52b form in each case one semicircular spindle receptacle for receiving a sealing ring 122b and a bearing 124b for the spindle 110b. The spindle 110b is mounted between the rotor cover 88b and the frame unit 52b. Various embodiments of the bearing 124b which appear expedient to a person skilled in the art are conceivable. For example, it would be conceivable for the bearing 124b to be formed in each case by a plain bearing composed of plastic or of the material iglidur. The rotor cover 88b therefore extends axially from the drive unit 48b to a point at which the spindle of the interface 24b emerges from the housing 46b.

Furthermore, the electric toothbrush handpiece 12b has a covering cap 126b. The covering cap 126b is configured for being pushed over a spindle-side end of the rotor cover 88b and of the frame unit 52b. In an assembled state, the covering cap 126b engages around in each case the spindle-side end of the rotor cover 88b and of the frame unit 52b. The covering cap 126b serves for further connection and centering of the rotor cover 88b and of the frame unit 52b relative to one another. Furthermore, the covering cap 126b serves for spindle guidance of the spindle 110b of the interface 24b. For this purpose, the spindle 110b is guided through the covering cap 126b. Furthermore, the covering cap 126b serves for sealing off a housing interior with respect to the interface 24b. The covering cap 126b serves for sealing between the housing 46b and the frame unit 52b. For this purpose, the covering cap 126b comprises a sealing ring 128b.

Furthermore, the resetting unit, composed of shaft wing 146b and spring and damping element 148b, serves as stop element. The stop element is configured for limiting a rotation of the rotor 58b of the drive unit 48b out of an initial position. The stop element forms in each case one end stop of the rotor 58b in the case of an oscillating drive movement.

Altogether, this present stop element may also be combined with further stop elements, such as are provided for example in conjunction with the first embodiment of the invention. Furthermore, the toothbrush handpiece 12b has an energy store 50b.1; 50.2 which is received in the housing 46b and which serves for supplying energy to the drive unit 48b. In the present embodiment, the frame unit 52b receives the energy store 50b.1; 50.2 at one end in a longitudinal direction. The energy store 50b.1; 50.2 is arranged on a side of the drive unit 48b averted from the interface 24b. The energy store 50b.1; 50.2 is guided—in this case not clamped—radially by lateral holding arms of the frame unit 52b. Furthermore, a longitudinal displacement of the energy store 50b.1; 50.2 is prevented by means of the assembly of the frame unit 144b of the charging coil 54b in interaction with the charging coil 54b and the compensation element. In the assembled state, the energy store 50b.1; 50.2 is arranged substantially coaxially with respect to the drive unit 48b. The energy store 50b.1; 50.2 is embodied as an accumulator, in particular a NiMh accumulator and/or a Li-ion accumulator. In principle, however, a different embodiment of the energy store 50b.1; 50.2 that appears to be expedient to a person skilled in the art, for example as a battery, would also be conceivable.

The electric toothbrush handpiece 12b furthermore has a charging coil 54b for charging of the energy store 50b.1; 50.2. Charging of the energy store 50b.1; 50.2 directly by means of a plug-in connection would however basically also be conceivable. The charging coil 54b is implemented of an induction coil. The charging coil 54b is received in the fix frame unit 144b of the charging coil 54b and is fixed by means thereof to the frame unit 52b. The frame unit 144b of the charging coil 54b has a receiving region for receiving the charging coil 54b in a positionally fixed manner. The charging coil 54b is held from the outside by the frame unit 144b of the charging coil 54b and is held in longitudinal position by means of the compensation element. The position of the charging coil 54b is thus secured both radially and axially. The charging coil 54b is installed in particular along the longitudinal axis. The charging coil 54b is arranged on a side of the energy store 50b.1; 50.2 which is averted from the drive unit 48b. The charging coil 54b is arranged substantially coaxially with respect to the energy store 50b.1; 50.2 and the drive unit 48b. Furthermore, in an assembled state, the lid 113b engages into the charging coil 54b in order to make it possible for a ferrite core of a charging unit to be positioned in the coil. The charging coil 54b has in particular an inner diameter of 6 mm to 14 mm, preferably of 8 mm to 15 mm, and an outer diameter of 12 mm to 19 mm, preferably of 14 mm to 17 mm. Furthermore, the charging coil 54b has in particular a height of 4 mm to 15 mm, preferably of 5 mm to 10 mm.

Furthermore, the electric toothbrush handpiece 12b has a circuit board 56b. The circuit board 56b is configured for controlling the drive unit 48b. The circuit board 56b is configured for activating the drive unit 48b in sinusoidal fashion during operation. For this purpose, the circuit board 56b is coupled to the energy store 50b.1; 50.2. The energy store 50b.1; 50.2 is connected by means of lines via the circuit board 56b, on which the controller is integrated, to the drive unit 48b itself. The energy store 50b.1; 50.2 is connected to the coil 82b which is wound around the metal-sheet package 80b, wherein the coil 82b lies not directly on the metal-sheet package 80b but lies at one side on the carrier 78b and at the other side on the lamination plate cover. In the coil 82b, an alternating current is generated which has the effect that an alternating polarity forms at the free ends of the metal-sheet package 80b. The magnets 62b, 62b' are arranged fixedly in the rotor 58b and are installed by means of the covers 70b, 70b', which optimize the field formed by the magnets 62b, 62b'. The rotor 58b is mounted rotatably within the metal-sheet package 80b. Owing to the polarization of the free ends of the metal-sheet package 80b, the rotor 58b with the magnets 62b, 26b' seeks to realign in the field, giving rise to a movement. If the polarity of the ends of the metal-sheet package 80b is reversed, then the rotor 58b seeks to rotate in the other direction. This gives rise to an oscillating back-and-forth movement of the rotor 58b. The resetting unit on the rotary spindle ensures the return of the rotor 58b into a zero position, and it furthermore ensures softer movement transitions when the polarity changes. Overall, the resetting unit is required in order that the movements are possible in the first place, because the forces resulting from the polarization would otherwise be so great that no oscillation would be possible.

What the circuit board 56b controls are the energy pulses fed to the drive unit 48b. These variables are specifically adapted to the present drive or to the product. In order that smooth running of the drive unit 48b is achieved, the drive unit 48b is activated in sinusoidal fashion and not with pulses and intervals.

Furthermore, the circuit board 56b is coupled to the charging coil 54b. The circuit board 56b is configured for controlling a charging process of the energy store 50b.1; 50.2. Furthermore, the circuit board 56b has an actuating element 136b which can be actuated through a base body 112b of the housing 46b and which serves for an activation and/or deactivation of the toothbrush handpiece 12b. The actuating element 136b is configured for being actuated through an overmold 114b of the housing 46b. Also provided on the circuit board 56b are further elements such as, in particular, lines, resistors, LEDs and/or a control unit. The circuit board 56b is furthermore partially received in positively locking fashion by the frame unit 52b and extends over a major part of the axial extent of the frame unit 52b. The circuit board 56b extends at least over the energy store 50b.1; 50.2 and the drive unit 48b of the toothbrush handpiece 12b. To receive the circuit board 56b in positively locking fashion, the frame unit 52b has multiple hook-like positive-locking elements 138b, which are configured for partially engaging over the circuit board 56b in an assembled state. For an installation process, the circuit board 56b has, on an outer edge, recesses 140b which correspond to the positive-locking elements 138b and via which the circuit board 56b can, for installation thereof, be moved past the positive-locking elements 138b into an end position. During an installation process, the circuit board 56b is preferably mounted onto the frame unit 52b in a manner offset with respect to a final position, wherein the circuit board 56b can be guided past the positive-locking elements 138b by means of the recesses 140b. The circuit board 56b is subsequently pushed under the positive-locking elements 138b and thereby fixed. For this purpose, the circuit board 56b has separate small cutouts (not visible in any more detail) for the detent engagement in the end position. The positive-locking elements 138b additionally serve as hold-down means, which hold the circuit board 56b in non-positively locking fashion. At a lower end of the circuit board 56b, the frame unit 52b furthermore has a stop with a ramp, which serves for exact positioning of the circuit board 56b.

Tolerances between the frame unit 52b and its components and the housing 46b must be compensated for in order that firstly the actuating element 136b, in the assembled state, is in the correct position for the actuation through the housing 46b, but secondly also the charging coil 54b is situated optimally in order that the inductive charging process attains an optimum efficiency. Furthermore, tolerances must be compensated in order that the frame unit 52b and the frame unit 144b of the charging coil 54b are seated firmly, in particular without play, in the housing 46b and no noises are generated during operation. The length compensation for the compensation of tolerances may be realized by means of the compensation element, composed for example of a compressible plastic, as is fitted for example between charging coil 54b and energy store 50b.1, 50.2. It would however furthermore also be possible for elastic elements to be integrated on the frame unit 52b in order to ensure the length compensation. By way of example, flexible elements which are placed under stress, that is to say bent, when a lid 113b is installed.

Altogether, the frame unit 52b with installed frame unit 144b of the charging coil 54b can be divided into multiple zones. The frame unit 144b of the charging coil 54b has a coil zone. The coil zone forms the first zone as viewed from below, and serves for directly receiving, and for the direct installation of, the charging coil 54b. The frame unit 52b furthermore has an accumulator zone. The accumulator zone directly adjoins the coil zone and is configured for receiving the energy store 50b.1; 50.2. The frame unit 52b furthermore has a spring zone. The spring zone directly adjoins the accumulator zone on a side averted from the coil zone, and is configured for receiving the resetting unit. The frame unit 52b furthermore has an oscillating armature zone. The oscillating armature zone directly adjoins the spring zone on a side averted from the coil zone, and is configured for receiving the drive unit 48b. The frame unit 52b is of continuously open form in the region of the oscillating armature zone. The frame unit 52b furthermore has a spindle zone. The spindle zone directly adjoins the oscillating armature zone on a side averted from the coil zone, and is configured for receiving the interface 24b or the spindle 110b of the interface 24b. The frame unit 52b furthermore has a print zone. The print zone is arranged on a front side of the frame unit and is configured for receiving the circuit board 56b.

Fitting of items into the frame unit 52b is performed substantially via a rear side. Only the circuit board 56b and the stator 76b are installed from the front. Furthermore, the charging coil 54b and a connecting cap are installed along the longitudinal axis. The drive unit 48b and the energy store 50b.1; 50.2 are installed from a rear side of the frame unit 52b.

During a process of assembly of the electric toothbrush handpiece 12b, it is preferably the case that, in a first step, all of the internal parts are installed via the frame unit 52*b* and the frame unit 144*b* of the charging coil 54*b* and are subsequently, in a second step, pressed into the housing 46*b*. Here, the frame unit 52*b* with installed frame unit 144*b* of the charging coil 54*b* is clamped in the housing 46*b*. For this purpose, the frame unit 52*b* has detent lugs which engage into detent recesses of the housing 46*b*. Subsequently, in a third step, the lid 113*b* is fixed to the housing 46*b* and thus fixes and closes off the internal parts. The lid 113*b* may be both screwed and for example locked by means of a bayonet fastener to the housing 46*b*.

FIGS. 57 to 59 show further details relating to the shaft wing 146*b* and relating to the spring and damping element 148*b*.

The shaft wing 146*b* is of cross-shaped form in plan view. In the center, there is formed a cylindrical body which, in an axial direction, is equipped with a blind hole 150*b* with dovetail-shaped cross section. This geometry later serves for receiving the spindle projection 66*b* of the rotor 58*b*. Wings 152*b*, 152*b*' are also formed laterally and so as to be situated (symmetrically) opposite one another by 180° in relation to the spindle. The wings 152*b*, 152*b*' are equipped with a passage hole 154*b*, 154*b*'. Opposite the blind hole 150*b* in an axial direction, there is formed a projection 156*b* which, in the installed state, prevents the axial displacement within the assembly. To secure the shaft wing 146*b* on the spindle projection 66*b* of the rotor 58*b*, a snap-action lug is formed on the rotor 58*b* and a snap-action ring 158*b* is formed on the shaft wing 146*b*.

The projection 156*b* has a diameter of 1.5 mm to 5 mm, preferably of 2.5 mm to 3.5 mm. The length of the projection 156*b* amounts to 1.5 mm to 5 mm, preferably 2.5 mm to 3.5 mm. The blind hole 150*b* has a depth of 7 mm to 14 mm, preferably of 9 mm to 12 mm. The width of the shaft wing 146*b*, measured across the wings 152*b*, 152*b*', amounts to between 14 mm and 22 mm, preferably between 17 mm and 19 mm. The outer diameter of the cylindrical body amounts to between 7 mm and 11 mm, preferably between 8 mm and 10 mm.

The spring and damping element 148*b* is, in cross section, formed as a semicircular element with lateral flanges 160*b*, 160*b*'. On its underside, the element has, on the flanges 160*b*, 160*b*', two projections which, in the assembled state, lie on the frame unit 52*b*. The elasticity or a degree of deformability is given by way of projections being realized. Projections 162*b*, 162*b*' are likewise formed on the top side, which projections are formed on the flanges 160*b*, 160*b*' adjacent to the geometry for receiving the shaft wing 146*b*. These projections 162*b*, 162*b*' are installed into the passage holes 154*b*, 154*b*' of the shaft wing 146*b* and hold the two parts together. The projections 162*b*, 162*b*' have undercuts that realize this. The inner geometry of the spring and damping element 148*b* is in particular adapted to the outer geometry of the shaft wing 146*b*. The geometry is selected such that the required partial rotation of the shaft wing 146*b* is possible.

The spring and damping element 148*b* has a length (direction of the drive spindle in the assembled state) of 4 mm to 8 mm, preferably 5 to 6.5 mm. The width perpendicular thereto amounts to between 14 mm and 22 mm, preferably between 17 mm and 19 mm. The height—from the rounding to the projection—amounts to between 6 mm and 11 mm, preferably between 7.5 mm and 9.5 mm. The projections on the bottom side have a height of 1 mm to 3 mm, preferably of 1.2 mm to 1.8 mm. The projections 162*b*, 162*b*' on the top side have a height of 1.5 mm to 4 mm, preferably of 2 mm to 3.5 mm. The inner diameter on the spring and damping element 148*b* amounts to between 7 mm and 11 mm, preferably between 8 mm and 10 mm.

The inner diameter on the spring and damping element 148*b* and the outer diameter of the cylindrical part of the shaft wing 146*b* are coordinated with one another such that the partial rotation is possible without generating friction losses.

In the assembled state in FIG. 57, it can be seen that the spring and damping element 148*b* and the shaft wing 146*b* are installed one inside the other and that the spring and damping element 148*b* lies on the frame unit 52*b* and generates a preload (illustrated as an overlap). The support surface formed on the frame unit 52*b* can be seen in the sectional illustration.

The descriptions given for specific figures are of course also transferable to other figures which show identical or similar configurations and in which the configurations are not described in the same detail.

The invention claimed is:

1. An electric toothbrush handpiece having at least one interface for coupling to a brush attachment, having at least one housing, having at least one drive unit for driving the interface, which is received in the housing, and having at least one energy store for supplying energy to the drive unit,
    comprising at least one fix frame unit which is arranged in the housing and which is implemented as a single piece and which at least partially receives the drive unit and the energy store, wherein:
        the drive unit has at least one stator which has a carrier implemented as a single piece, a metal-sheet package which is inserted in the carrier, and a coil which engages around the metal-sheet package,
        the carrier of the drive unit is connected directly to the frame unit and covers a rotor of the drive unit from at least one side, and
        the stator is formed as a module.

2. The electric toothbrush handpiece as claimed in claim 1,
    comprising at least one charging coil for charging the energy store, which at least one charging coil is received in the fix frame unit.

3. The electric toothbrush handpiece as claimed in claim 1,
    comprising a circuit board for control of the drive unit, which circuit board is at least partially received in positively locking fashion by the frame unit and extends at least over a large part of an axial extent of the frame unit.

4. The electric toothbrush handpiece as claimed in claim 1,
    wherein the drive unit has at least one rotor which comprises at least one cage element, which at least one cage element is implemented as a single piece and has at least one receptacle region for receiving at least one magnet.

5. The electric toothbrush handpiece as claimed in claim 4,
    wherein the cage element has a base body which comprises at least one receiving region for the at least one magnet, and spindle projections which are arranged on both sides of the base body and which form a rotary spindle of the rotor.

6. The electric toothbrush handpiece as claimed in claim 5,
    wherein the rotor has at least one cover which is configured for closing off the receptacle region of the cage element.

7. The electric toothbrush handpiece as claimed in claim 1, comprising at least one rotor cover which is connected fixedly to the frame unit and which, together with the frame unit, is configured for a support and/or fixing of a rotor of the drive unit.

* * * * *